(12) United States Patent
He et al.

(10) Patent No.: US 12,428,514 B2
(45) Date of Patent: *Sep. 30, 2025

(54) ETHYLENICALLY UNSATURATED COMPOUNDS, METHODS FOR THEIR PREPARATION, AND THE USE THEREOF IN COATING COMPOSITIONS

(71) Applicant: Covestro LLC, Pittsburgh, PA (US)

(72) Inventors: Meng He, South Elgin, IL (US); Grant S. Sheridan, Lake in the Hills, IL (US); Eric Urruti, Elgin, IL (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,442

(22) Filed: Nov. 26, 2024

(65) Prior Publication Data

US 2025/0215134 A1 Jul. 3, 2025

Related U.S. Application Data

(60) Provisional application No. 63/616,890, filed on Jan. 2, 2024.

(51) Int. Cl.
| | | |
|---|---|---|
| C08F 290/06 | (2006.01) | |
| C08F 2/50 | (2006.01) | |
| C09D 4/06 | (2006.01) | |
| C09D 151/08 | (2006.01) | |
| G02B 6/02 | (2006.01) | |
| G02B 6/44 | (2006.01) | |

(52) U.S. Cl.
CPC ............ *C08F 290/067* (2013.01); *C08F 2/50* (2013.01); *C09D 4/06* (2013.01); *C09D 151/08* (2013.01); *G02B 6/02395* (2013.01); *G02B 6/4486* (2013.01)

(58) Field of Classification Search
CPC ... C09D 4/06; C09D 151/085; C08F 290/067; C08F 290/068; C08G 77/442
See application file for complete search history.

(56) References Cited

U.S. PATENT DOCUMENTS

| | | | |
|---|---|---|---|
| 3,793,253 A | 2/1974 | Quiring et al. | |
| 4,150,234 A | 4/1979 | Seltzer et al. | |
| 4,861,853 A | 8/1989 | Petrie et al. | |
| 4,962,992 A | 10/1990 | Chapin et al. | |
| 5,104,433 A | 4/1992 | Chapin et al. | |
| 5,364,955 A | 11/1994 | Zwiener et al. | |
| 5,696,179 A | 12/1997 | Chawla | |
| 6,020,528 A | 2/2000 | Leppard et al. | |
| 6,046,270 A | 4/2000 | Roesler et al. | |
| 6,048,660 A | 4/2000 | Leppard et al. | |
| 6,107,436 A | 8/2000 | Goeb et al. | |
| 6,111,010 A | 8/2000 | Yu et al. | |
| 6,169,140 B1 | 1/2001 | Roesler et al. | |
| 6,596,445 B1 | 7/2003 | Matsumoto et al. | |
| 6,689,463 B2 | 2/2004 | Chou et al. | |
| 6,775,451 B1 | 8/2004 | Botelho et al. | |
| 7,169,826 B2 | 1/2007 | Sitzmann et al. | |
| 9,587,143 B2 | 3/2017 | Iezzi | |
| 10,894,858 B2 | 1/2021 | Jansen | |
| 11,964,906 B2 | 4/2024 | Kangtai et al. | |
| 12,187,852 B1 * | 1/2025 | He ........................ | C09D 183/08 |
| 2001/0031848 A1 | 10/2001 | Windmueller et al. | |
| 2002/0013383 A1 | 1/2002 | Chawla et al. | |
| 2002/0119330 A1 | 8/2002 | Roesler et al. | |
| 2006/0122338 A1 | 6/2006 | Roesler et al. | |
| 2007/0100039 A1 | 5/2007 | Hancock et al. | |
| 2009/0075096 A1 | 3/2009 | Butikofer et al. | |
| 2009/0214879 A1 | 8/2009 | Jucker et al. | |
| 2014/0249273 A1 | 9/2014 | Webb et al. | |
| 2016/0230042 A1 | 8/2016 | Webb et al. | |
| 2017/0183534 A1 | 6/2017 | Iezzi | |
| 2021/0088720 A1 | 3/2021 | Steeman et al. | |
| 2021/0179903 A1 | 6/2021 | Zeliznik et al. | |
| 2021/0317253 A1 | 10/2021 | Thiebes et al. | |
| 2022/0259097 A1 | 8/2022 | He et al. | |
| 2023/0116356 A1 | 4/2023 | He et al. | |
| 2023/0117457 A1 | 4/2023 | He et al. | |
| 2023/0120588 A1 | 4/2023 | He et al. | |
| 2023/0312834 A1 | 10/2023 | Dmitry et al. | |

FOREIGN PATENT DOCUMENTS

| | | | |
|---|---|---|---|
| CN | 105566607 A | 5/2016 | |
| CN | 109400816 A | 3/2019 | |
| CN | 111875749 A | 11/2020 | |
| CN | 111960969 A | 11/2020 | |
| CN | 112279992 A | 1/2021 | |
| CN | 112724822 A | 4/2021 | |
| CN | 112778496 A | 5/2021 | |
| EP | 0913402 A1 | 5/1999 | |
| EP | 1514903 A1 | 3/2005 | |
| WO | WO-02051954 A2 * | 7/2002 | ......... C08G 18/0885 |
| WO | 2023205221 A2 | 10/2023 | |
| WO | 2023205223 A1 | 10/2023 | |
| WO | 2023205224 A2 | 10/2023 | |

OTHER PUBLICATIONS

U.S. Appl. No. 63/616,890, filed Jan. 2, 2024.
U.S. Appl. No. 63/616,868, filed Jan. 2, 2024.
Sections 4.6 to the end of chapter 4 in the textbook "Specialty Optical Fibers Handbook" by A. Mendez and T.F. Morse, (c) Elsevier Inc. 2007, published by Elsevier.
Dalton Trans. 2021, 50, 12392-12398.
U.S. Appl. No. 18/596,114, filed Mar. 5, 2024.

\* cited by examiner

*Primary Examiner* — Vu A Nguyen
(74) *Attorney, Agent, or Firm* — Donald R. Palladino

(57) ABSTRACT

Compounds that contain an ethylenically unsaturated group, a silane group, and an aspartate and/or hydantoin group are described. Also disclosed are methods for producing and using such compounds, such as their use in coating compositions, such as coating compositions suitable for application to optical glass fiber substrates.

27 Claims, No Drawings

ETHYLENICALLY UNSATURATED COMPOUNDS, METHODS FOR THEIR PREPARATION, AND THE USE THEREOF IN COATING COMPOSITIONS

FIELD

This specification relates to compounds that contain an ethylenically unsaturated group and a silane group. This specification also relates to methods for producing such compounds, as well as to the use of such compounds in, for example, coating compositions, such as coating compositions suitable for application to optical glass fiber substrates.

BACKGROUND

Radiation-curable, such as ultraviolet ("UV") radiation-curable, coating compositions are used in many applications due to, for example, their ability to cure especially rapidly to produce cured coatings exhibiting many desirable properties. "Radiation-curable" coating compositions, as used herein, refers to coating compositions that require radiation to initiate crosslinking to transform a liquid (uncured) composition to a solid (cured) coating. One specific use of radiation-curable coating compositions is in the production of coated optical fibers.

Optical fibers are composed of glass fibers obtained by hot melt spinning of glass, in which one or more coating layers is disposed over the glass fibers for protective reinforcement. Typically, radiation curable optical fiber coatings are the cured product of a composition containing a mixture of one or more components possessing one or more ethylenically unsaturated bonds which, under the influence of irradiation, undergo crosslinking by free-radical polymerization.

In many cases, optical fibers are coated with a multi-layer coating system that includes an inner "primary coating" that directly contacts the optical fiber and a "secondary coating" that overlays the primary coating. The inner primary coatings are typically formulated to possess a significantly lower modulus than secondary coatings.

The relatively soft inner primary coating provides resistance to microbending, which can be induced by thermal stresses and/or mechanical lateral forces. Microbends are microscopic curvatures in the optical fiber involving local axial displacements of a few micrometers and spatial wavelengths of a few millimeters. They result in added attenuation of the signal transmission (i.e. signal loss) of the coated optical fiber and are therefore undesirable. The harder secondary coating typically provides resistance to handling forces such as those encountered when the coated optical fiber is ribboned and/or cabled.

Often, at least the inner "primary coating" is formulated with one or more urethane-based reactive oligomers, often referred to as a "reactive urethane oligomer", that includes a backbone, a urethane group, and a polymerizable group. In many cases, the reactive urethane oligomer comprises a urethane acrylate oligomer that is a reaction product of a polyol, a diisocyanate, and a hydroxyl-group containing acrylate.

In addition, radiation-curable coating compositions, such as those used to coat optical fibers, often include a silane adhesion promoter. This can be particularly common when the radiation-curable coating composition is intended to be applied to a glass substrate, such as is the case with optical fiber coatings, especially the inner primary coating. In the primary coating, for example, the adhesion promoter provides a link between the polymer primary coating and the surface of the optical glass fiber.

In some cases, the adhesion promoter compound is simply an additive in the coating composition. Alternatively, the adhesion promoter may contain reactive groups that allow it to be covalently bonded to the polymer matrix of the coating. In an optical fiber primary coating formulation, for example, the reactive urethane oligomer may itself contain hydrolysable silane groups. Typically, such a reactive urethane oligomer is produced by including an active-hydrogen containing silane, such as a mercapto or amino functional silane, in the reactants used to produce the reactive urethane oligomer.

Ethylenically unsaturated compounds containing silane groups, such as the commercially available 3-(trimethoxysilyl)propyl acrylate, would also react with a reactive urethane oligomer typically used in optical fiber coating formulations, thereby resulting in covalent bonding of the adhesion promoter to the polymer matrix. Such compounds could also theoretically be produced by reacting an ethylenically unsaturated isocyanate-functional compound, such as isocyanatoethylacrylate, with an amino-functional silane, such as gamma-aminopropyltriethoxysilane, or a thiol-functional silane, such as gamma-mercaptopropyltriethoxysilane. The synthesis of these compounds is not without significant drawbacks. In the case of the amino-functional silane, the reaction with isocyanate will be extremely fast and difficult to control, whereas in the case of the thiol functional silane, the reaction would be sluggish and require sufficient catalyzation. Such catalyzation has typically been provided through the use of tin catalysts, which are undesirable from a regulatory and environmental standpoint. Organobismuth catalysts, such as the commercially available bismuth trineodecanoate, are more regulatory and environmental friendly, but their use for thiol functional silane reaction with isocyanate can result in not only slow reaction, but also significant color change.

In view of the foregoing, it would be highly desirable to provide adhesion promoting compounds that can be readily and efficiently synthesized and that exhibit significantly improved adhesion improved performance relative to other adhesion promoters. It would also be desirable to provide such adhesion promoting compounds that can be especially suitable for use in optical fiber coating applications, particularly in primary coating applications.

SUMMARY

In some respects, this specification relates to ethylenically unsaturated compounds. The ethylenically unsaturated compounds comprise: (a) a moiety of the structure (1):

$$\bullet\!-\!Y\!-\!Si(X)_3; \tag{1}$$

and
(b1) a moiety of the structure (2):

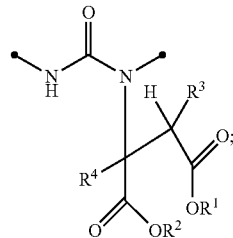

(2)

or
(b2) a moiety of the structure (3):

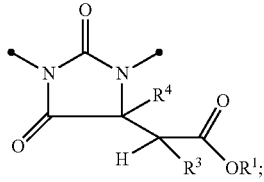

(3)

or
(b3) a combination of a moiety of the structure (2) and a moiety of the structure (3),
in which (i) Y represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) $R^1$ and $R^2$, which may be the same or different, each represent an organic group that is inert to isocyanate groups at temperatures of 100° C. or less; (iv) $R^3$ and $R^4$, which may be the same or different, each represent hydrogen or an organic group that is inert to isocyanate groups at temperatures of 100° C. or less; and (v) each "———●" represents a linkage to another portion of the ethylenically unsaturated compound.

This specification also relates to methods for producing such ethylenically unsaturated compounds, compositions, such as a coating composition, that include such ethylenically unsaturated compounds, and substrates, such as glass substrates, including optical fibers, which are at least partially coated with a coating, such as a primary coating, deposited from such coating compositions.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise expressly indicated. Thus, the articles are used in this specification to refer to one or more than one (i.e., to "at least one") of the grammatical objects of the article.

Throughout this specification "Si" refers to silicon, "H" refers to hydrogen, "N" refers to nitrogen, "O" refers to oxygen, and "S" refers to sulfur.

As indicated, certain implementations of the present specification relate to ethylenically unsaturated compounds. In some implementations, the ethylenically unsaturated compounds of this specification have a molecular weight, calculated from the molecular formula of the ethylenically unsaturated compound, of 400 to less than 2000 g/mol, such as 400 to 1000 g/mol. As used herein, the term "ethylenically unsaturated compound" means a compound that comprises a polymerizable carbon-carbon double bond, i.e., a carbon-carbon double bond that can react with another carbon-carbon double bond in a polymerization reaction. The reaction rate of polymerization is determined by the substituent structures and position of the carbon-carbon double bond in the oligomer structure. For faster polymerization reaction, it is desirable to have at least one carbon-carbon double bond of the ethylenically unsaturated oligomer present as a $=CH_2$ end group with no further substituent on the carbon thereof. As will be appreciated, a polymerizable carbon-carbon double bond is generally comprised in an acryloyl (—C(=O)—CH=CH$_2$), methacryloyl (—C(=O)—C(CH$_3$)=CH$_2$) or vinyl (—CH=CH$_2$) group. In some implementations, the ethylenically unsaturated compound comprises at least one acrylate group, methacrylate group, acrylamide group, methacrylamide group, vinyloxy group, N-vinyl amide group, or any combination thereof. In some embodiments, the ethylenically unsaturated compound comprises only one of the aforementioned ethylenically unsaturated groups. In some implementations, the ethylenically unsaturated compound comprises 1 to 4, such as 1 to 2, or, in some cases, 1 ethylenically unsaturated group. Thus, as will be appreciated, in some implementations, the ethylenically unsaturated compounds of this specification comprise an end group of the structure (1) and an end group of the structure (1a):

(1a)

in which E represents a group that includes any of the aforementioned groups that comprise a polymerizable carbon-carbon double bond, such as an acryloyl, methacryloyl, or vinyl group and * represents a linkage to another portion of the ethylenically unsaturated compound. For example, in some implementations, the end group of structure (1a) has the structure (1b):

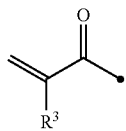

(1b)

in which R$^3$ is H or CH$_3$ and ———• represents a linkage to another portion of the ethylenically unsaturated oligomer. In some cases, the first end group and the second end group are arranged at opposite ends of the ethylenically unsaturated compound. In some cases, an end group of structure (1) and an end group of structure (1a) are arranged at opposite ends of the ethylenically unsaturated compound. Moreover, as will be appreciated, in some cases the moiety of structure (2) and/or the moiety of structure (3) is arranged between the end group of structure (1) and the end group of structure (1a).

More specifically, the ethylenically unsaturated compounds of this specification comprise: (a) a moiety of the structure (1):

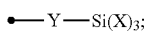

(1)

and
(b1) a moiety of the structure (2):

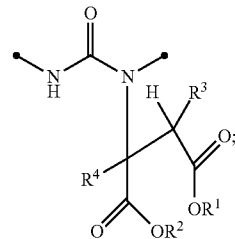

(2)

or
(b2) a moiety of the structure (3):

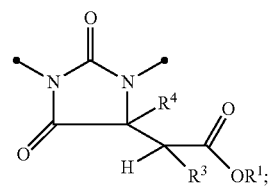

(3)

or
(b3) a combination of a moiety of the structure (2) and a moiety of the structure (3),
in which (i) Y represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) R$^1$ and R$^2$, which may be the same or different, each represent an organic group that is inert to isocyanate groups at temperatures of 100° C. or less; (iv) R$^3$ and R$^4$, which may be the same or different, each represent hydrogen or an organic group that is inert to isocyanate groups at temperatures of 100° C. or less; and (v) each "———•" represents a linkage to another portion of the ethylenically unsaturated compound. In some implementations, at least one carbon-carbon double bond of the ethylenically unsaturated compound is present as a $=CH_2$ end group with no further substituent on the carbon thereof.

As indicated, each X, which may be the same or different, represents an alkoxy group or an organic group that is inert towards isocyanate groups at temperatures of 100° C. or less, with the proviso that at least one X represents an alkoxy group. As used herein, the phrase that a group is "inert towards isocyanate groups at temperatures of 100° C. or less" means that the group is inert towards isocyanate groups at such temperatures when, as is depicted in the various structures illustrated herein, the group is covalently attached to another atom in the structure being discussed. As will be appreciated, Zerevitinov-active hydrogens are not inert towards isocyanate groups at such temperatures and, as such, any organic group described in this specification as being inert towards isocyanate groups at such temperatures does not include a Zerevitinov-active hydrogen (Zerevitinov-active hydrogen is defined in Rompp's Chemical Dictionary (Rommp Chemie Lexikon), 10th ed., Georg Thieme Verlag Stuttgart, 1996). Generally, groups with Zerevitinov-active hydrogen are understood in the art to mean hydroxyl (OH), amino ($NH_x$), and thiol (SH) groups.

In some implementations, each $R^1$ and $R^2$ in structures (2) and (3), which may be the same or different, represents an alkyl group, such as an alkyl group having 1 to 9 or 1 to 4 carbon atoms, such as where each $R^1$ and $R^2$ in structures (2) and (3), which may be the same or different, represents a methyl group, an ethyl group, a propyl group or a butyl group. Moreover, in some implementations, each X in structure (1) represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two X's represent an alkoxy, such as methoxy, ethoxy, or propyloxy, group, or where each X represents an alkoxy, such as methoxy, ethoxy, or propyloxy group. In addition, in some implementations, Y in structure (1) comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

In addition, in some embodiments, the ethylenically unsaturated compound further comprises: (c) a segment of the structure:

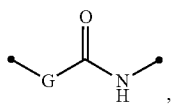

in which G is O, S, or NR in which R represents hydrogen or an organic group that is inert to isocyanate groups at temperatures of 100° C. or less, and each "———●" represents a linkage to another portion of the ethylenically unsaturated compound. In some embodiments, the ethylenically unsaturated compound has 1 to 4 such segments.

In some implementations, any of the ethylenically unsaturated compounds described in this specification (such as any of the ethylenically unsaturated compounds that include a moiety of the structure (3)) comprise a moiety of the structure 3A:

(3A)

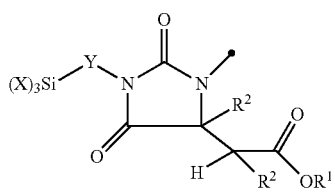

in which X, Y, $R^1$, $R^2$ and "———●" are each as described above with respect to structures (1)-(3). In some embodiments, the ethylenically unsaturated compound has 1 to 4 such moieties of structure 3A.

In some implementations, any of the ethylenically unsaturated compounds described in this specification (such as any of the ethylenically unsaturated compounds that include a moiety of the structure (3)) include the proviso that the ethylenically unsaturated compound has at least one, in some cases only one, moiety of the structure 3B:

(3B)

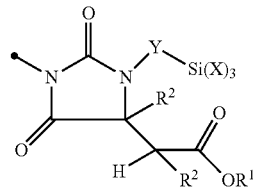

in which X, Y, $R^1$, $R^2$ and "———●" are each as described above with respect to structures (1)-(3).

In some implementations, any of the ethylenically unsaturated compounds described in this specification (such as any of the ethylenically unsaturated compounds that include a moiety of the structure (2)) include the proviso that the ethylenically unsaturated compound has at least one, in some cases only one, moiety of the structure 2A:

(2A)

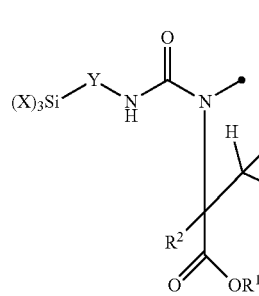

in which X, Y, $R^1$, $R^2$ and "———●" are each as described above with respect to structures (1)-(3).

In some implementations, any of the ethylenically unsaturated compounds described in this specification (such as any of the ethylenically unsaturated compounds that include a moiety of the structure (2)) include the proviso that the ethylenically unsaturated compound has 0 or 2 to 4 or 2 moieties of the structure 2B:

(2B)

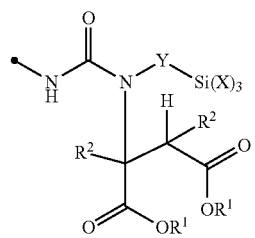

in which X, Y, $R^1$, $R^2$ and "———●" are each as described above with respect to structures (1)-(3).

In some implementations, the ethylenically unsaturated compound of this specification has the structure (4A) or the structure (4B):

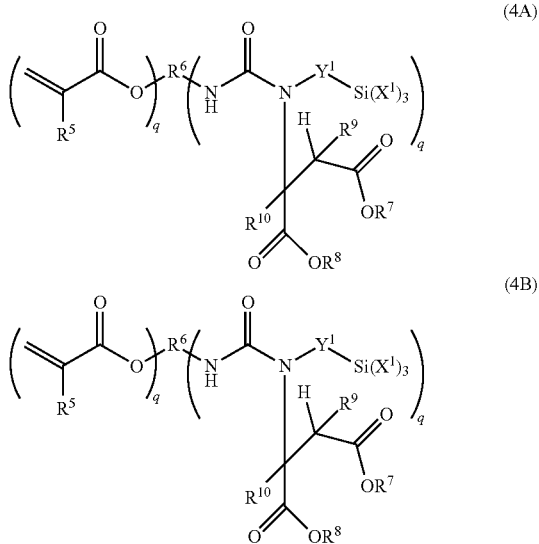

(4A)

(4B)

in which (i) $R^5$ represents H or $CH_3$, (ii) $R^6$ represents a group comprising a branched or straight chain alkylene radical, such as where the branched or straight chain alkylene radical has at least 2, 2 to 8, or 2 to 4 carbon atoms, (iii) $Y^1$ represents a linear or branched linking group comprising 1 or more carbon atoms, (iv) $R^7$ and $R^8$, which may be the same or different, represents an organic group that is inert towards isocyanate groups at temperatures of 100° C. or less, (v) $R^9$ and $R^{10}$, which may be the same or different, each represent hydrogen or an organic group that is inert to isocyanate groups at temperatures of 100° C. or less, (vi) each $X^1$, which may be the same or different, represents an alkoxy group or an organic group that is inert towards isocyanate groups at temperatures of 100° C. or less, with the proviso that at least one $X^1$ represents an alkoxy group, and (vii) each q, which can be same or different, is an integer having a value of 1 to 6, such as 1 to 3, such as 1.

In some implementations of the ethylenically unsaturated compound represented by structure (4A) or by the structure (4B), $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanatoethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof. As used herein, the term "polyisocyanate" encompasses diisocyanates and isocyanates having an isocyanate functionality of greater than 2.0.

In some implementations of the ethylenically unsaturated compound represented by the structure (4A) or by the structure (4B), $R^6$ does not include a carbamate segment.

In some implementations of the ethylenically unsaturated compound represented by structure (4A) or by the structure (4B), $R^6$ is:

a linear or branched alkylene radical consisting of carbon and hydrogen, such as

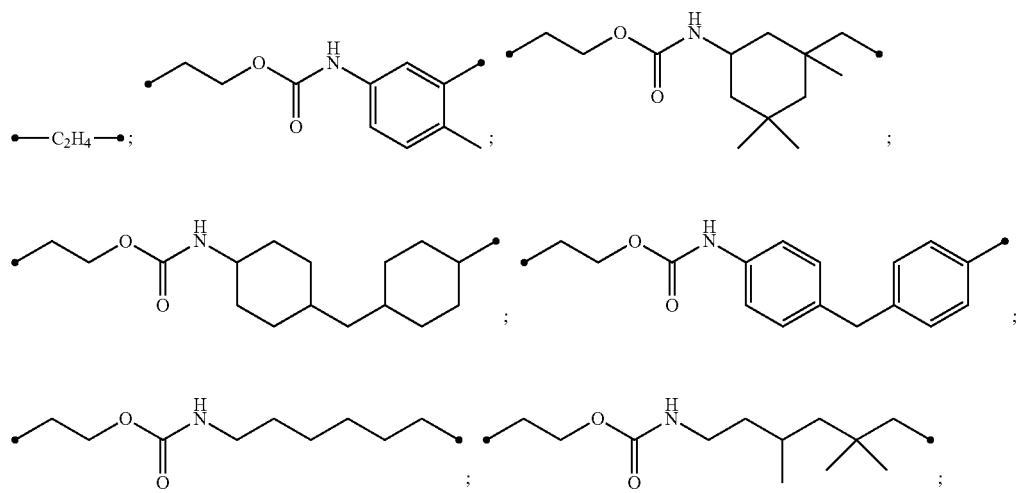

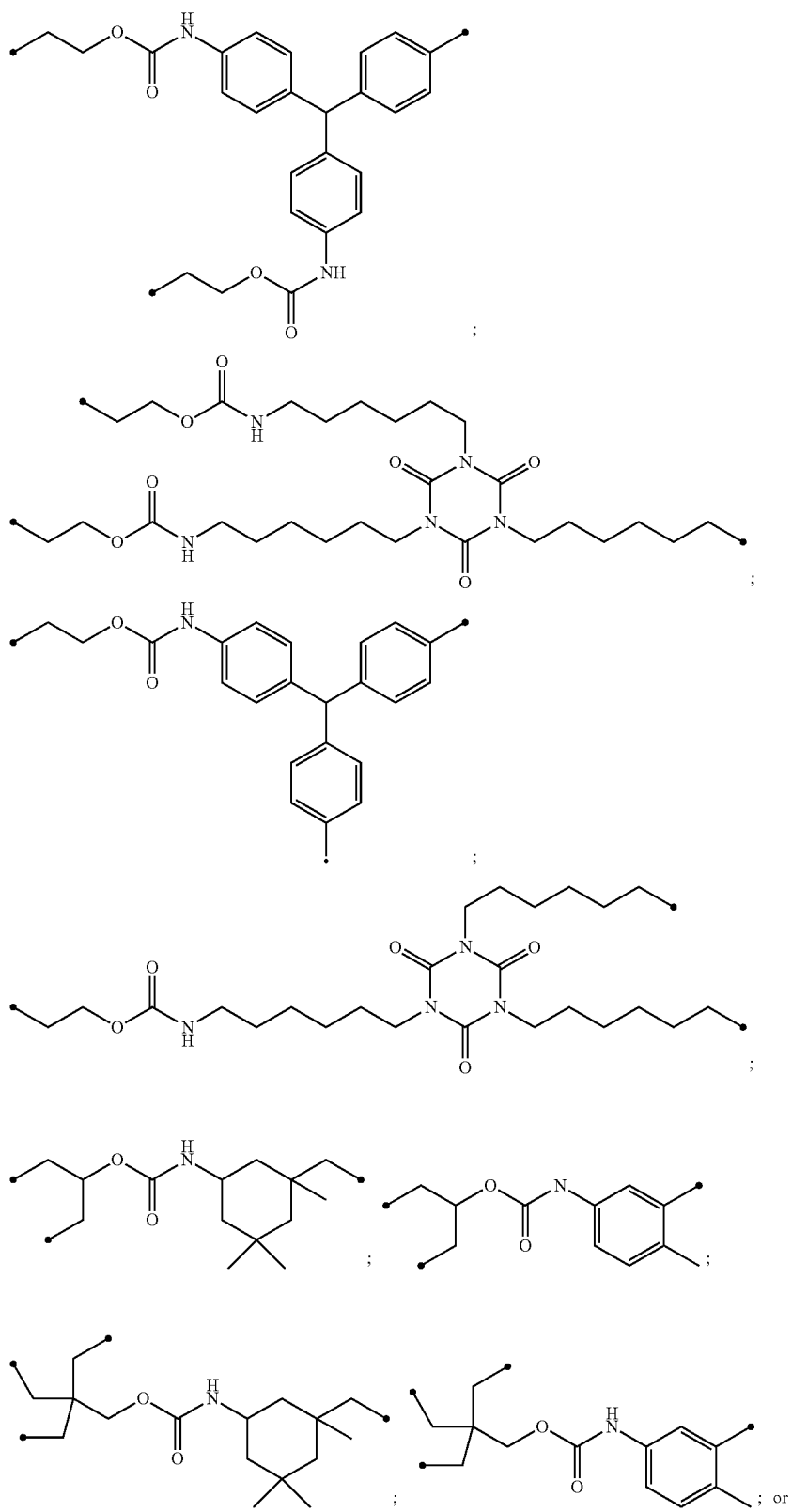

a combination of any two or more thereof, in which each "———•" represents a linkage to another portion of the ethylenically unsaturated compound provided that each "———•" that is represented to the left of an oxygen represents a linkage to a

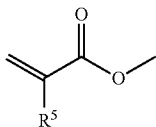

segment in structure (4A) or in structure (4B).

In addition, in some implementations of the ethylenically unsaturated compound represented by structure (4A) or by the structure (4B), $R^7$ and $R^8$ in structure (4A) and in structure (4B), which may be the same or different, represents an alkyl group, such as an alkyl group having 1 to 9 or 1 to 4 carbon atoms, such as where $R^7$ and $R^8$, which may be the same or different, represents a methyl group, an ethyl group, a propyl group or a butyl group. Moreover, in some implementations, each $X^1$ in structure (4A) and in structure (4B) represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group. In addition, in some implementations, $Y^1$ in structure (4A) and in structure (4B) comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

In other implementations, the ethylenically unsaturated compound of this specification has the structure (5):

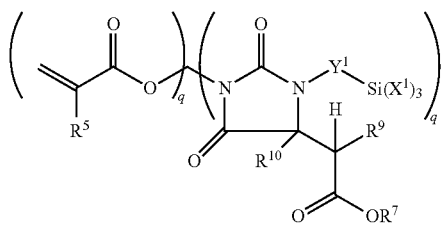

(5)

wherein q, $R^5$, $R^6$, $R^7$, $R^9$, $R^{10}$, $Y^1$ and $X^1$ are each as described above with reference to structures (4A) and (4B).

In yet other implementations, the ethylenically unsaturated compound of this specification has the structure (6):

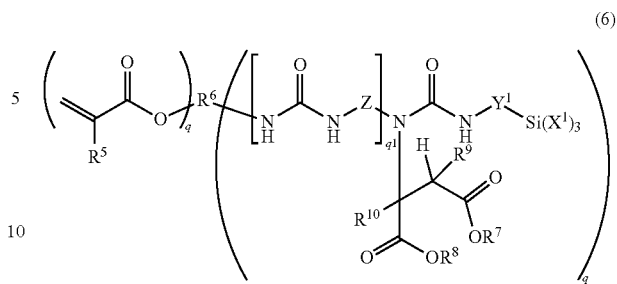

(6)

wherein q, $R^5$, $R^6$, $R^7$, $R^9$, $R^{10}$, $Y^1$ and $X^1$ are each as described above with reference to structures (4A) and (4B), q1 is 0 or 1, and Z represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group.

In some implementations of the ethylenically unsaturated compound represented by structure (6), Z is:

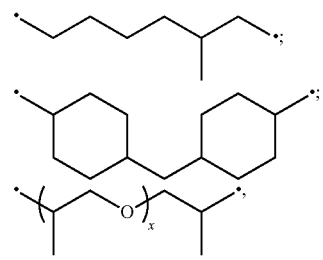

in which x has a value of 3 to 19;

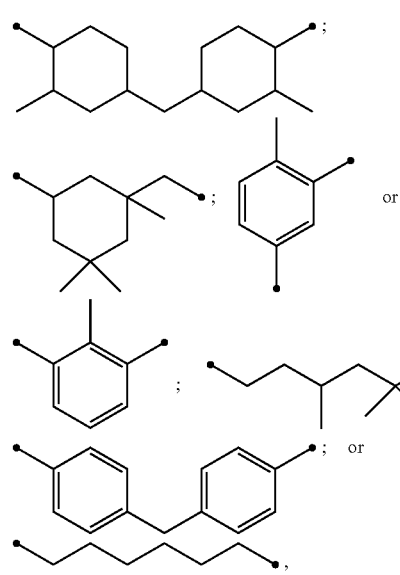

in which each "———•" represents a linkage to another portion of the ethylenically unsaturated compound.

In still other implementations, the ethylenically unsaturated compound of this specification has the structure (7):

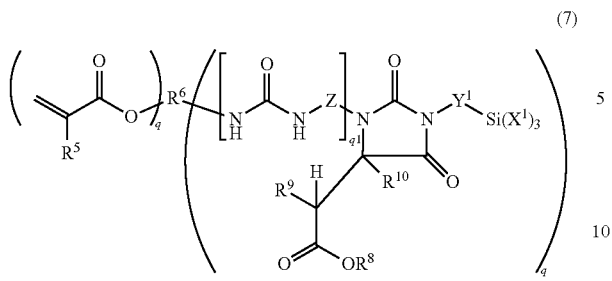

(7)

wherein q, q1, $R^5$, $R^6$, $R^8$, $R^9$, $R^{10}$, Z, $Y^1$, and $X^1$ are each as described above with reference to structure (6).

In further implementations, the ethylenically unsaturated compound of this specification has the structure (8):

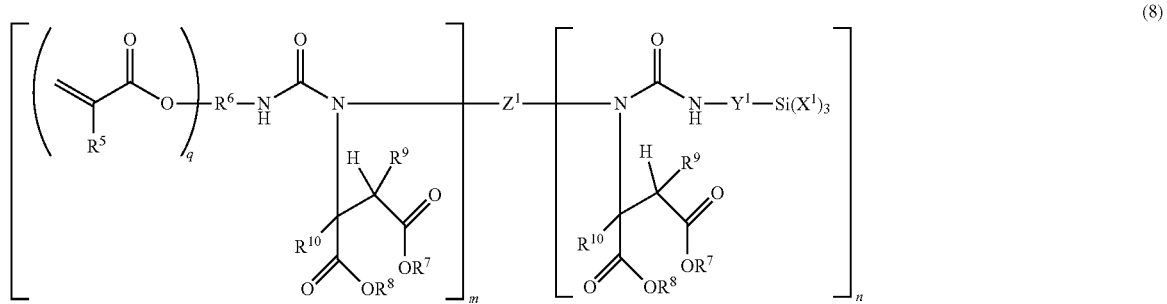

(8)

wherein q, $R^5$, $R^6$, $R^7$, $R^8$, $R^9$, $R^{10}$, $Y^1$, and $X^1$ are each as described above with reference to structure (6), and $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, and (vii) m and n, which may be the same or different, are each an integer having a value of 1 to 4. In some implementations, m+n is no more than 4, such as where m is 1 or 2, such as 1, and n is 1 or 2, such as 1. In some implementations, $Z^1$ in structure (8) is:

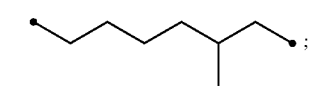

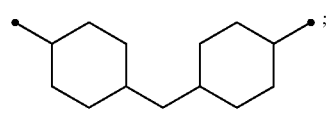

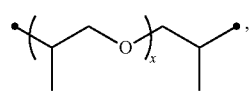

in which x has a value of 3 to 19;

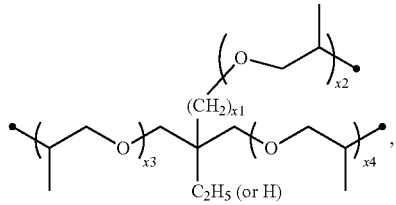

in which each X1, X2, X3 and X4, which may be the same or different, has a value of 1 to 10, provided that the structure has a molecular weight of 200 to 1500;

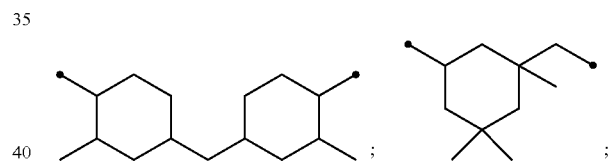

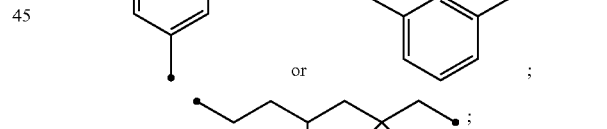

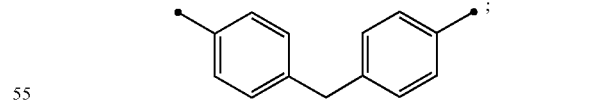

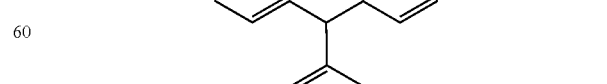

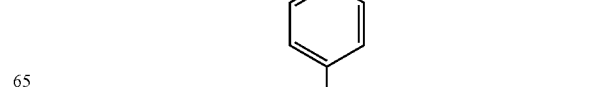

-continued

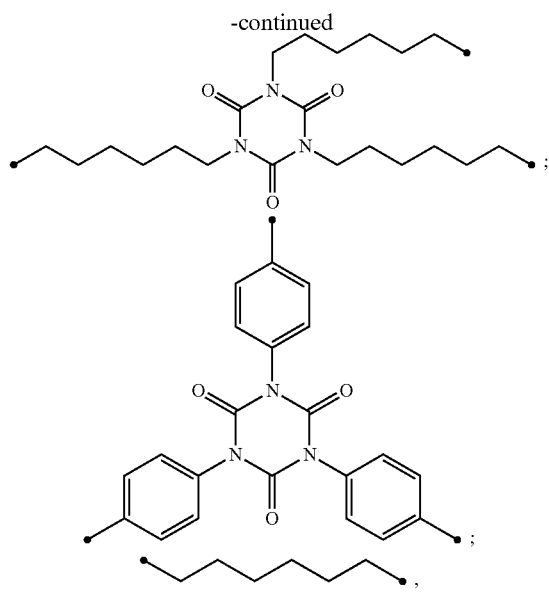

in which each "———●" represents a linkage to another portion of the ethylenically unsaturated compound.

In other further implementations, the ethylenically unsaturated compound of this specification has the structure (9):

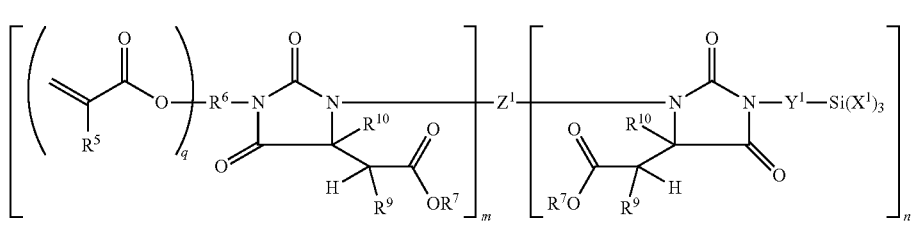

wherein q, $R^5$, $R^6$, $R^7$, $R^9$, $R^{10}$, Y, $Z^1$, $X^1$, m and n are each as described above with reference to structure (8).

In some implementations, any of the ethylenically unsaturated compounds of this specification have a silane content (determined as described in the Examples section of this specification) of more than 50 mmol, such as more than 160 mmol, more than 180, or more than 200 mmol, per 100 gram of the ethylenically unsaturated compound. In addition, in some implementations, any of the ethylenically unsaturated compound of this specification have a silane content (determined 50 to 300 mmol or 60 to 250 mmol, per 100 gram of the ethylenically unsaturated compound. In some implementations, any of the ethylenically unsaturated compounds of this specification have a silane content of more than 160 mmol, more than 180, or more than 200 mmol, per 100 gram of the ethylenically unsaturated compound.

Some implementations of the ethylenically unsaturated compound of this specification are the reaction product of reactants comprising: (a) an isocyanate-functional ethylenically unsaturated compound; and (b) an aspartate silane. In some these implementations, the aspartate silane has the structure:

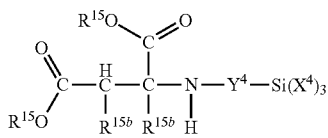

in which each $R^{15}$ and each $X^4$, which may be the same or different, represents an organic group that is inert with respect to isocyanate groups at temperatures of 100° C. or less, with the proviso that at least one $X^4$ represents an alkoxy group, $Y^4$ represents a linear or branched linking group comprising 1 or more carbon atoms, and each $R^{15b}$, which may be the same or different, represents hydrogen or an organic group which is inert towards isocyanate groups at temperatures of 100° C. or less.

The foregoing aspartate silane may comprise a reaction product of reactants comprising: (i) an aminoalkyl alkoxysilane of the formula

and (ii) a maleic or fumaric acid ester of the formula

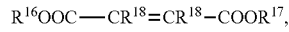

in which $R^{16}$ and $R^{17}$ represent identical or different organic groups which are isocyanate-inert below 100° C., such as where $R^{16}$ and $R^{17}$ represent identical or different alkyl groups having 1 to 4 carbon atoms, each $R^{18}$, which may be the same or different, represents hydrogen or an organic group which is isocyanate-inert below 100° C. each $X^5$ represents identical or different organic groups which are isocyanate-inert below 100° C., with the proviso that at least one $X^5$ is an alkoxy group, such as where each $X^5$ represents an identical or different alkyl or alkoxy group having 1 to 4 carbon atoms, with the proviso that at least one $X^5$ is an alkoxy group, and n is an integer having a value of 2 to 4, such as 3.

Specific examples of suitable aminoalkyl alkoxysilanes include, without limitation, 2-aminoethyl-dimethylmethoxysilane, 3-aminopropyl-trimethoxysilane, 3-aminopropyl-triethoxysilane, 3-aminopropyl-methyl-diethoxysilane, or a mixture of any two or more thereof. Specific examples of suitable maleic or fumaric acid esters include, without limitation, maleic acid dimethyl ester, maleic acid diethyl ester, maleic acid di-n-butyl ester, fumaric acid dimethyl ester, fumaric acid diethyl ester, fumaric acid di-n-butyl ester, or a mixture of any two or more thereof.

The reaction of the maleic or fumaric acid ester with the aminoalkyl alkoxysilane may be carried out within a temperature range of, for example, 0° C. to 100° C. The quantity of acid ester and aminoalkyl alkoxysilane may be chosen so that the starting compounds are used in a molar ratio of acid ester to aminoalkyl alkoxysilane of 0.8 to 1.2:1, such as 1.0 to 1.2:1 or, in some cases, 1.01 to 1.2:1. The reaction may be carried out with or without a solvent, such as dioxane. The reaction may, of course, be carried out with mixtures of different 3-aminoalkyl alkoxysilanes and mixtures of fumaric and/or maleic acid esters.

In some cases, the isocyanate-functional ethylenically unsaturated compound reacted with the aspartate silane to produce the ethylenically unsaturated compound has the structure:

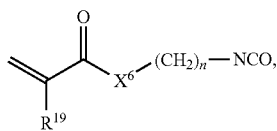

wherein $R^{19}$ represents H or $CH_3$, $X^6$ represents O, S, NH, or NR' in which R' is an alkyl radical, such as an alkyl radical having 1 to 6 carbon atoms, and n is an integer having a value of 2 to 8, such as 2 to 4.

Specific examples of suitable isocyanate-functional ethylenically unsaturated compounds include, without limitation, isocyantoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Other suitable isocyanate-functional ethylenically unsaturated compounds, which may be used in combination with any one or more of the isocyanate-functional ethylenically unsaturated compounds previously mentioned, are the reaction products of reactants comprising: (i) a monohydroxy-substituted monofunctional or multifunctional (meth)acrylate, and (ii) a polyisocyanate. Specific examples of suitable monohydroxy-substituted monofunctional and/or multifunctional (meth)acrylates include, without limitation, 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, hydroxyethyl caprolactone (meth)acrylate, caprolactone (meth)acrylate, polypropylene glycol mono acrylate, polyethylene glycol mono acrylate, bis(methacryloyloxy)propanol, bis(acryloyloxy)propanol, pentaerythritol triacrylate, or a combination of any two or more thereof. Specific examples of suitable polyisocyanates for use in reacting with the monohydroxy-substituted monofunctional and/or multifunctional (meth)acrylate to form the isocyanate-functional ethylenically unsaturated compound include, without limitation, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof.

The reaction of the monohydroxy-substituted monofunctional and/or multifunctional (meth)acrylate with the polyisocyanate may be carried out within a temperature range of, for example, 25° C. to 100° C. The reaction may, if desired, be carried out in the presence of a catalyst. Suitable catalysts include, without limitation, organic metal catalysts, amine catalysts, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, 1,4-diazacyclo[2.2.2]octane (DABCO), dimethylethanolamine (DMEA), or a combination of any two or more of the foregoing. The quantity of monohydroxy-substituted monofunctional and/or multifunctional (meth)acrylate with the polyisocyanate is generally chosen so that the starting compounds are used in a molar ratio of monohydroxy-substituted monofunctional and/or multifunctional (meth)acrylate to polyisocyanate of 0.1:1 to 2:1, such as 0.5:1 to 1.5:1 or, in some cases, 1:1. The reaction may be carried out solvent-free or in the presence of suitable solvents such as propanolmethylene chloride, chloroform, tetrahydrofuran (THF), toluene, xylene, ethyl acetate, tetrachloroethane, dioxane and mixtures of any two or more thereof. The reaction may, of course, be carried out with mixtures of different monohydroxy-substituted monofunctional and/or multifunctional (meth)acrylates and different polyisocyanates.

The reaction of the isocyanate-functional ethylenically unsaturated compound and the aspartate silane to produce the ethylenically unsaturated compound of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated compound comprises an aspartate group from the aspartate silane, as is depicted, for example, by structures (4A) and (4B) described earlier.

In some implementations, the resulting aspartate group-containing ethylenically unsaturated compound is subjected to further processing to convert the aspartate group to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. The resulting ethylenically unsaturated compound comprises a hydantoin group, as is depicted, for example, by structure (5) described earlier.

As a result, this specification also relates to methods for making an ethylenically unsaturated compound. The method comprises reacting an isocyanate-functional ethylenically unsaturated compound with an aspartate silane, optionally in the presence of a catalyst, to produce an ethylenically unsaturated compound comprising an aspartate group. In these methods, the aspartate silane has the structure:

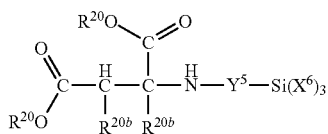

in which each $R^{20}$, which may be the same or different, represents an organic group that is inert with respect to isocyanate groups at temperatures of 100° C. or less, each $R^{20b}$, which may be the same or different, represents hydrogen or an organic group which is inert towards isocyanate groups at temperatures of 100° C. or less, each $X^6$ represents an alkoxy group or an organic group that is inert with respect to isocyanate groups at temperatures of 100° C. or less, with the proviso that at least one $X^6$ represents an alkoxy group, and $Y^5$ represents an organic group that is inert with respect to isocyanate groups at temperatures of 100° C. or less. In some implementations, the method further comprises converting the aspartate group to a hydantoin group, wherein such conversion is carried out optionally in the presence of a catalyst, to produce an ethylenically unsaturated compound comprising a hydantoin group.

Other implementations of the ethylenically unsaturated compound of this specification are the reaction product of reactants comprising: (a) a polyisocyanate; (b) a hydroxyl-functional ethylenically unsaturated compound; and (b) an aspartate silane of the type described above. In these implementations, suitable polyisocyanates include, for example, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl) fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof. In addition, in these implementations, suitable hydroxyl-functional ethylenically unsaturated compounds include, for example, hydroxyethyl (meth)acrylate, hydroxypropyl (meth)acrylate, hydroxybutyl (meth)acrylate, hydroxypentyl (meth)acrylate, hydroxyhexyl (meth)acrylate, or a combination of any two or more thereof.

Therefore, this specification also relates to methods for making an ethylenically unsaturated compound that comprise reacting a diisocyanate, a hydroxyl-functional ethylenically unsaturated compound, and an aspartate silane, optionally in the presence of a catalyst, to produce an ethylenically unsaturated compound comprising an aspartate group. In these methods, the aspartate silane has the structure:

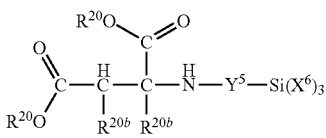

in which each $R^{20}$, which may be the same or different, represents an organic group that is inert with respect to isocyanate groups at temperatures of 100° C. or less, each $R^{201}$, which may be the same or different, represents hydrogen or an organic group which is inert towards isocyanate groups at temperatures of 100° C. or less, each $X^6$ represents an alkoxy group or an organic group that is inert with respect to isocyanate groups at temperatures of 100° C. or less, with the proviso that at least one $X^6$ represents an alkoxy group, and $Y^5$ represents an organic group that is inert with respect to isocyanate groups at temperatures of 100° C. or less. In some implementations, the method further comprises converting the aspartate group to a hydantoin group, wherein such conversion is carried out optionally in the presence of a catalyst, to produce an ethylenically unsaturated compound comprising a hydantoin group.

In other implementations, the ethylenically unsaturated compound of this specification comprises the reaction product of reactants comprising: (a) a primary amine-containing aspartate and/or a polyaspartate amine; (b) isocyanate-functional ethylenically unsaturated compound; and (c) an isocyanate-functional silane.

Suitable primary amine-containing aspartates for use in preparing such ethylenically unsaturated compounds include, without limitation, those having the structure:

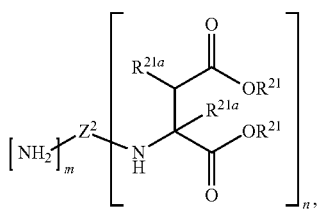

in which $Z^2$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_3$-$C_6$ cycloalkylene group, each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$ is a methyl group, an ethyl group, a propyl group or a butyl group, each $R^{21}$, which may be the same or different, represents hydrogen or an organic group that is inert to isocyanate groups at temperatures of 100° C. or less, and m and n, which may be the same or different, are each an integer having a value of 1 to 4, such as where m+n is no more than 4, such as where m is 1 or 2, such as 1, and n is 1 or 2, such as 1.

Suitable polyaspartate amines for use in preparing such ethylenically unsaturated compounds include, without limitation, those having the structure:

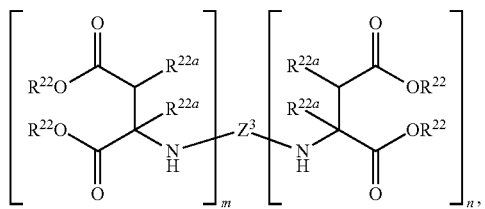

in which $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, each $R^{22a}$, which may be the same or different, represents a hydrogen or an organic group that is inert towards isocyanate groups at temperatures of 100° C. or less, each $R^{22}$, which may be the same or different, represents an organic group that is inert towards isocyanate groups at temperatures of 100° C. or less, such as where each $R^{22}$ represents the same or different alkyl group, such as an alkyl group having 1 to 9 or 1 to 4 carbon atoms, such as where each $R^{22}$, methyl group, an ethyl group, a propyl group or a butyl group, and m and n, which may be the same or different, are each an integer having a value of 1 to 4, such as where m+n is no more than 4, such as where m is 1 or 2, such as 1, and n is 1 or 2, such as 1.

Such primary amine-containing aspartates and polyaspartate amines can be produced by reacting a primary polyamine corresponding to the formula: $(NH_2)_m Z^3 (NH_2)_n$, in which $Z^3$ is a hydrocarbon group that optionally contains isocyanate-inert oxygen, nitrogen, sulfur, or a combination thereof, and m+n is an integer with a value of at least 2, such as 2 to 4, with a maleic or fumaric acid ester of the formula (with both isomers as represented by wavy bonds)

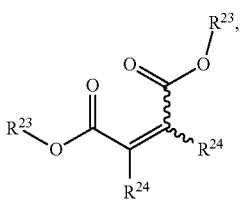

in which each $R^{23}$, which may be the same or different, represents an organic groups that is inert towards isocyanate groups at temperatures of 100° C. or less and each $R^{24}$, which may be the same or different, represents hydrogen or an organic groups that is inert towards isocyanate groups at temperatures of 100° C. or less.

Specific examples of suitable primary polyamines include, without limitation, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, 2,5-diamino-2,5-dimethylhexane, 2,2,4-and/or 2,4,4-trimethyl-1,6-diaminohexane, 1,11-diaminoundecane, 1,12-diaminododecane, bis-(3-aminopropyl) ether, 1,2-bis-(3-aminopropyloxy)ethane, 1,3-bis-(3-aminopropyloxy)-2,2'-dimethylpropane, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 1-amino-3,3,5-trimethyl-5-aminomethyl-cyclohexane, 2,4- and/or 2,6-hexahydrotoluylene diamine, 2,4'-and/or 4,4'-diamino-dicyclohexyl methane, 3,3'-dimethyl-4,4'-diaminodicyclohexyl methane, propane-1,2,3-triamine, pentane-1,3,5-triamine, benzene-1,3,5-triamine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, 2,4'-and/or 4,4'-diaminodiphenyl methane, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, 1,4-bis(aminoethylpiperazine), 1,4-bis(aminopropylpiperazine), 2,6-diaminopyridine, and bis(3,4-diaminophenyl)sulfone, relatively high molecular weight polyether polyamines containing aliphatically bound primary amino groups (such as the JEFFAMINE® products commercially available from Huntsman Corp.), and combinations of any two or more of any of the foregoing.

Specific examples of suitable maleic or fumaric acid esters include, without limitation, dimethyl, diethyl and di-n-butyl esters of maleic acid and fumaric acid and the corresponding maleic or fumaric acid esters substituted by methyl in the 2- and/or 3-position.

The preparation of the primary amine-containing aspartate from the above mentioned starting materials may be carried out, for example, at a temperature of −20° C. to 100° C. using the starting materials in proportions such that 0.8+m/n to 1.2+m/n, such as 1+m/n primary amino group is present for each olefinic double bond, wherein m and n are as defined above with respect to the formula of the primary polyamine. The reaction may be carried out solvent-free or in the presence of suitable solvents such as methanol, ethanol, propanol, dioxane and mixtures of such solvents. The reaction may optionally be carried out in the presence of a catalyst such as an organic metal catalyst where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate or a combination of any two or more of the foregoing.

As indicated, according to some implementations, the ethylenically unsaturated compound of this specification comprises the reaction product of reactants comprising, in addition to the afore-described a primary amine-containing aspartate and/or polyaspartate amine, also (b) an isocyanate-functional ethylenically unsaturated compound; and (c) an isocyanate-functional silane. Suitable isocyanate-functional ethylenically unsaturated compounds for this purpose include, without limitation, those having the structure:

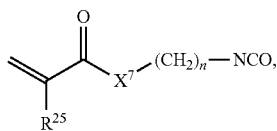

wherein $R^{25}$ represents H or $CH_3$, $X^7$ represents O, S, NH, or NR' in which R' is an alkyl radical, such as an alkyl radical having 1 to 6 carbon atoms, and n is an integer having a value of 2 to 8, such as 2 to 4.

Specific examples of suitable such isocyanate-functional ethylenically unsaturated compounds include, without limitation, isocyantoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Other suitable isocyanate-functional ethylenically unsaturated compounds, which may be used in combination with any one or more of the isocyanate-functional ethylenically unsaturated compounds previously mentioned, are the reaction products of reactants comprising: (i) a monohydroxy-substituted monofunctional or multifunctional (meth)acrylate, and (ii) a diisocyanate. Specific examples of suitable monohydroxy-substituted monofunctional and/or multifunctional (meth)acrylates include, without limitation, 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, hydroxyethyl caprolactone (meth)acrylate, caprolactone (meth)acrylate, polypropylene glycol mono acrylate, polyethylene glycol mono acrylate, bis(methacryloyloxy)propanol, bis(acryloyloxy) propanol, pentaerythritol triacrylate, or a combination of any two or more thereof. Specific examples of suitable polyisocyanates for use in reacting with the monohydroxy-substituted monofunctional and/or multifunctional (meth)acrylate to form the isocyanate-functional ethylenically unsaturated compound include, without limitation, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof.

The reaction of the monohydroxy-substituted monofunctional and/or multifunctional (meth)acrylate with the polyisocyanate may be carried out within a temperature range of, for example, 25° C. to 100° C. The reaction may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. The quantity of monohydroxy-substituted monofunctional and/or multifunctional (meth) acrylate with the polyisocyanate is generally chosen so that the starting compounds are used in a molar ratio of monohydroxy-substituted monofunctional and/or multifunctional (meth)acrylate to polyisocyanate of 0.1:1 to 2:1, such as 0.5:1 to 1.5:1 or, in some cases, 1:1. The reaction may be carried out solvent-free or in the presence of suitable solvents such as methylene chloride, chloroform, THF, toluene, xylene, ethyl acetate, tetrachloroethane, dioxane and mixtures of any two or more thereof. The reaction may, of course, be carried out with mixtures of different monohydroxy-substituted monofunctional and/or multifunctional (meth)acrylates and different polyisocyanates.

Suitable isocyanate-functional silanes include, without limitation, those of the structure: $OCN-Y^6-Si(X^8)_3$, in which $Y^6$ represents a linear or branched linking group comprising 1 or more carbon atoms, such as where $Y^6$ comprises a linear or branched alkylene radical having 1 to 8 carbon atoms, such as a linear alkylene radical having 2 to 4 or, in some cases, 3 carbon atoms, or a branched alkylene radical having 5 to 6 carbon atoms, and each $X^8$, represents an alkoxy group or an organic group that is inert towards isocyanate groups at temperatures of 100° C. or less, with the proviso that at least one $X^8$ represents an alkoxy group, such as where each $X^8$ represents an identical or different alkyl, acyloxy, or alkoxy group, such as an identical or different alkyl, acyloxy, or alkoxyl group having 1 to 9 or 1 to 4 carbon atoms, with the proviso that at least one $X^8$ represents an alkoxy group, such as where at least two $X^8$'s represent an alkoxy, such as methoxy, ethoxy, or propyloxy, group, or where each $X^8$ represents an alkoxy, such as methoxy, ethoxy, or propyloxy group.

Specific examples of suitable isocyanate-functional silanes include, without limitation, 3-isocyanatopropyl-methyldimethoxysilane, 3-isocyanatopropyl-trimethoxysilane, 3-isocyanatopropyl-triethoxysilane, as well as mixtures of any two or more thereof.

The reaction of the primary amine-containing aspartate and/or the polyaspartate amine, the isocyanate-functional ethylenically unsaturated compound, and the isocyanate-functional silane isocyanate-functional to produce the ethylenically unsaturated compound of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated compound comprises an aspartate group, as is depicted, for example, by structures (6) and/or (8) described earlier.

In some implementations, the resulting aspartate group-containing ethylenically unsaturated compound is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated compound comprises a hydantoin group, as is depicted, for example, by structures (7) and/or (9) described earlier.

As a result, this specification also relates to methods for making an ethylenically unsaturated compound that comprise reacting (a) a primary amine-containing aspartate and/or a polyaspartate amine, each as described above; (b) an isocyanate-functional ethylenically unsaturated compound as described above; and (c) an isocyanate-functional silane as described above, optionally in the presence of a catalyst, to produce an ethylenically unsaturated compound comprising an aspartate group. In some implementations, the method further comprises converting at least some aspartate groups to a hydantoin group, wherein such conversion is carried out optionally in the presence of a catalyst, to produce an ethylenically unsaturated compound comprising a hydantoin group.

This specification also relates to use of the various ethylenically unsaturated compounds described above. More particular, in some respects, this specification relates to the use of such compounds in, for example, coating compositions, such as radiation curable coating compositions, including such composition that are suitable for application to optical glass fiber substrates. In particular, the ethylenically unsaturated compounds described in this specification are currently believed to be particularly beneficial functioning as an adhesion promoting compound in such compositions. In fact, it has been surprisingly observed that at least some embodiments of such ethylenically unsaturated compounds, while being readily and efficiently synthesized, can result in cured coatings exhibiting drastically improved adhesion performance relative to similar coatings that utilize other adhesion promoters, including adhesion promoters conventionally used in radiation curable coating compositions suitable for application to optical glass fiber substrates.

Some aspects of this specification, therefore, relate to radiation curable coating compositions that comprise an ethylenically unsaturated compound as described above. In some implementations, such ethylenically unsaturated compound is present is an amount of 0.01 to 99% by weight, 0.1 to 20% by weight, 1 to 50% by weight, 5 to 30% by weight, 40 to 70% by weight, 60 to 80% by weight, 65 to 99% by weight, or 0.01 to 20% by weight, based on the total weight of solids in the radiation curable coating composition.

In these implementations, the radiation curable coating composition may include other compounds having radiation-curable groups, such other radiation-curable composition may be used in amounts of up to, for example, 99% by weight, 90% by weight, 75% by weight, or 70% by weight, based on the total weight of solids in the radiation curable coating composition. Examples of such other radiation-curable compounds are oligomers and polymers including, without limitation, polyether (meth)acrylates, polyester (meth)acrylates, urethane (meth)acrylates, epoxy (meth)acrylates, and the known reactive diluents from radiation curing (cf. Rompp Lexikon Chemie, p. 491, $10^{th}$ Ed. 1998, Georg-Thieme-Verlag, Stuttgart).

In addition, in some implementations, the radiation curable coating composition comprises an ethylenically unsaturated oligomer. As used herein, "oligomer" means a molecule of intermediate relative molecular mass, the structure of which comprises a plurality of units derived, actually or conceptually, from molecules of lower relative molecular mass. In some implementations, the reactive oligomers described in this specification have a number average molecular weight (Mn) of 1000 g/mol to 35,000 g/mol, 1000 g/mol to 30,000 g/mol, 1000 g/mol to 25,000 g/mol, 1000 g/mol to 20,000 g/mol, 2,200 to 10,000 g/mol, or 2,200 to 5,500 g/mol, as measured by size exclusion chromatography (SEC). The ethylenically unsaturated oligomers comprise at least one ethylenically unsaturated group, in some case, 2 or more ethylenically unsaturated groups, per molecule. As used herein, the molecular weight values measured by size exclusion chromatography (SEC) are measured using a Waters GPC (Gel Permeation Chromatography) system with refractive index (RI) detector, a photodiode array detector, in which: (a) for chromatographic separation, chromatographic Size Exclusion columns: 3×7.8 mm×300 mm TSK-GEL MULTIPORE HXL-M, 5 m, TosoHaas or equivalent, are used; (b) detectors and columns are operated at 40° C.; (c)

polystyrene molecular weight standards are used to establish a calibration curve; (d) prior to conducting SEC, each respective oligomer and polystyrene molecular weight standard is dissolved at a concentration ranging from 0.5 to 10 mg/ml in high purity grade tetrahydrofuran (THF) containing BHT stabilizer, in which this THF solution is also used as an eluent in SEC analysis at a flow rate of 1.0 ml/min; (e) after completion of the dissolution, the relative molar mass and molar mass distribution are then determined with the above-referenced detection method using the refractive index and absorbance; (f) a calibration curve is generated with a series of polystyrene standards assigning each data slice a molecular weight and from which the relative molar mass and distribution can be obtained; and (g) the calibration curve, molecular mass averages, and the molar mass distributions are determined by integration of the whole refractive index chromatogram. Any polydispersity index (PDI) values reported herein refer to Mw/Mn.

In some implementations, the ethylenically unsaturated oligomer comprises a urethane (meth)acrylate oligomer, comprising a (meth)acrylate group, urethane groups and a backbone, such as where the backbone is derived from a polyol which has been reacted with an isocyanate, such as a polyisocyanate (such as a diisocyanate), and a hydroxyl group-containing (meth)acrylate. As used in this specification "(meth)acrylate" encompasses acrylates and methacrylates.

Examples of suitable polyols are, without limitation, polyether polyols, polyester polyols, polycarbonate polyols, polycaprolactone polyols, acrylic polyols, and mixtures of any two or more thereof. In some embodiments, the backbone of the urethane acrylate oligomer comprises a compound derived from a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In some embodiments, the particular block refers to a polyether block, which is derived from one or more of the polyols, such as polyether polyols, described elsewhere herein. In some embodiments, the block to which a mono-, di-, and/or tri-block copolymer refers is a polyether block which is derived from one or more of the polyols described elsewhere herein. In an embodiment, a monoblock copolymer is a copolymer having only an average of around 1, or from about 0.9 to less than 1.5 units of a particular block, such as a polyether block. In another embodiment, a diblock copolymer may be described as a copolymer having an average of around 2, or from at least 1.5 to less than 2.5 units of a particular block, such as a polyether block, and, in still another embodiment, a triblock copolymer may be described as a copolymer having an average of around 3, or from at least 2.5 to less than 3.5 units of a particular block, such as a polyether block. The number of polyether units in an oligomer may be determined by the number of polyether polyol molecules utilized in the synthesis of a single oligomer.

Suitable polyether polyols include, without limitation, polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds, such as cyclic ethers, including, without limitation, ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include, without limitation, combinations for producing a binary copolymer, such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random or block copolymers.

Suitable polyester diols include, without limitation, those obtained by reacting a polyhydric alcohol and a polybasic acid. Suitable polyhydric alcohols include, without limitation, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and mixtures of any two or more thereof. Suitable polybasic acids include, without limitation, phthalic acid, dimer acid, isophthalic acid, terephthalic acid, maleic acid, fumaric acid, adipic acid, sebasic acid, and mixtures of any two or more thereof.

Suitable polycarbonate polyols include, without limitation, polycarbonates of polytetrahydrofuran, poly(hexanediol carbonate), poly(nonanediol carbonate), poly(3-methyl-1,5-pentamethylene carbonate), and mixtures of any two or more thereof.

Suitable polycaprolactone diols include, without limitation, those having a melting point of 0° C. or higher that are obtained by reacting e-caprolactone and a diol compound. Suitable diol compounds include, without limitation, ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and mixtures of any two or more thereof.

Other suitable polyols include, without limitation, ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and mixtures of any two or more thereof. In some embodiments, these other polyols have an alkylene oxide structure in the molecule, such as polyols containing polytetramethylene glycol and copolymer glycols of butylene oxide and ethylene oxide.

In some implementations, the number average molecular weight derived from the hydroxyl number of the polyol is 50 to 15,000 g/mol, such as 1,000 to 8,000 g/mol.

Suitable polyisocyanates for preparing the urethane (meth)acrylate oligomer include, without limitation, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), as well as combinations of any two or more thereof.

Suitable hydroxyl group-containing (meth)acrylates for use in preparing the urethane (meth)acrylate oligomer, include, without limitation, (meth)acrylates derived from (meth)acrylic acid and epoxy and (meth)acrylates comprising alkylene oxides, such as, in particular, 2-hydroxy ethyl (meth)acrylate, 2-hydroxypropylacrylate and 2-hydroxy-3-oxyphenyl(meth)acrylate.

To prepare the urethane (meth)acrylate oligomer, the ratio of polyol, polyisocyanate, and hydroxyl group-containing (meth)acrylate is, in some implementations, determined so that 0.1 to 0.9 equivalents of a hydroxyl group included in the hydroxyl group-containing (meth)acrylate and 1.0 to 1.5 equivalents of total hydroxyl groups present from the polyol and the hydroxyl group-containing (meth)acrylate are used for one equivalent of isocyanate group included in the polyisocyanate.

In some embodiments, a urethanization catalyst is present during the reaction of the foregoing three components. Suitable such catalysts included, without limitation, copper naphthenate, cobalt naphthenate, zinc naphthenate, di-n-butyl tin dilaurate, bismuth neodecanoate, triethylamine, triethylenediamine-2-methyltriethyleneamine, as well as mixtures of any two or more thereof. In some cases, the urethanization catalyst is used in an amount of 0.01 to 1% by weight, based on the total weight of the reactants. In some cases, the reaction is carried out at a temperature of 10 to 90° C., such as 30 to 80° C.

In addition to, or in lieu of, the previously described urethane (meth)acrylate, other ethylenically unsaturated oligomers that can be used in embodiments of the radiation curable compositions of this specification include polyester (meth)acrylates, epoxy (meth)acrylates, polyamide (meth) acrylates, siloxane polymers having a (meth)acryloyloxy group, reactive polymers obtained by reacting (meth)acrylic acid and a copolymer of glycidyl methacrylate and other polymerizable compounds, as well as mixtures of any two or more thereof. In some implementations, the oligomer comprises a bisphenol A based acrylate oligomer, such as alkoxylated bisphenol-A-diacrylates and diglycidyl-bisphenol-A-diacrylates.

In some implementations, the oligomer may comprise an unsaturated urethane-free oligomer, such as an unsaturated urethane-free polyester acrylate oligomer and/or an unsaturated urethane-free alkyd acrylate oligomer. Examples of such oligomeric unsaturated compounds are acrylated epoxy resins, acrylated polyethers, and acrylated polyesters. Further examples of unsaturated oligomers are unsaturated polyester resins, such as those prepared from maleic acid, phthalic acid and one or more diols and which have molecular weights of greater than about 500. Unsaturated oligomers of this type are also known as prepolymers. Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and copolymers thereof, polybutadiene and butadiene copolymers, polyisoprene and isoprene copolymers, polymers and copolymers containing (meth) acrylic groups in side-chains, as well as mixtures of one or more than one such polymer. Illustrative examples of unsaturated carboxylic acids are acrylic acid, methacrylic acid, crotonic acid, itaconic acid, cinnamic acid, unsaturated fatty acids such as linolenic acid or oleic acid. Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin.

One or more of the aforementioned ethylenically unsaturated oligomers can be employed in compositions according to the present invention in any suitable amount and may be chosen singly or in combination of one or more of the types enumerated herein. In some implementations, the ethylenically unsaturated oligomer is present in an amount of 1 to 99% by weight, 5 to 95% by weight, 10 to 90% by weight, 10 to 80% by weight or 30 to 90% by weight, or 50 to 80% by weight, based on the total weight of solids in the radiation curable composition.

In addition, in some implementations, the radiation curable coating composition comprises a reactive diluent compound comprising one or more ethylenically unsaturated groups. Examples of such compounds include those containing one double bond, such as alkyl or hydroxyalkyl (meth)acrylates, suitable examples of which include, without limitation, methyl, ethyl, butyl, 2-ethylhexyl and 2-hydroxyethyl acrylate, isobornyl acrylate, methyl and ethyl methacrylate, lauryl-acrylate, ethoxylated nonyl-phenol acrylate, phenoxyethyl (meth)acrylate, diethylene-glycol-ethyl-hexyl acylate (DEGEHA), acrylonitrile, acrylamide, methacrylamide, N-substituted (meth)acrylamides, vinyl esters, such as vinyl acetate, styrene, alkylstyrenes, halostyrenes, N-vinylpyrrolidone, N-vinyl caprolactam, vinyl chloride, vinylidene chloride, and mixtures of any two or more thereof. Examples of such reactive diluent compounds that contain more than one double bond are ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, vinyl acrylate, divinyl benzene, divinyl succinate, diallyl phthalate, triallyl phosphate, triallyl isocyanurate, tris(2-acryloylethyl)isocyanurate, and mixtures of any two or more thereof.

In some embodiments, reactive diluent compound is present in an amount of 1 to 99% by weight, 5 to 90% by weight, 10 to 90% by weight, 10 to 80% by weight, 10 to 60% by weight, 10 to 40% by weight, or 10 to 30% by weight, based on the total weight of solids in the radiation curable composition.

In some implementations, the radiation curable compositions of this specification include a free-radical photoinitiator. More specifically, in some cases, the free-radical photoinitiator comprises an acylphosphine oxide, such as a bisacylphosphine oxide (BAPO) and/or monoacylphosphine oxide (MAPO), an α-hydroxy ketone, or a mixture of any two or more thereof.

In some cases, the photoinitiator comprises a bisacylphosphine oxide having the structure:

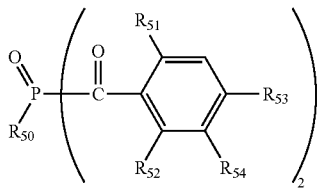

in which wherein $R_{50}$ is $C_1$-$C_{12}$ alkyl, cyclohexyl or phenyl, which is unsubstituted or is substituted by 1 to 4 halogen atoms, or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl. For example, in some implementations, $R_{50}$ is $C_2$-$C_{10}$ alkyl, cyclohexyl or phenyl which is unsubstituted or is substituted by 1 to 4 $C_1$-$C_4$ alkyl, Cl or Br. In another embodiment, $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. In some cases, $R_{50}$ is $C_4$-$C_{12}$ alkyl or cyclohexyl, $R_{51}$ and $R_{52}$ are each independently of the other $C_1$-$C_8$ alkyl or $C_1$-$C_8$ alkoxy and $R_{53}$ is hydrogen or $C_1$-$C_8$ alkyl. In some embodiments, $R_{51}$ and $R_{52}$ are $C_1$-$C_4$ alkyl or $C_1$-$C_4$ alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl, such as where $R_{51}$, $R_{52}$ and $R_{53}$ are methyl. Still another embodiment is where $R_{51}$, $R_{52}$ and $R_{53}$ are methyl and $R_{54}$ is hydrogen. In yet other embodiments, $R_{50}$ is $C_3$-$C_8$ alkyl, such as where $R_{51}$ and $R_{52}$ are methoxy, $R_{53}$ and $R_{54}$ are hydrogen and $R_{50}$ is isooctyl. In some cases, $R_{50}$ is isobutyl or phenyl. Specific examples of suitable bisacylphosphine oxides include, without limitation, bis(2,4,6-trimethylbenzoyl)-phenylphosphine oxide, bis(2,4,6-trimethylbenzoyl)-(2,4-bis-pentyloxyphenyl)phosphine oxide, or a mixture thereof.

Specific examples of suitable photoinitiator blends include, without limitation, those disclosed in U.S. Pat. Nos. 6,020,528 and 7,169,826. In some implementations, the photoinitiator blends comprises mixture of bis(2,4,6-trimethylbenzoyl)phenylphosphine oxide (CAS #162881-26-7) and 2,4,6,-trimethylbenzoylethoxyphenylphosphine oxide (CAS #84434-11-7) in a ratio by weight of, for example, 1:11 to 1:7. In other implementations, the photoinitiator blend comprises a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone (CAS #7473-98-5) in a weight ratios of, for example, 3:1:15 to 4:1:16. In another embodiments, the photoinitiator blend comprises a mixture of bis(2,4,6-trimethylbenzoyl)phenylphosphine oxide and 2-hydroxy-2-methyl-1-phenyl-1-propanone in a weight ratio of, for example, 1:3 to 1:5.

Other suitable photoinitiators include, without limitation, other mono- or bisacylphosphinoxides, such as diphenyl-2,4,6-trimethylbenzoylphosphine oxide and bis(2,6-dimethoxybenzoyl)-2,4,4-trimethylpentylphosphineoxide; α-hydroxyketones, such as 1-hydroxycyclohexylphenylketone and 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone and 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio) benzophenone, 2,4,6-trimethyl-4'-phenyl-benzophenone and 3-methyl-4'-phenyl-benzophenone; ketal compounds, such as 2,2-dimethoxy-1,2-diphenyl-ethanone; and compoundic or dimeric phenylglyoxylic acid esters, such as methylphenylglyoxylic acid ester, 5,5'-oxo-di(ethyleneoxydicarbonylphenyl) and 1,2-(benzoylcarboxy)ethane, or a mixture of any two or more thereof.

Still other suitable photoinitiators include, without limitation, oxime esters as disclosed in U.S. Pat. No. 6,596,445. Also suitable are phenyl glyoxalates, such as are disclosed in U.S. Pat. No. 6,048,660 and germanium-based photoinitiators as disclosed in Dalton Trans. 2021, 50, 12392-12398.

In some implementations, the free-radical photoinitiator is present in an amount of 0.1 to 10% by weight, such as 0.1 to 5% by weight, or, in some cases, 1 to 5% by weight, based on the total weight of the radiation curable composition.

Photoinitiators suitable for use in the radiation curable compositions of this specification are also described in United States Patent Application Publication No. US 2021/0088720 A1 at [0080]-[0128], the cited portion of which being incorporated herein by reference.

As will be appreciated, the radiation curable compositions of this specification may include any of a variety of further components, including any of a variety of various additives that may enable the composition to achieve certain desirable characteristics such as improved shelf life, improved coating oxidative and hydrolytic stability, improved cure speed, additional coating functional performance, and the like. For example, in some implementations, the radiation curable compositions of this specification may include one or more of a photosensitizer, a radiation cure amine synergist, a UV absorber, an antioxidant, a UV stabilizer, a light stabilizer, a filler material, a chain transfer thiol compound, a surface active compound, a viscosity modifier, an additional addition promoter, a water scavenger such as tetraethyl orthosilicate (TEOS) and orthoformate, oxygen quencher or a functional material including pigments, dyes, photochromic dyes, laser dyes, liquid crystals, light emitting materials, nano materials, quantum dots, fluorescent materials, dichroic dyes, antistatic materials, refractive index modifier and bioactive materials, among others. Some suitable additives are described in United States Patent Application Publication No. US 2021/0088720 A1 at [0122]-[0134], the cited portion of which being incorporated herein by reference.

In some implementations, the radiation curable compositions of this specification comprise an adhesion promoter that is different from the ethylenically unsaturated compound described earlier in this specification. Suitable adhesion promoters include silane coupling agents (different from the previously described ethylenically unsaturated compounds), such as hydrolysable silane compounds which contain a mercapto group and/or a plurality of alkoxy groups, such as those described in United States Patent Application Publication No. US 2002/0013383 A1, the relevant portions of which being incorporated herein by reference. Specific examples of such adhesion promoters are gamma-mercaptopropyltrimethoxysilane, trimethoxysilylpropyl acrylate, 3-trimetoxysilylpropane-1-thiol, and mixtures of any two or more thereof. In some implementations, the radiation curable composition may include a poly-silane, such as a poly-silane comprising: (a) at least two, in some cases two, moieties of the structure (1):

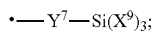
(1)

and
(b1) a moiety of the structure (2):

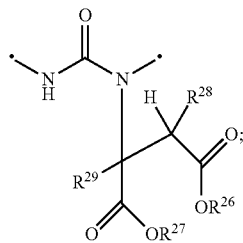
(2)

(b2) a moiety of the structure (3):

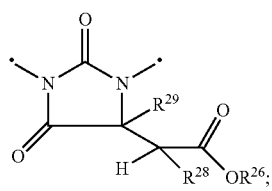
(3)

or
(b3) a combination of a moiety of the structure (2) and a moiety of the structure (3),
in which (i) $Y^7$ represents a linear or branched linking group comprising 1 or more carbon atoms, (ii) each $X^9$ represents an alkoxy group or an organic group that is inert towards isocyanate groups at temperatures of 100° C. or less, with the proviso that at least one $X^9$ represents an alkoxy group, (iii) $R^{26}$ and $R^{27}$, which may be the same or different, each represent an organic group that is inert to isocyanate groups at temperatures of 100° C. or less; (iv) $R^{28}$ and $R^{29}$, which may be the same or different, each represent hydrogen or an organic group that is inert to isocyanate groups at temperatures of 100° C. or less; and (v) each "———•" represents a linkage to another portion of the poly-silane. Such poly-silanes, as well the preparation thereof, are described in U.S. Provisional Patent Application Ser. No. 63/616,868, entitled POLYSILANES, METHODS FOR THEIR PREPARATION, AND THE USE THEREOF IN COATING COMPOSITIONS, which is filed concurrently herewith and incorporated herein by reference.

In some embodiments, the radiation curable compositions of this specification have a total silane content (determined as described in the Examples section of this specification) of up to 10 mmol, such as 1 to 10 mmol, 1 to 8 mmol, or, in some cases 2 to 6 mmol, per 100 gram of the radiation curable composition. Also, in some implementations, the radiation curable compositions of this specification have a total content of urea+urethane (determined as described in the Examples section of this specification) of 20 to 200 mmol, such as 30 to 150 mmol, or, in some cases 40 to 100 mmol, per 100 gram of the radiation curable composition.

Further, in some embodiments, a cured coating deposited from the coating composition exhibits a peel strength of at least 40 gram-force/inch ("gf/in"), or at least 55 gf/in, when measured at least 7 days after as described in the Examples section of this specification. In addition, in some embodiments, a cured coating deposited from the coating composition exhibits an elongation at break of at least 35%, such as at least 50%, when measured as described in the Examples section of this specification.

In addition, in some embodiments, the coating compositions of this specification are configured to possess a viscosity of at least >0.1 Pascal seconds (Pa·s), at least 0.2, at least 0.5, at least 1 Pa·s, and/or less than 15 Pa·s, less than 12 Pa·s, or less than 10 Pa·s, or 1 to 15 Pa·s, 2 to 12 Pa·s, or 3 to 10 Pa·s, wherein viscosity is measured at 25° C. and a shear rate of 50 s-1.

As should be appreciated, in some respects, this specification relates to a method for coating an optical fiber. Such methods comprise providing a glass optical fiber, such as by drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the secondary coating composition to at least one radiation source capable of emitting ultraviolet radiation to affect curing of said secondary coating composition and, optionally, said primary coating composition. In these methods, the primary coating composition and/or the secondary coating composition is a composition of the type described in this specification.

As should also be appreciated, this specification also relates to coated optical fibers, the coated optical fiber comprising a glass core and a cladding layer in contact with and surrounding said glass core; and a coating portion, said coating portion further including a primary coating layer in contact with said cladding layer; and a secondary coating layer in contact with and surrounding said primary coating layer. According to this aspect, the primary coating layer and/or the secondary coating layer is a cured product of a coating composition of the type described in this specification. In some cases, the optical fiber comprises a core, a cladding, a primary coating contacting and surrounding the outer annular cladding region, and a secondary coating. According to some of these embodiments, the core comprises pure silica glass ($SiO_2$) or silica glass with one or more dopants that increase the index of refraction of the glass core relative to pure, undoped silica glass. Suitable such dopants include, without limitation, $GeO_2$, $Al_2O_3$, $P_2O_5$, $TiO_2$, $ZrO_2$, $Nb_2O_5$, $Ta_2O_5$, and/or combinations thereof. The cladding layer may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [Δ1MAX] of the core is greater than the maximum relative refractive index [Δ4MAX] of the cladding. According to one embodiment, the cladding is pure silica glass. According to some of these embodiments, the primary coating has an in-situ (or on-fiber) tensile modulus of less than 5 Mpa, less than 2 Mpa, less than 1.5 Mpa, or less than 1.0 Mpa. Methods for describing in-situ modulus are well-known in the art and are described in, inter alia, U.S. Pat. Nos. 7,171,103 and 6,961,508, which are incorporated herein by reference. In an embodiment, the cured primary coating has an in-situ glass transition temperature of less than −10° C., less than −35° C., less than −40° C., less than −45° C., and in other embodiments not more than −50° C. A primary coating with a low in-situ modulus reduces the microbending which is the coupling mechanism between the modes propagating in the fiber. A low in-situ glass transition temperature ensures that the in-situ modulus of the primary coating will remain low even when the fiber is deployed in very cold environments.

The primary coating typically has a thickness in the range of 20 to 50 μm (e.g., about 25 or 32.5 μm), thinner thickness in the range of 15 to 25 μm for 200 μm fibers. In other cases, the primary coating has a thickness that is no more than 40 μm, such as 20 to about 40 μm, or 20 to 30 μm.

The secondary coating is in contact with and surrounds the primary coating. The secondary coating is, for example, the polymerization product of a coating composition whose molecules become highly crosslinked when polymerized. The secondary coating, according to an embodiment, may possess an in-situ tensile modulus of greater than 800 Mpa, greater than 1110 Mpa, greater than 1300 Mpa, greater than 1400 Mpa, or, in some cases, greater than 1500 Mpa. In some embodiments, the secondary coating has a high in-situ modulus (e.g., greater than about 800 Mpa at 25° C.) and a high Tg (e.g., greater than about 50° C.). In some cases, the in-situ secondary modulus is from 1000 Mpa to 8000 Mpa, such as 1200 Mpa to 5000 Mpa or 1500 Mpa to 3000 Mpa. The in-situ Tg of the secondary coating is, in some embodiments, from 50° C. to 120° C. or, in some cases, 50° C. to 100° C. Moreover, in some embodiments, the secondary coating has a thickness of no more than 40 μm, such as 20 to 40 μm, or, in some cases, 20 to 30 μm.

Suitable outer (or secondary) coating materials, as well as considerations related to selection of these materials, are also described in, for example, U.S. Pat. Nos. 4,962,992 and 5,104,433, each of which being incorporated herein by reference. As an alternative to these, high modulus coatings have also been obtained using low oligomer content coating systems, as described in U.S. Pat. Nos. 6,775,451 and 6,689,463, each of which being incorporated herein by reference. Also suitable are high modulus coating produced using non-reactive oligomer components, as described in U.S. Patent Application Publication. No. US 2007/0100039 A1, which is incorporated herein by reference. The secondary coating may also include an ink, as is well known in the art and, in such cases, may be referred to as a "colored secondary coating."

The coated optical fiber may, if desired, comprise one or more additional layers disposed on the secondary layer, such as a standalone "ink" layer which is applied and cured separately from the secondary coating.

It is known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, © Elsevier Inc. 2007, published by Elsevier.

Any optical fiber type may be used in embodiments of inventions described herein. In some implementations, however, the coated optical fiber possesses a mode-field diameter from 8 to 10 μm at a wavelength of 1310 nm, a mode-field diameter from 9 to 13 μm at a wavelength of 1550 nm, and/or an effective area of 20 to 200 μm². Such fibers may be single mode and/or large-effective area fibers, given the expected demand for coating processes for these fibers that utilize higher line or processing speeds. However, other fiber types, such as multimode fibers, may be used as well.

As should also be appreciated, this specification also relates to an optical fiber cable, wherein the optical fiber comprises at least one optical fiber as described herein, and/or wherein the optical fiber is the cured product of a coating composition as described herein.

Various aspects of the subject matter described herein are set out in the following numbered clauses:

Clause 1. An ethylenically unsaturated compound comprising: (a) a moiety of the structure (1):

and
(b1) a moiety of the structure (2):

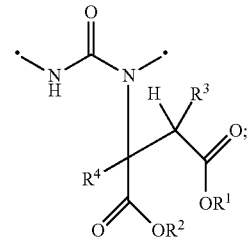

or
(b2) a moiety of the structure (3):

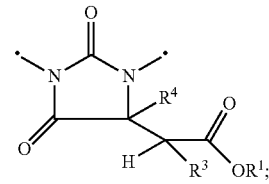

or
(b3) a combination of a moiety of the structure (2) and a moiety of the structure (3),
in which (i) Y represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) $R^1$ and $R^2$, which may be the same or different, each represent an organic group that is inert to isocyanate groups at temperatures of 100° C. or less; (iv) $R^3$ and $R^4$, which may be the same or different, each represent hydrogen or an organic group that is inert to isocyanate groups at temperatures of 100° C. or less; and
(v) each "———●" represents a linkage to another portion of the ethylenically unsaturated compound.

Clause 2. The ethylenically unsaturated compound of clause 1, wherein at least one carbon-carbon double bond of the ethylenically unsaturated oligomer is present as a =CH$_2$ end group with no further substituent on the carbon thereof.

Clause 3. The ethylenically unsaturated compound of clause 1 or clause 2, wherein the ethylenically unsaturated compound comprises and end group of structure (1) and an end group of the structure (1a):

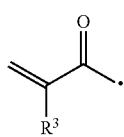

(1a)

in which E represents a group that comprises a polymerizable carbon-carbon double bond, such as an acryloyl, methacryloyl, or vinyl group and ———● represents a linkage to another portion of the ethylenically unsaturated compound, such as where the end group of structure (1a) has the structure (1b):

(1b)

in which R$^3$ is H or CH$_3$ and * represents a linkage to another portion of the ethylenically unsaturated compound. ———●

Clause 4. The ethylenically unsaturated compound of one of clause 1 to clause 3, wherein an end group of structure (1) and an end group of structure (1a) are arranged at opposite ends of the ethylenically unsaturated compound.

Clause 5. The ethylenically unsaturated compound of one of clause 1 to clause 4, wherein each R$^1$ and R$^2$ in structures (2) and (3), which may be the same or different, represents an alkyl group, such as an alkyl group having 1 to 9 or 1 to 4 carbon atoms, such as where each R$^1$ and R$^2$ in structures (2) and (3), which may be the same or different, represents a methyl group, an ethyl group, a propyl group or a butyl group.

Clause 6. The ethylenically unsaturated compound of one of clause 1 to clause 5, wherein each X in structure (1) represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two X's represent an alkoxy, such as methoxy, ethoxy, or propyloxy, group, or where each X represents an alkoxy, such as methoxy, ethoxy, or propyloxy group.

Clause 7. The ethylenically unsaturated compound of one of clause 1 to clause 6, wherein Y in structure (1) comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 8. The ethylenically unsaturated compound of one of clause 1 to clause 7, wherein the ethylenically unsaturated compound further comprises a segment of the structure:

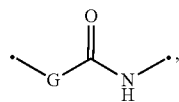

in which G is O, S, or NR in which R represents hydrogen or an organic group that is inert to isocyanate groups at temperatures of 100° C. or less, and each "———●" represents a linkage to another portion of the ethylenically unsaturated compound. In some embodiments, the ethylenically unsaturated compound has 1 to 4 such segments.

Clause 9. The ethylenically unsaturated compound of one of clause 1 to clause 8, wherein the ethylenically unsaturated compound has a molecular weight, calculated from the molecular formula of the ethylenically unsaturated compound, of 400 to less than 2000 g/mol, such as 400 to 1000 g/mol.

Clause 10. The ethylenically unsaturated compound of one of clause 1 to clause 9, such as where the ethylenically unsaturated compound includes a moiety of the structure (3), wherein the ethylenically unsaturated compound comprises a moiety of the structure 3A:

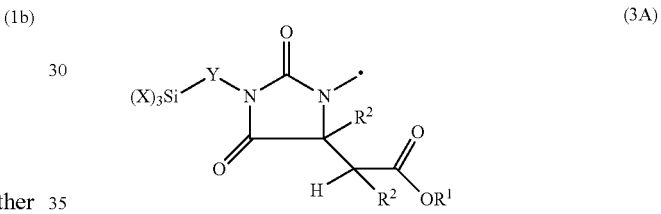

(3A)

in which X, Y, R$^1$, R$^2$ and "———●" are each as described in clause 1 with respect to structures (1)-(3), such as where the ethylenically unsaturated compound has 1 to 4 such moieties of structure 3A.

Clause 11. The ethylenically unsaturated compound of one of clause 1 to clause 10, such as where the ethylenically unsaturated compound includes a moiety of the structure (3), with the proviso that the ethylenically unsaturated compound has at least one, in some cases only one, moiety of the structure 3B:

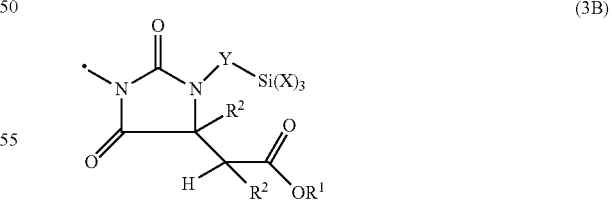

(3B)

in which X, Y, R$^1$, R$^2$ and "———●" are each as described in clause 1 with respect to structures (1)-(3).

Clause 12. The ethylenically unsaturated compound of one of clause 1 to clause 11, such as where the ethylenically unsaturated compound includes a moiety of the structure (2), with the proviso that the ethylenically unsaturated compound has at least one, in some cases only one, moiety of the structure 2A:

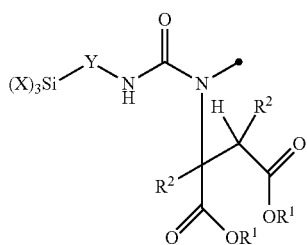

(2A)

in which X, Y, $R^1$, $R^2$ and "———●" are each as described in clause 1 with respect to structures (1)-(3).

Clause 13. The ethylenically unsaturated compound of one of clause 1 to clause 12, such as where the ethylenically unsaturated compound includes a moiety of the structure (2), with the proviso that the ethylenically unsaturated compound has 0 or 2 to 4 or 2 moieties of the structure 2B:

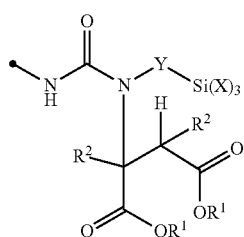

(2B)

in which X, Y, $R^1$, $R^2$ and "———●" are each as described in clause 1 with respect to structures (1)-(3).

Clause 14. An ethylenically unsaturated compound (or the ethylenically unsaturated compound of one of clause 1 to clause 13), wherein the ethylenically unsaturated compound has the structure (4A) or the structure (4B):

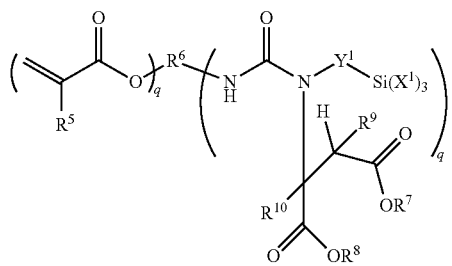

(4A)

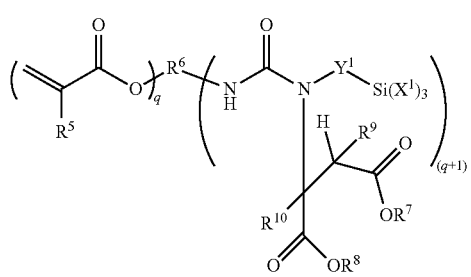

(4B)

in which (i) $R^5$ represents H or $CH_3$, (ii) $R^6$ represents a group comprising a branched or straight chain alkylene radical, such as where the branched or straight chain alkylene radical has at least 2, 2 to 8, or 2 to 4 carbon atoms, (iii) $Y^1$ represents a linear or branched linking group comprising 1 or more carbon atoms, and (iv) $R^7$ and $R^8$, which may be the same or different, represents an organic group that is inert towards isocyanate groups at temperatures of 100° C. or less, (v) $R^9$ and $R^{10}$, which may be the same or different, each represent hydrogen or an organic group that is inert to isocyanate groups at temperatures of 100° C. or less, (vi) each $X^1$, which may be the same or different, represents an alkoxy group or an organic group that is inert towards isocyanate groups at temperatures of 100° C. or less, with the proviso that at least one $X^1$ represents an alkoxy group, and (vii) each q, which can be same or different, is an integer having a value of 1 to 6, such as 1 to 3, such as 1, such as where the ethylenically unsaturated compound has a molecular weight, calculated from the molecular formula of the ethylenically unsaturated compound, of 400 to less than 2000 g/mol, such as 400 to 1000 g/mol.

Clause 15. The ethylenically unsaturated compound of clause 14, wherein $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanatoethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, a hexamethylene diisocyanate trimer, triphenylmethane-4,4',4"-triisocyanate, a hexamethylene diisocyanate trimer, an aromatic polyisocyanate based on toluene diisocyanate, a polyisocyanurate of toluene diisocyanate, or a combination of any two or more thereof.

Clause 16. The ethylenically unsaturated compound of clause 14, wherein $R^6$ does not include a carbamate segment.

Clause 17. The ethylenically unsaturated compound of one of clause 14 to clause 16 wherein $R^6$ is:
a linear or branched alkylene radical consisting of carbon and hydrogen, such as

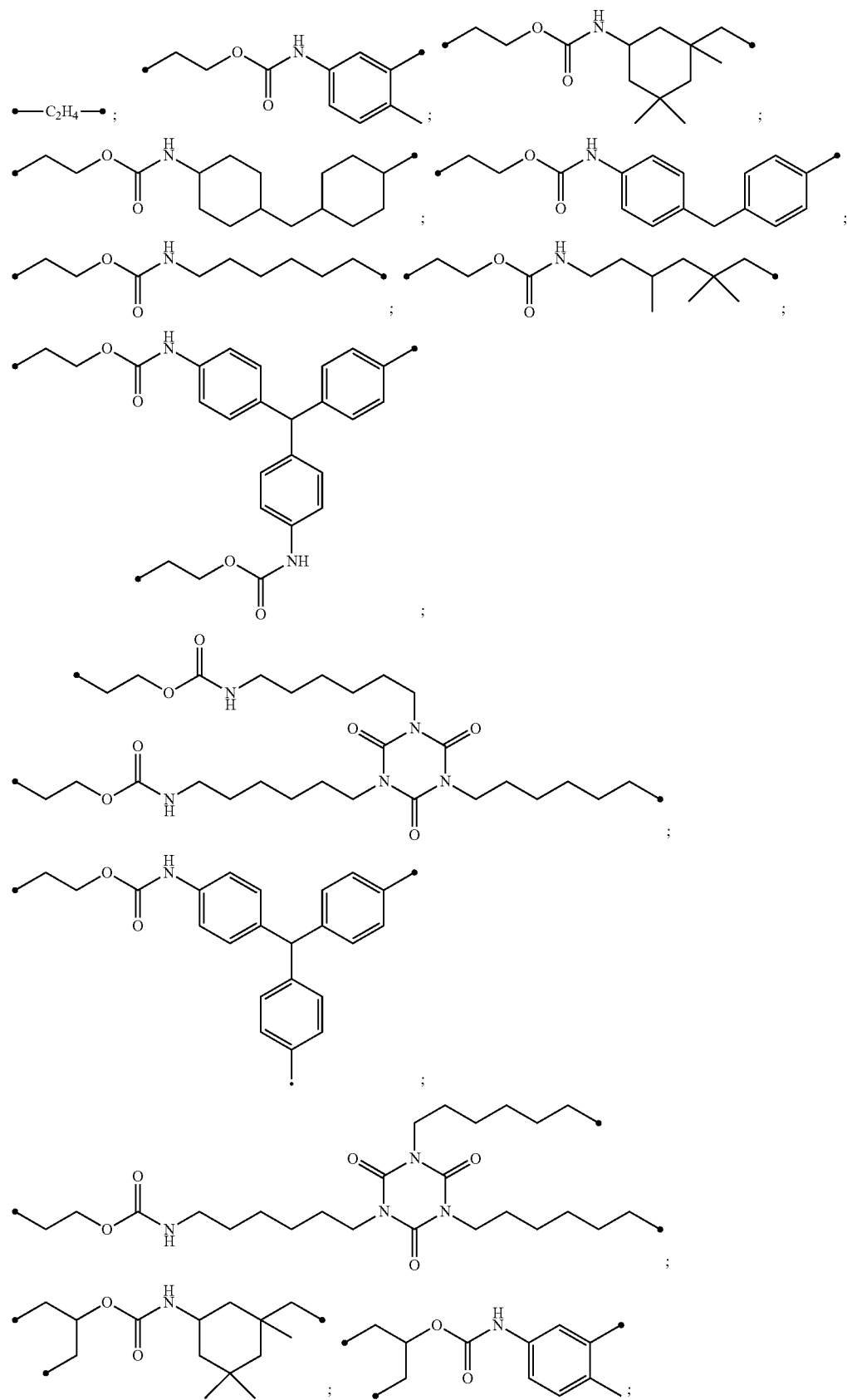

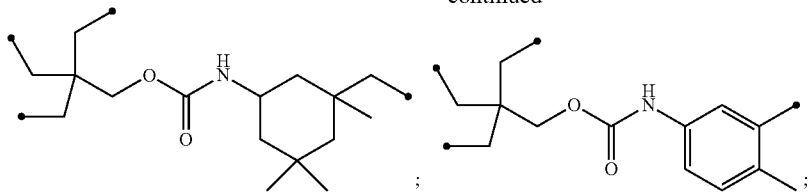

or a combination of any two or more thereof, in which each "———●" represents a linkage to another portion of the ethylenically unsaturated compound, provided that each "———●" that is represented to the left of an oxygen represents a linkage to a

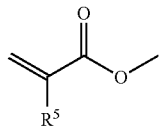

segment in structures (4A) and (4B).

Clause 18. The ethylenically unsaturated compound of one of clause 14 to clause 17, wherein $R^7$ and $R^8$, which may be the same or different, represents an alkyl group, such as an alkyl group having 1 to 9 or 1 to 4 carbon atoms, such as where each $R^7$ and $R^8$, which may be the same or different, represents a methyl group, an ethyl group, a propyl group or a butyl group.

Clause 19. The ethylenically unsaturated compound of one of clause 14 to clause 18, wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group.

Clause 20. The ethylenically unsaturated compound of one of clause 14 to clause 19, wherein $Y^1$ comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 21. An ethylenically unsaturated compound (or the ethylenically unsaturated compound of one of clause 1 to clause 13), wherein the ethylenically unsaturated compound has the structure (5):

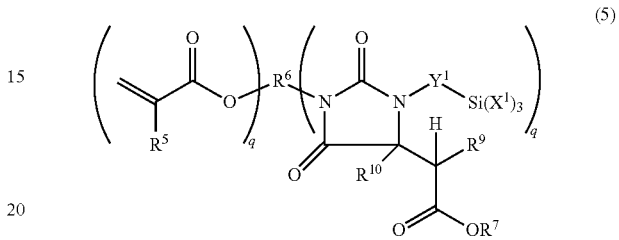 (5)

in which (i) $R^5$ represents H or $CH_3$, (ii) $R^6$ represents a group comprising a branched or straight chain alkylene radical, such as where the branched or straight chain alkylene radical has at least 2, 2 to 8, or 2 to 4 carbon atoms, (iii) $Y^1$ represents a linear or branched linking group comprising 1 or more carbon atoms, and (iv) $R^7$ represents an organic group that is inert towards isocyanate groups at temperatures of 100° C. or less, (v) $R^9$ and $R^{10}$, which may be the same or different, each represent hydrogen or an organic group that is inert to isocyanate groups at temperatures of 100° C. or less, (vi) each X %, which may be the same or different, represents an alkoxy group or an organic group that is inert towards isocyanate groups at temperatures of 100° C. or less, with the proviso that at least one $X^1$ represents an alkoxy group, and (vii) each q, which can be same or different, is an integer having a value of 1 to 6, 1 to 3, or 1, such as where the ethylenically unsaturated compound has a molecular weight, calculated from the molecular formula of the ethylenically unsaturated compound, of 400 to less than 2000 g/mol, such as 400 to 1000 g/mol.

Clause 22. The ethylenically unsaturated compound of clause 21, wherein $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises any of the polyisocyanates listed in clause 15.

Clause 23. The ethylenically unsaturated compound of clause 21, wherein $R^6$ does not include a carbamate segment.

Clause 24. The ethylenically unsaturated compound of one of clause 21 to clause 23 wherein $R^6$ is:

a linear or branched alkylene radical consisting of carbon and hydrogen, such as

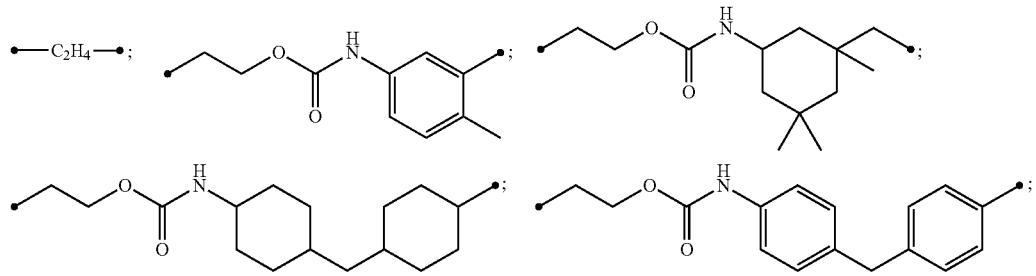

-continued
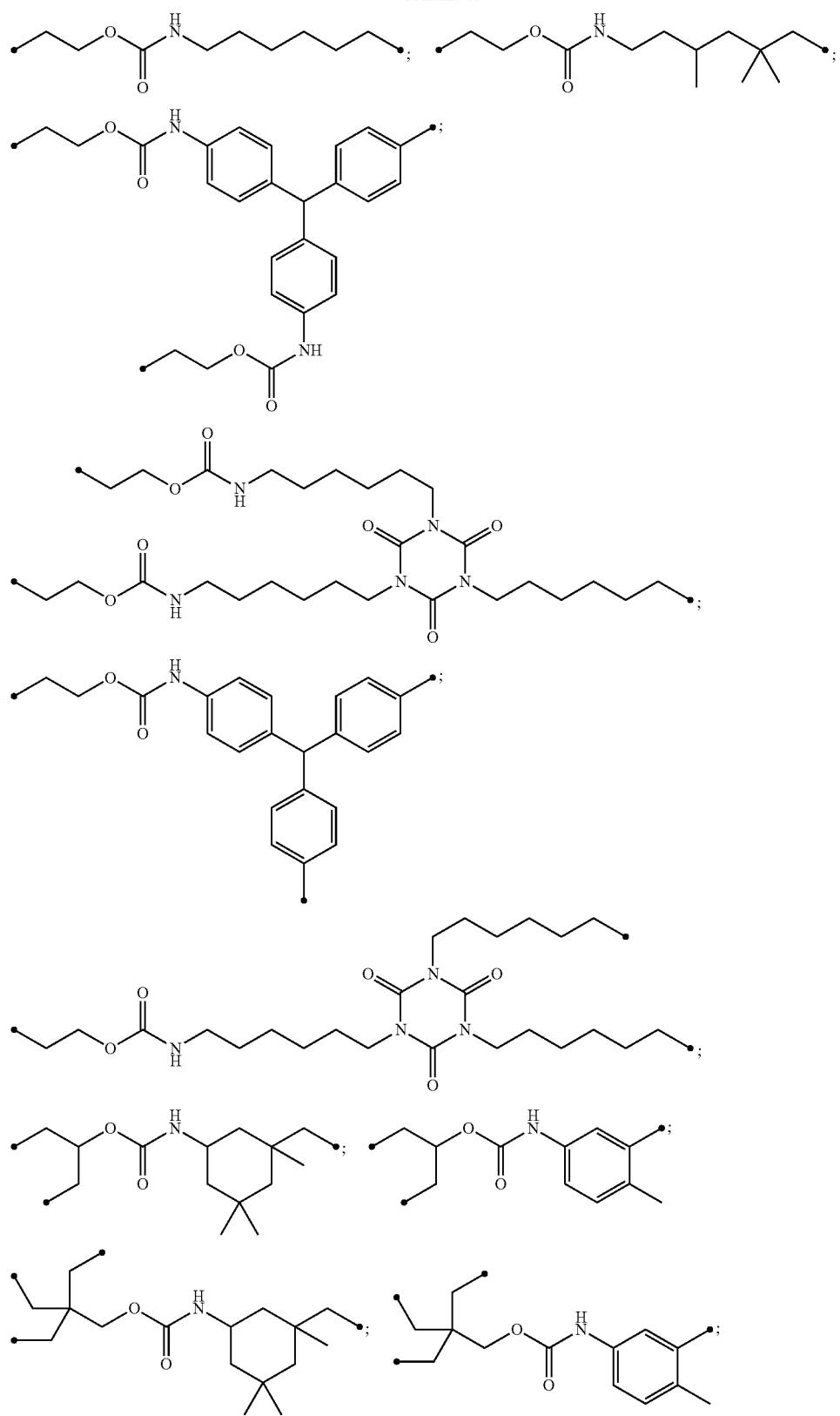

a combination of any two or more thereof, in which each "———•" represents a linkage to another portion of the ethylenically unsaturated compound, provided that each "———•" that is represented to the left of an oxygen represents a linkage to a

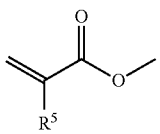

segment in structure (5).

Clause 25. The ethylenically unsaturated compound of clause 21 to clause 24, wherein $R^7$ represents an alkyl group, such as an alkyl group having 1 to 9 or 1 to 4 carbon atoms, such as where $R^7$ represents a methyl group, an ethyl group, a propyl group or a butyl group.

Clause 26. The ethylenically unsaturated compound of one of clause 21 to clause 25, wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group.

Clause 27. The ethylenically unsaturated compound of one of clause 21 to clause 26, wherein $Y^1$ comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 28. An ethylenically unsaturated compound (or the ethylenically unsaturated compound of one of clause 1 to clause 13), wherein the ethylenically unsaturated compound has the structure (6):

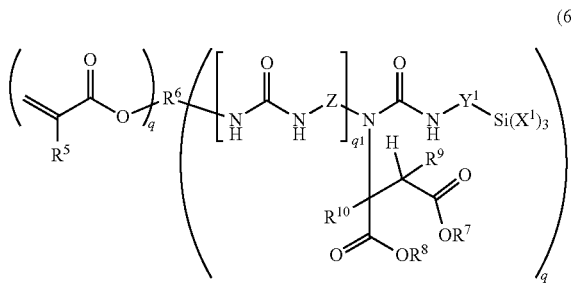

wherein (i) $R^5$ represents H or $CH_3$, (ii) $R^6$ represents a group comprising a branched or straight chain alkylene radical, such as where the branched or straight chain alkylene radical has at least 2, 2 to 8, or 2 to 4 carbon atoms, (iii) $R^7$ and $R^8$ which may be the same or different, represents an organic group that is inert towards isocyanate groups at temperatures of 100° C. or less, (iv) $R^9$ and $R^{10}$, which may be the same or different, each represent hydrogen or an organic group that is inert to isocyanate groups at temperatures of 100° C. or less, (v) Z represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) each q, which can be same or different, is an integer having a value of 1 to 6, such as 1 to 3, such as 1, and (ix) q1 is 0 or 1, such as where the ethylenically unsaturated compound has a molecular weight, calculated from the molecular formula of the ethylenically unsaturated compound, of 400 to less than 2000 g/mol, such as 400 to 1000 g/mol.

Clause 29. The ethylenically unsaturated compound of clause 28, wherein $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises any of the polyisocyanates listed in clause 15.

Clause 30. The ethylenically unsaturated compound of clause 28, wherein $R^6$ does not include a carbamate segment.

Clause 31. The ethylenically unsaturated compound of one of clause 28 to clause 30 wherein $R^6$ is:

a linear or branched alkylene radical consisting of carbon and hydrogen, such as

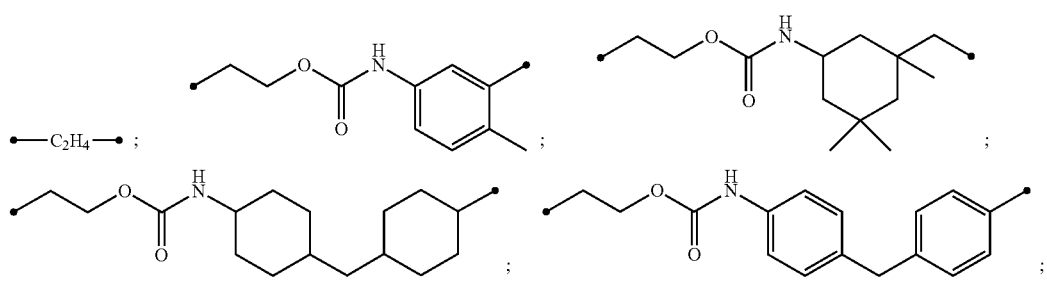

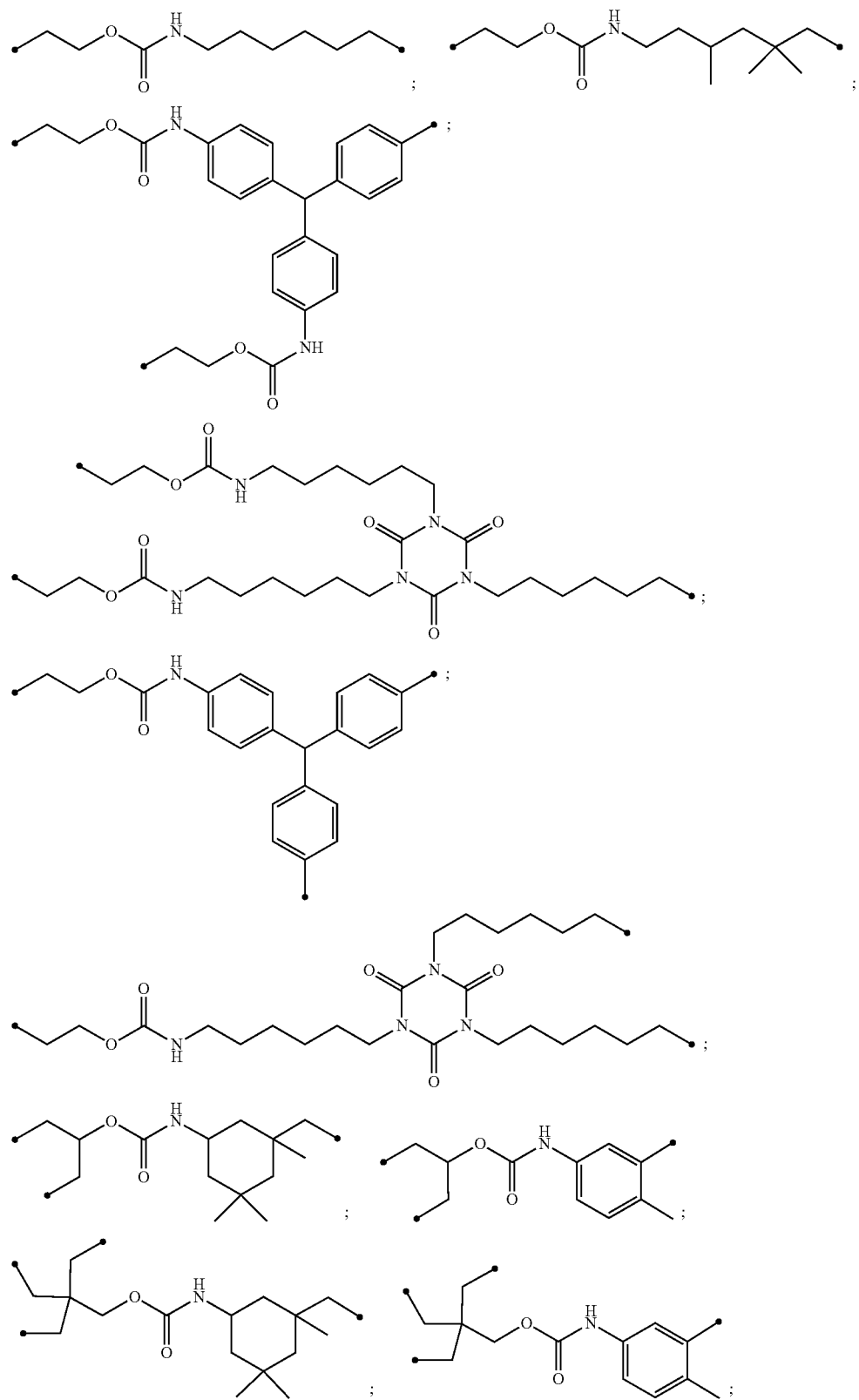

or a combination of any two or more thereof, in which each "———●" represents a linkage to another portion of the ethylenically unsaturated compound provided that each "———●" that is represented to the left of an oxygen represents a linkage to a

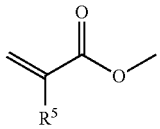

segment in structure (6).

Clause 32. The ethylenically unsaturated compound of one of clause 28 to clause 31, wherein $R^7$ and $R^8$, which may be the same or different, represents an alkyl group, such as an alkyl group having 1 to 9 or 1 to 4 carbon atoms, such as where $R^7$ and $R^8$, which may be the same or different, represents a methyl group, an ethyl group, a propyl group or a butyl group.

Clause 33. The ethylenically unsaturated compound of one of clause 28 to clause 32, wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group.

Clause 34. The ethylenically unsaturated compound of one of clause 28 to clause 33, wherein each $Y^1$, which may be the same or different, comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 35. The ethylenically unsaturated compound of one of clause 28 to clause 34, wherein Z is:

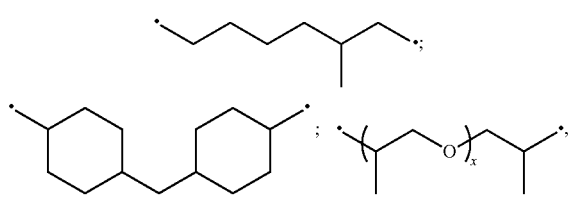

in which x has a value of 3 to 19;

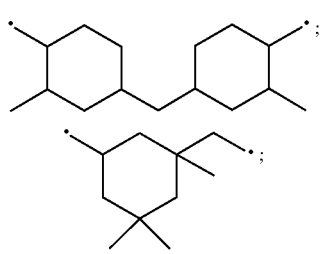

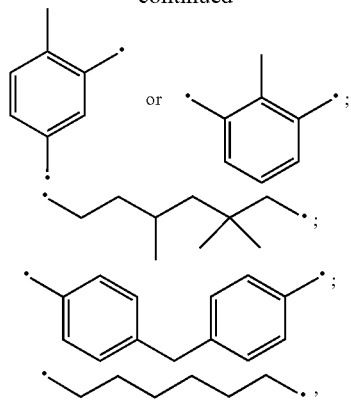

in which each "———●" represents a linkage to another portion of the ethylenically unsaturated compound.

Clause 36. An ethylenically unsaturated compound (or the ethylenically unsaturated compound of one of clause 1 to clause 13), wherein the ethylenically unsaturated compound has the structure (7):

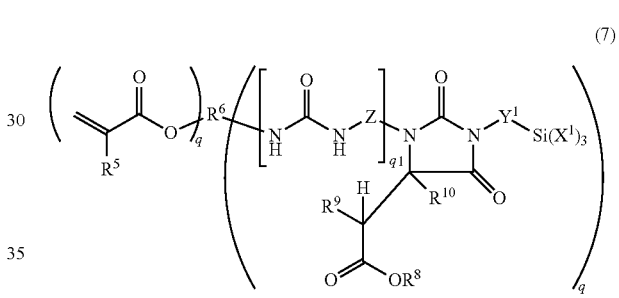

(7)

wherein (i) $R^5$ represents H or $CH_3$, (ii) $R^6$ represents a group comprising a branched or straight chain alkylene radical, such as where the branched or straight chain alkylene radical has at least 2, 2 to 8, or 2 to 4 carbon atoms, (iii) $R^7$ and $R^8$ which may be the same or different, represents an organic group that is inert towards isocyanate groups at temperatures of 100° C. or less, (iv) $R^9$ and $R^{10}$, which may be the same or different, each represent hydrogen or an organic group that is inert to isocyanate groups at temperatures of 100° C. or less, (v) Z represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, (vi) each $Y^1$, which may be the same or different, represents a linear or branched linking group comprising 1 or more carbon atoms, and (vii) each $X^1$, which may be the same or different, represents an alkoxy group or an organic group that is inert towards isocyanate groups at temperatures of 100° C. or less, with the proviso that at least one $X^1$ represents an alkoxy group, (viii) each q, can be same or different, is an integer having a value of 1 to 6, such as 1 to 3, such as 1, and (ix) q1 is 0 or 1, such as where the ethylenically unsaturated compound has a molecular weight, calculated from the molecular formula of the ethylenically unsaturated compound, of 400 to less than 2000 g/mol, such as 400 to 1000 g/mol.

Clause 37. The ethylenically unsaturated compound of clause 36, wherein $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises any of the polyisocyanates listed in clause 15.

Clause 38. The ethylenically unsaturated compound of clause 36, wherein $R^6$ does not include a carbamate segment.

Clause 39. The ethylenically unsaturated compound of one of clause 36 to clause 38 wherein $R^6$ is:
a linear or branched alkylene radical consisting of carbon and hydrogen, such as

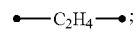

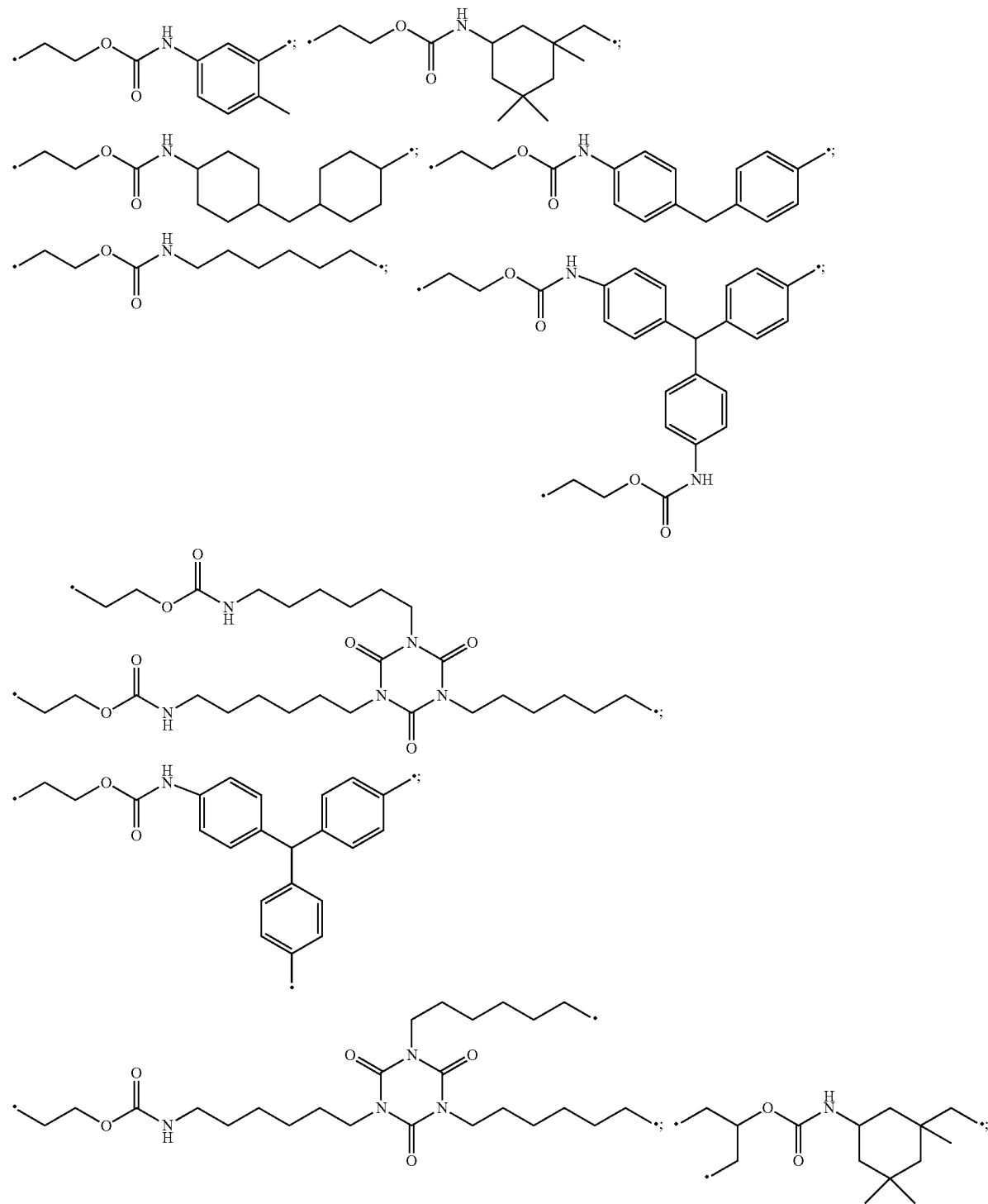

-continued

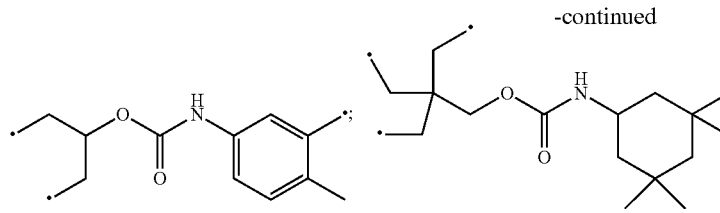

or a combination of any two or more thereof, in which each "———•" represents a linkage to another portion of the ethylenically unsaturated compound, provided that each "———•" that is represented to the left of an oxygen represents a linkage to a

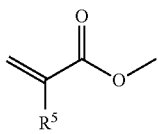

segment in structure (7).

Clause 40. The ethylenically unsaturated compound of one of clause 36 to clause 39, wherein $R^8$, represents an alkyl group, such as an alkyl group having 1 to 9 or 1 to 4 carbon atoms, such as where $R^8$ represents a methyl group, an ethyl group, a propyl group or a butyl group.

Clause 41. The ethylenically unsaturated compound of one of clause 36 to clause 40, wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group.

Clause 42. The ethylenically unsaturated compound of one of clause 36 to clause 41, wherein each $Y^1$, which may be the same or different, comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 43. The ethylenically unsaturated compound of one of clause 36 to clause 42, wherein Z is:

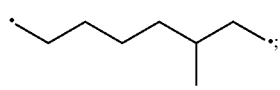

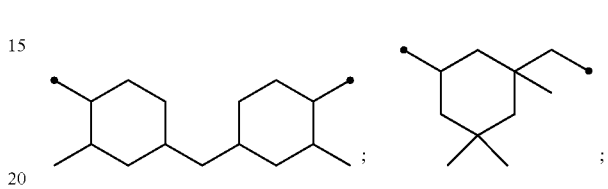

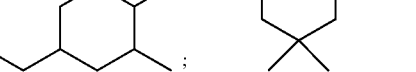

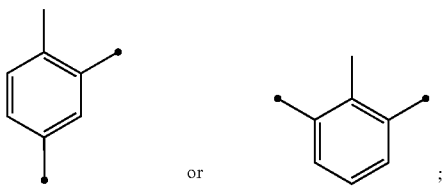

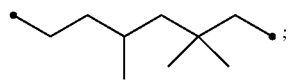

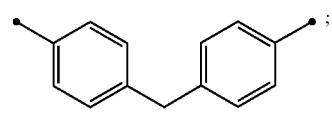

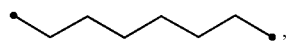

in which x has a value of 3 to 19;

in which each "———•" represents a linkage to another portion of the ethylenically unsaturated compound.

Clause 44. An ethylenically unsaturated compound (or the ethylenically unsaturated compound of one of clause 1 to clause 13), wherein the ethylenically unsaturated compound has the structure (8):

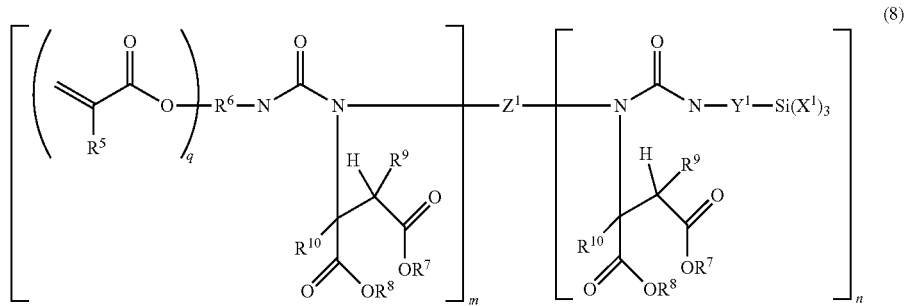

wherein (i) each $R^5$, which may be the same or different, represents H or $CH_3$, (ii) each $R^6$, which may be the same or different, represents a group comprising a branched or straight chain alkylene radical, such as where the branched or straight chain alkylene radical has at least 2, 2 to 8, or 2 to 4 carbon atoms, (iii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, (iv) each $Y^1$, which may be the same or different, represents a linear or branched linking group comprising 1 or more carbon atoms, (v) each $R^7$ and $R^8$, which may be the same or different, represents an organic group that is inert towards isocyanate groups at temperatures of 100° C. or less, (vi) each $R^9$ and $R^{10}$, which may be the same or different, represent hydrogen or an organic group that is inert towards isocyanate groups at temperatures of 100° C. or less, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) m and n, which may be the same or different, are each an integer having a value of 1 to 4, and (ix) each q, which can be same or different, is an integer having a value of 1 to 6, such as 1 to 3, such as 1, such as where the ethylenically unsaturated compound has a molecular weight, calculated from the molecular formula of the ethylenically unsaturated compound, of 400 to less than 2000 g/mol, such as 400 to 1000 g/mol.

Clause 45. The ethylenically unsaturated compound of clause 44, wherein $R^6$ represents a group that, in addition to the branched or straight chain alkylene radical, further comprises a carbamate segment, such as where $R^6$ represents a group that further comprises a unit derived from a polyisocyanate, such as where the diisocyanate comprises any of the polyisocyanates listed in clause 15.

Clause 46. The ethylenically unsaturated compound of clause 44, wherein $R^6$ does not include a carbamate segment.

Clause 47. The ethylenically unsaturated compound of clause 44 or clause 46 wherein $R^6$ is:

a linear or branched alkylene radical consisting of carbon and hydrogen, such as

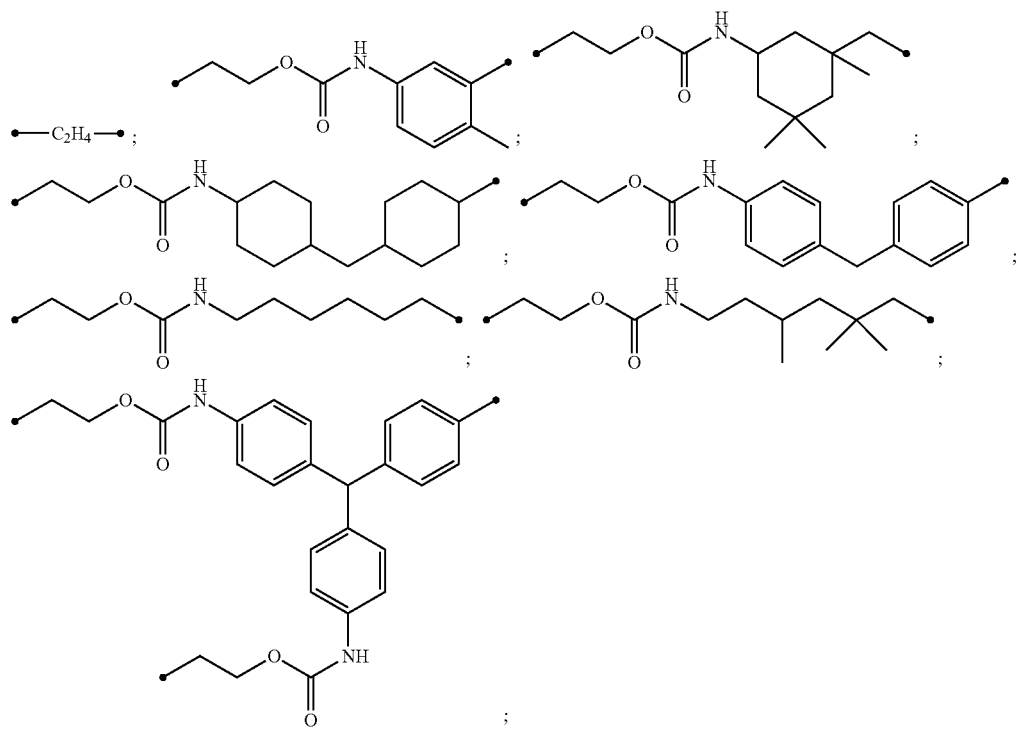

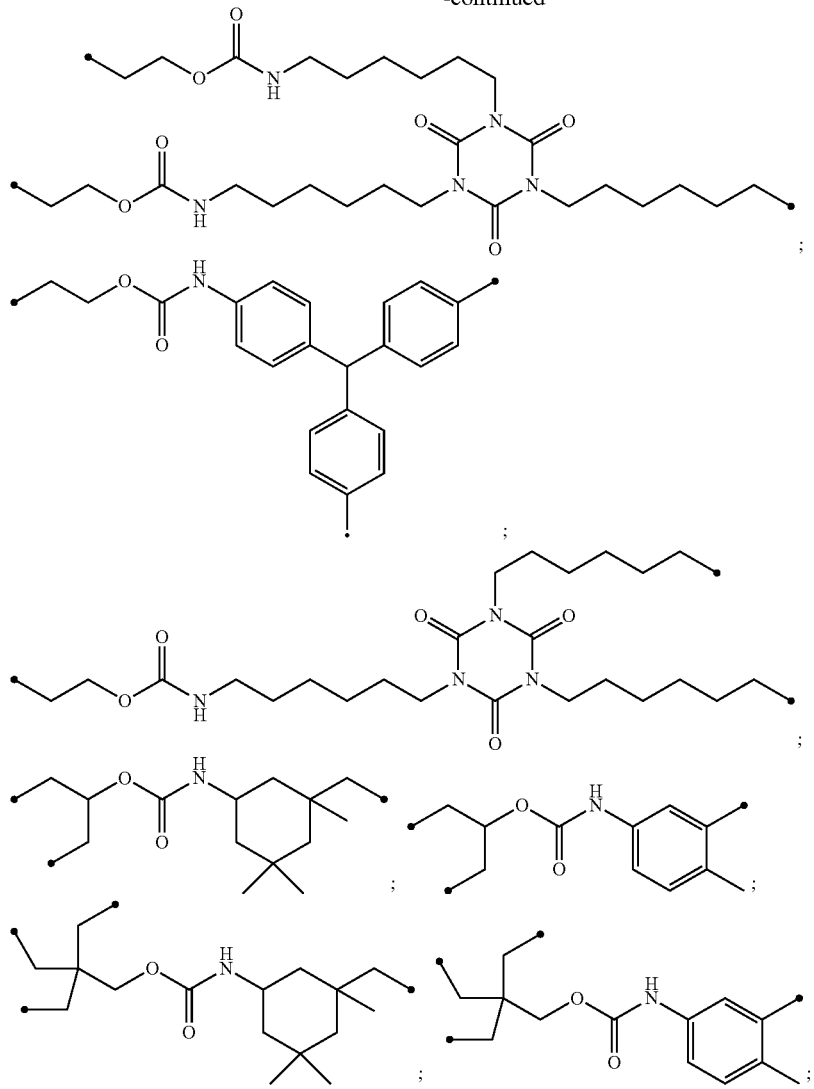

or a combination of any two or more thereof, in which each "———•" represents a linkage to another portion of the ethylenically unsaturated compound, provided that each "———•" that is represented to the left of an oxygen represents a linkage to a

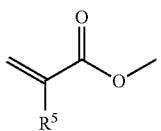

segment in structure (8).

Clause 48. The ethylenically unsaturated compound of clause 44 to clause 47, wherein each $R^7$ and $R^8$, which may be the same or different, represents an alkyl group, such as an alkyl group having 1 to 9 or 1 to 4 carbon atoms, such as where each $R^{11}$ and $R^{12}$, which may be the same or different, represents a methyl group, an ethyl group, a propyl group or a butyl group.

Clause 49. The ethylenically unsaturated compound of one of clause 44 to clause 48, wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two $X^1$'s represent an alkoxy, such as methoxy, ethoxy, or propyloxy, group, or where each $X^1$ represents an alkoxy, such as methoxy, ethoxy, or propyloxy group.

Clause 50. The ethylenically unsaturated compound of one of clause 44 to clause 49, wherein each $Y^1$, which may be the same or different, comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 51. The ethylenically unsaturated compound of one of clause 44 to clause 50, wherein $Z^1$ is:

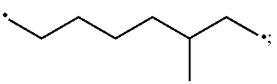

-continued

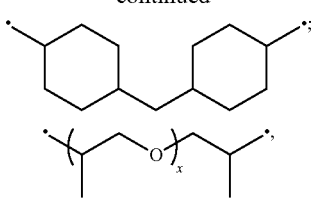

in which x has a value of 3 to 19;

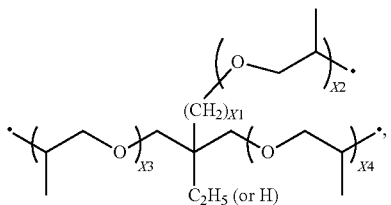

in which each X1, X2, X3 and X4, which may be the same or different has a value of 1 to 10, provided that the structure has a molecular weight of 200 to 1500;

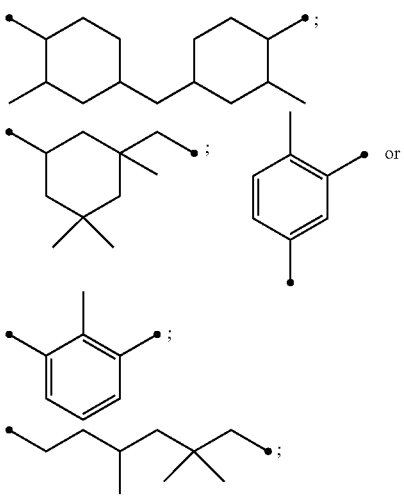

or

-continued

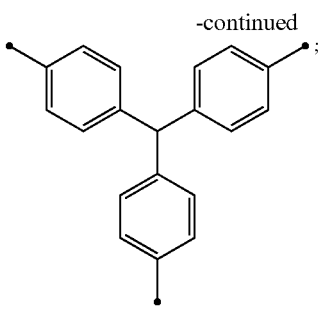

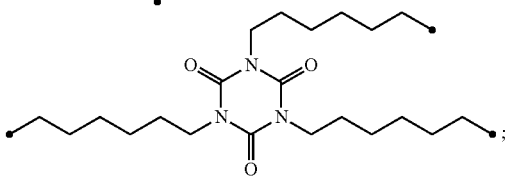

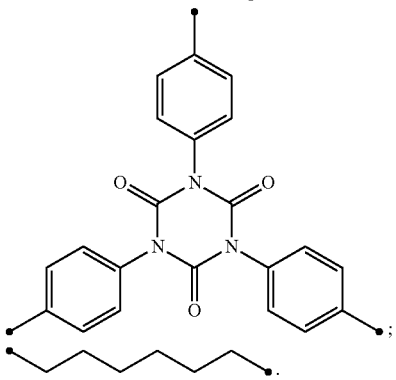

in which each "———●" represents a linkage to another portion of the ethylenically unsaturated compound.

Clause 52. The ethylenically unsaturated compound of one of clause 44 to clause 51, wherein m+n is no more than 4, such as where m is 1 or 2, such as 1, and n is 1 or 2, such as 1.

Clause 53. An ethylenically unsaturated compound (or the ethylenically unsaturated compound of one of clause 1 to clause 13), wherein the ethylenically unsaturated compound has the structure (9):

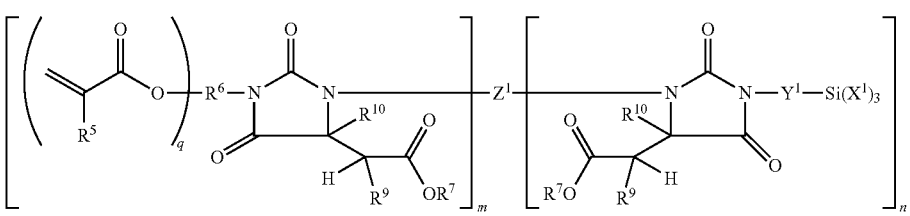

(9)

-continued

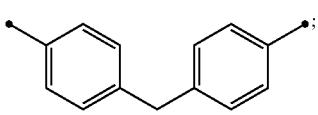

wherein (i) each $R^5$, which may be the same of different, represents H or $CH_3$, (ii) each $R^6$, which may be the same or different, represents a group comprising a branched or straight chain alkylene radical, such as where the branched or straight chain alkylene radical has at least 2, 2 to 8, or 2 to 4 carbon atoms, (iii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, (iv) each $Y^1$, which may be the same or different, represents a linear or branched linking group comprising 1 or more carbon atoms, (v) each $R^7$ and $R^8$, which may be the same or different, represents an organic group that is inert towards isocyanate groups at temperatures of 100° C. or less, (vi) each $R^9$ and $R^{10}$, which may be the same or different, represent hydrogen or an organic group that is inert towards isocyanate groups at temperatures of 100° C. or less, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) m and n, which may be the same or different, are each an integer having a value of 1 to 4, and (ix) each q, which can be same or different, is an integer having a value of 1 to 6, such as 1 to 3, such as 1, such as where the ethylenically unsaturated compound has a molecular weight, calculated from the molecular formula of the ethylenically unsaturated compound, of 400 to less than 2000 g/mol, such as 400 to 1000 g/mol.

Clause 54. The ethylenically unsaturated compound of clause 53, wherein $R^6$ represents a group that, in addition to the branched or straight chain alkylene radical, further comprises a carbamate segment, such as where $R^6$ represents a group that further comprises a unit derived from a polyisocyanate, such as where the polyisocyanate comprises any of the polyisocyanates listed in clause 15.

Clause 55. The ethylenically unsaturated compound of clause 53, wherein $R^6$ does not include a carbamate segment.

Clause 56. The ethylenically unsaturated compound of one of clause 53 to clause 55 wherein $R^6$ is:

a linear or branched alkylene radical consisting of carbon and hydrogen, such as

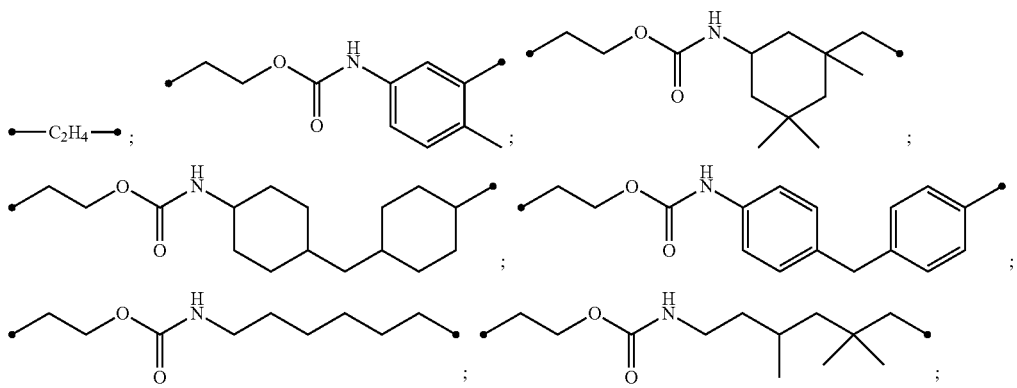

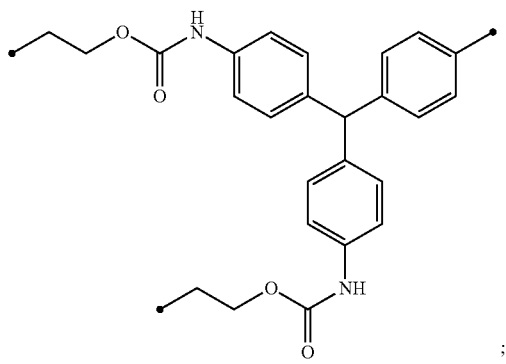

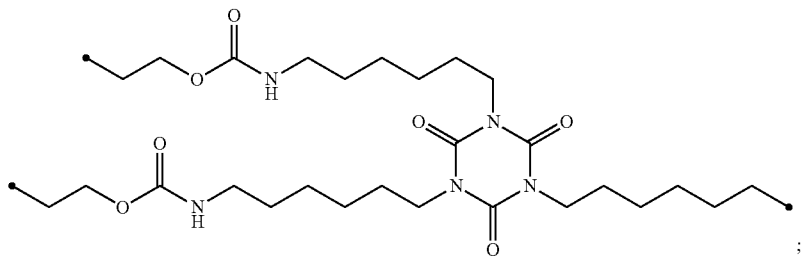

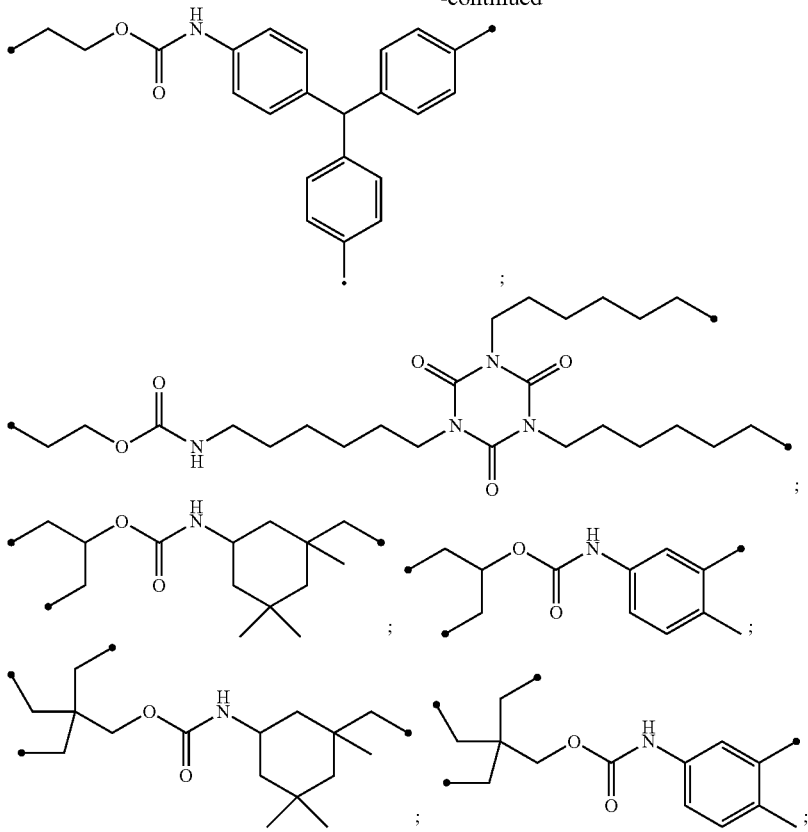

or a combination of any two or more thereof, in which each "———●" represents a linkage to another portion of the ethylenically unsaturated compound, provided that each "———●" that is represented to the left of an oxygen represents a linkage to a

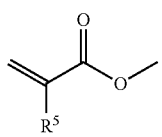

segment in structure (9).

Clause 57. The ethylenically unsaturated compound of one of clause 53 to clause 56, wherein each $R^7$, which may be the same or different, represents an alkyl group, such as an alkyl group having 1 to 9 or 1 to 4 carbon atoms, such as where each $R^{11}$, which may be the same or different, represents a methyl group, an ethyl group, a propyl group or a butyl group.

Clause 58. The ethylenically unsaturated compound of one of clause 53 to clause 57, wherein each wherein each $X^1$ represents an identical or different alkyl, acyloxy, or alkoxy group, such as an identical or different alkyl, acyloxy, or alkoxyl group having 1 to 9 or 1 to 4 carbon atoms, with the proviso that at least one $X^1$ represents an alkoxy group, such as where at least two X's represent an alkoxy, such as methoxy, ethoxy, or propyloxy, group, or where each $X^1$ represents an alkoxy, such as methoxy, ethoxy, or propyloxy group.

Clause 59. The ethylenically unsaturated compound of one of clause 53 to clause 58, wherein each $Y^1$, which may be the same or different, comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 60. The ethylenically unsaturated compound of one of clause 53 to clause 59, wherein $Z^1$ is:

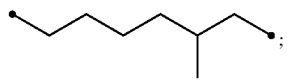

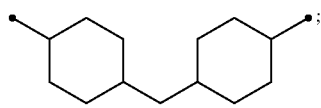

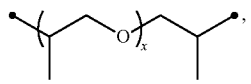

in which x has a value of 3 to 19;

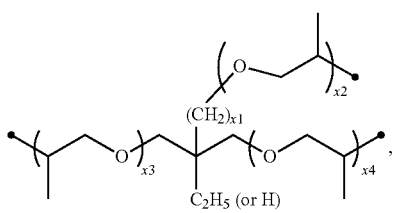

in which each X1, X2, X3 and X4, which may be the same or different, has a value of 1 to 10, provided that the structure has a molecular weight of 200 to 1500;

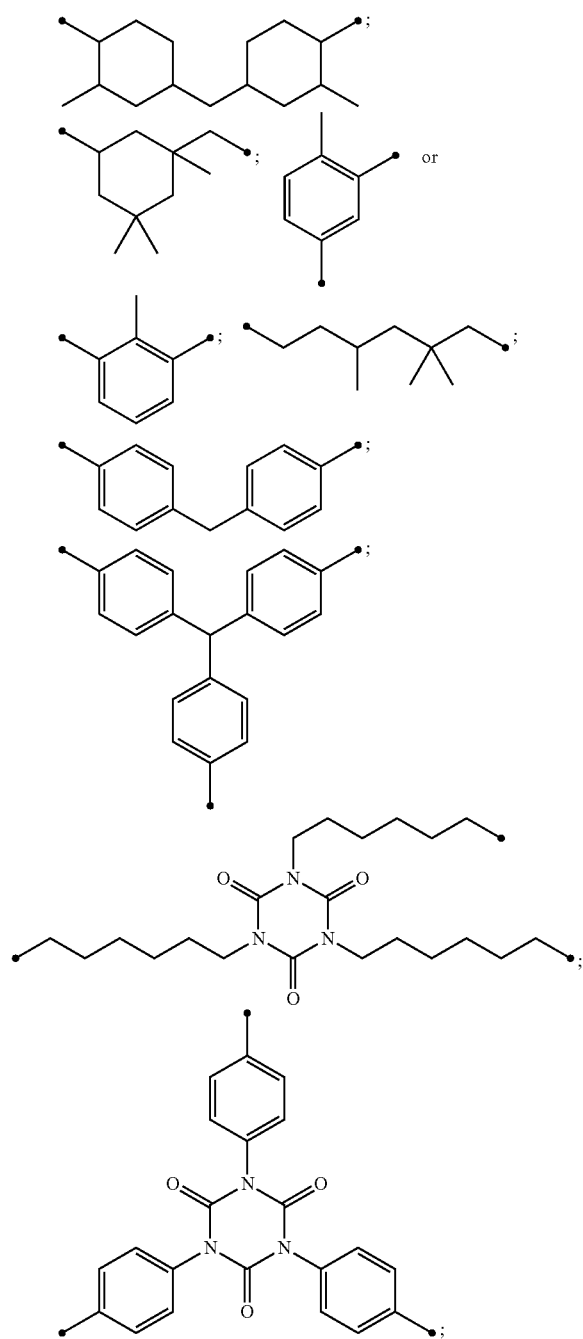

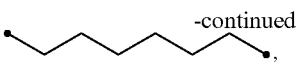

in which each "●———●" represents a linkage to another portion of the ethylenically unsaturated compound.

Clause 61. The ethylenically unsaturated compound of one of clause 53 to clause 60, wherein m+n is no more than 4, such as where m is 1 or 2, such as 1, and n is 1 or 2, such as 1.

Clause 62. An ethylenically unsaturated compound (or the ethylenically unsaturated compound of one of clause 1 to clause 27) comprising a reaction product of reactants comprising: (a) an isocyanate-functional ethylenically unsaturated compound; and (b) an aspartate silane having the structure:

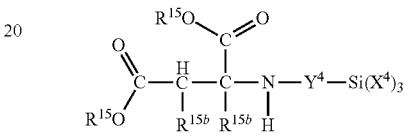

in which each $R^{15}$ and each $X^4$, which may be the same or different, represents an organic group that is inert with respect to isocyanate groups at temperatures of 100° C. or less, with the proviso that at least one $X^4$ represents an alkoxy group, $Y^4$ represents a linear or branched linking group comprising 1 or more carbon atoms, and each $R^{15b}$, which may be the same or different, represents hydrogen or an organic group which is inert towards isocyanate groups at temperatures of 100° C. or less, such as where the ethylenically unsaturated compound has a molecular weight, calculated from the molecular formula of the ethylenically unsaturated compound, of 400 to less than 2000 g/mol, such as 400 to 1000 g/mol.

Clause 63. The ethylenically unsaturated compound of clause 62, wherein the aspartate silane may comprise a reaction product of reactants comprising: (i) an aminoalkyl alkoxysilane of the formula $H_2N$—$(CH_2)_n$—$Si(X^5)_3$ and (ii) a maleic or fumaric acid ester of the formula $R^{16}OOC$—$CR^{18}$=$CR^{18}$—$COOR^{17}$, in which $R^{16}$ and $R^{17}$ represent identical or different organic groups which are isocyanate-inert below 100° C., such as where $R^{16}$ and $R^{17}$ represent identical or different alkyl groups having 1 to 4 carbon atoms, each $R^{18}$, which may be the same or different, represents hydrogen or an organic group which is isocyanate-inert below 100° C. each $X^5$ represents identical or different organic groups which are isocyanate-inert below 100° C., with the proviso that at least one $X^5$ is an alkoxy group, such as where each $X^5$ represents an identical or different alkyl or alkoxy group having 1 to 4 carbon atoms, with the proviso that at least one $X^5$ is an alkoxy group, and n is an integer having a value of 2 to 4, such as 3.

Clause 64. The ethylenically unsaturated compound of clause 63, wherein the aminoalkyl alkoxysilane comprises 2-aminoethyl-dimethylmethoxysilane, 3-aminopropyl-trimethoxysilane, 3-aminopropyl-triethoxysilane, 3-aminopropyl-methyl-diethoxysilane, or a mixture of any two or more thereof.

Clause 65. The ethylenically unsaturated compound of clause 63 or clause 64, wherein the maleic or fumaric acid ester comprises maleic acid dimethyl ester, maleic acid diethyl ester, maleic acid di-n-butyl ester, fumaric acid dimethyl ester, fumaric acid diethyl ester, fumaric acid di-n-butyl ester, or a mixture of any two or more thereof.

Clause 66. The ethylenically unsaturated compound of one of clause 63 to clause 65, wherein the maleic or fumaric acid ester and the aminoalkyl alkoxysilane are present in a molar ratio of acid ester to aminoalkyl alkoxysilane of 0.8 to 1.2:1, 1.0 to 1.2:1, or 1.01 to 1.2:1.

Clause 67. The ethylenically unsaturated compound of one of clause 62 to clause 66, wherein the isocyanate-functional ethylenically unsaturated compound has the structure:

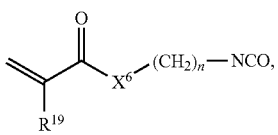

wherein $R^{19}$ represents H or $CH_3$, $X^6$ represents O, S, NH, or NR' in which R' is an alkyl radical, such as an alkyl radical having 1 to 6 carbon atoms, and n is an integer having a value of 2 to 8, such as 2 to 4.

Clause 68. The ethylenically unsaturated compound of clause 67, wherein the isocyanate-functional ethylenically unsaturated compounds comprises isocyanatoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Clause 69. The ethylenically unsaturated compound of one of clause 62 to clause 68, wherein the isocyanate-functional ethylenically unsaturated compound comprises a reaction product of reactants comprising: (i) a monohydroxy-substituted monofunctional and/or multifunctional (meth)acrylate, and (ii) a polyisocyanate.

Clause 70. The ethylenically unsaturated compound of clause 69, wherein the monohydroxy-substituted monofunctional and/or multifunctional (meth)acrylate comprises 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, hydroxyethyl caprolactone (meth)acrylate, caprolactone (meth)acrylate, polypropylene glycol mono acrylate, polyethylene glycol mono acrylate, bis(methacryloyloxy)propanol, bis(acryloyloxy)propanol, pentaerythritol triacrylate, or a combination of any two or more thereof.

Clause 71. The ethylenically unsaturated compound of clause 69 or clause 70, wherein the polyisocyanate comprises 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenyhnethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl) fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, triphenylmethane-4,4',4"-triisocyanate, an aromatic polyisocyanate based on toluene diisocyanate, a polyisocyanurate of toluene diisocyanate, or a combination of any two or more thereof.

Clause 72. The ethylenically unsaturated compound of one of clause 69 to clause 71, wherein the monohydroxy-substituted monofunctional and/or multifunctional (meth)acrylate and the polyisocyanate are used in a molar ratio of monohydroxy-substituted monofunctional and/or multifunctional (meth)acrylate to polyisocyanate of 0.1:1 to 2:1, such as 0.5:1 to 1.5:1 or 1:1.

Clause 73. A method for producing an ethylenically unsaturated compound of one of clause 1 to clause 27 and clause 62 to clause 72, comprising reacting an isocyanate-functional ethylenically unsaturated compound with an aspartate silane, optionally in the presence of a catalyst, to produce an ethylenically unsaturated compound comprising an aspartate group, wherein the aspartate silane has the structure:

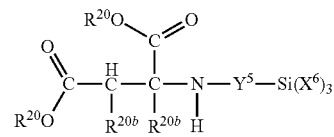

in which each $R^{20}$, which may be the same or different, represents an organic group that is inert with respect to isocyanate groups at temperatures of 100° C. or less, each $R^{20b}$, which may be the same or different, represents hydrogen or an organic group which is inert towards isocyanate groups at temperatures of 100° C. or less, each $X^6$ represents an alkoxy group or an organic group that is inert with respect to isocyanate groups at temperatures of 100° C. or less, with the proviso that at least one $X^6$ represents an alkoxy group, and $Y^5$ represents an organic group that is inert with respect to isocyanate groups at temperatures of 100° C. or less.

Clause 74. The method of clause 73, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 75. The method of clause 73 or clause 74, wherein the reaction takes place at a temperature of 10 to 120° C. or 25 to 100° C.

Clause 76. The method of one of clause 73 to clause 75, wherein the isocyanate-functional ethylenically unsaturated compound and the aspartate silane are used in relative amounts to provide a molar ratio of isocyanate-reactive groups to isocyanate groups of at least 1:1 or more than 1:1 to less than 1.5:1.

Clause 77. The method of one of clause 73 to clause 76, comprises converting the aspartate group to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C.

Clause 78. An ethylenically unsaturated compound (or the ethylenically unsaturated compound of clause 1 or one of clause 28 to clause 61) comprising a reaction product of reactants comprising: (a) a primary amine-containing aspartate and/or a polyaspartate amine; (b) isocyanate-functional ethylenically unsaturated compound; and (c) an isocyanate-functional silane.

Clause 79. The ethylenically unsaturated compound of clause 78, wherein the primary amine-containing aspartate has the structure:

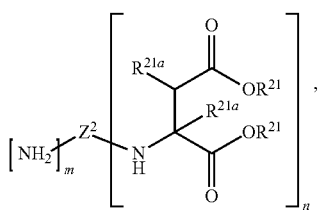

in which $Z^2$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, and each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$, methyl group, an ethyl group, a propyl group or a butyl group, and each $R^{21a}$, which may be the same or different, represents hydrogen or an organic group that is inert to isocyanate groups at temperatures of 100° C. or less, and m and n, which may be the same or different, are each an integer having a value of 1 to 4, such as where m+n is no more than 4, such as where m is 1 or 2, such as 1, and n is 1 or 2, such as 1.

Clause 80. The ethylenically unsaturated compound of clause 78 or clause 79, wherein the polyaspartate amine has the structure:

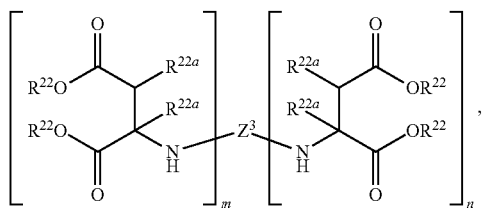

in which $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, each $R^{22a}$, which may be the same or different, represents hydrogen or an organic group that is inert towards isocyanate groups at temperatures of 100° C. or less, each $R^{22}$, which may be the same or different, represents an organic group that is inert towards isocyanate groups at temperatures of 100° C. or less, such as where each $R^{22}$ represents the same or different alkyl group, such as an alkyl group having 1 to 9 or 1 to 4 carbon atoms, such as where each $R^{22}$, methyl group, an ethyl group, a propyl group or a butyl group, and m and n, which may be the same or different, are each an integer having a value of 1 to 4, such as where m+n is no more than 4, such as where m is 1 or 2, such as 1, and n is 1 or 2, such as 1.

Clause 81. The ethylenically unsaturated compound of one of clause 78 to clause 80, wherein the primary amine-containing aspartate and/or the polyaspartate amine is a reaction product of reactants comprising: (i) a primary polyamine corresponding to the formula: $(NH_2)_m Z^3 (NH_2)_n$, in which $Z^3$ is a hydrocarbon group that optionally contains isocyanate-inert oxygen, nitrogen, sulfur, or a combination thereof, and m+n is an integer with a value of at least 2, such as 2 to 4, with a maleic or fumaric acid ester of the formula (with both isomers as represented by wavy bonds):

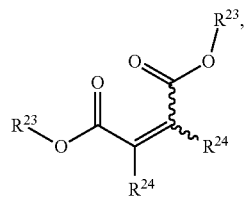

in which each $R^{23}$, which may be the same or different, represents an organic groups that is inert towards isocyanate groups at temperatures of 100° C. or less and each $R^{24}$, which may be the same or different, represents hydrogen or an organic groups that is inert towards isocyanate groups at temperatures of 100° C. or less.

Clause 82. The ethylenically unsaturated compound of clause 81, wherein the primary polyamine comprises ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, 2,5-diamino-2,5-dimethylhexane, 2,2,4- and/or 2,4,4-trimethyl-1,6-diaminohexane, 1,11-diaminoundecane, 1,12-diaminododecane, bis-(3-aminopropyl) ether, 1,2-bis-(3-aminopropyloxy)ethane, 1,3-bis-(3-aminopropyloxy)-2,2'-dimethylpropane, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 1-amino-3,3,5-trimethyl-5-aminomethyl-cyclohexane, 2,4- and/or 2,6-hexahydrotoluylene diamine, 2,4'-and/or 4,4'-diamino-dicyclohexyl methane, 3,3'-dimethyl-4,4'-diamino-dicyclohexyl methane, propane-1,2,3-triamine, pentane-1,3,5-triamine, benzene-1,3,5-triamine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, 2,4'-and/or 4,4'-diaminodiphenyl methane, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, 1,4-bis(aminoethylpiperazine), 1,4-bis(aminopropylpiperazine), 2,6-diaminopyridine, and bis(3,4-diaminophenyl)sulfone, relatively high molecular weight polyether polyamines containing aliphatically bound primary amino groups (such as the JEFFAMINE® products commercially available from Huntsman Corp.), and combinations of any two or more of any of the foregoing.

Clause 83. The ethylenically unsaturated compound of clause 81 or clause 82, wherein the maleic or fumaric acid ester comprises a dimethyl ester of maleic acid, a diethyl ester of maleic acid, a di-n-butyl ester of maleic acid, a dimethyl ester of fumaric acid, a diethyl ester of fumaric acid, a di-n-butyl ester of fumaric acid, a maleic acid ester or fumaric acid ester corresponding to any of the foregoing which is substituted by methyl in the 2- and/or 3-position, or a combination of any two or more thereof.

Clause 84. The ethylenically unsaturated compound of one of clause 81 to clause 83, wherein the primary polyamine and the maleic or fumaric acid ester are present in amounts such that 0.8+m/n to 1.2+m/n, such as 1+m/n primary amino group is present for each olefinic double bond for primary amine-containing aspartate, or such that 0.8 to 1.2, such as 1, primary amino group is present for each olefinic double bond for polyaspartate amine.

Clause 85. The ethylenically unsaturated compound of one of clause 78 to clause 84, wherein the isocyanate-functional ethylenically unsaturated compound has the structure:

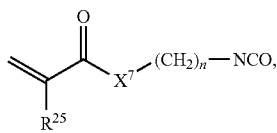

wherein $R^{25}$ represents H or $CH_3$, $X^7$ represents O, S, NH, or NR' in which R' is an alkyl radical, such as an alkyl radical having 1 to 6 carbon atoms, and n is an integer having a value of 2 to 8, such as 2 to 4.

Clause 86. The ethylenically unsaturated compound of clause 85, wherein the isocyanate-functional ethylenically unsaturated compound comprises isocyanatoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Clause 87. The ethylenically unsaturated compound of one of clause 78 to clause 86, wherein the isocyanate-functional ethylenically unsaturated compound comprises a reaction product of reactants comprising: (i) a monohydroxy-substituted monofunctional and/or multifunctional (meth)acrylate, and (ii) a polyisocyanate.

Clause 88. The ethylenically unsaturated compound of clause 87, wherein the monohydroxy-substituted monofunctional and/or multifunctional (meth)acrylate comprises 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, hydroxyethyl caprolactone (meth)acrylate, caprolactone (meth)acrylate, polypropylene glycol mono acrylate, polyethylene glycol mono acrylate, bis(methacryloyloxy)propanol, bis(acryloyloxy)propanol, pentaerythritol triacrylate.

Clause 89. The ethylenically unsaturated compound of clause 87 or clause 88, wherein the polyisocyanate comprises 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenyhnethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl) fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, triphenylmethane-4,4',4"-triisocyanate, an aromatic polyisocyanate based on toluene diisocyanate, a polyisocyanurate of toluene diisocyanate, or a combination of any two or more thereof.

Clause 90. The ethylenically unsaturated compound of one of clause 87 to clause 89, wherein the monohydroxy-substituted monofunctional and/or multifunctional (meth)acrylate and the diisocyanate are present in a molar ratio of monohydroxy-substituted monofunctional and/or multifunctional (meth)acrylate to diisocyanate of 0.1:1 to 2:1, such as 0.5 to 1.5:1 or, in some cases, 1:1.

Clause 91. The ethylenically unsaturated compound of one of clause 78 to clause 90, wherein the isocyanate-functional silane has the structure: $OCN—Y^6—Si(X^8)_3$, in which $Y^6$ represents a linear or branched linking group comprising 1 or more carbon atoms, such as where $Y^6$ comprises a linear or branched alkylene radical having 1 to 8 carbon atoms, such as a linear alkylene radical having 2 to 4 or, in some cases, 3 carbon atoms, or a branched alkylene radical having 5 to 6 carbon atoms, and each $X^8$, represents an alkoxy group or an organic group that is inert towards isocyanate groups at temperatures of 100° C. or less, with the proviso that at least one $X^8$ represents an alkoxy group, such as where each $X^8$ represents an identical or different alkyl, acyloxy, or alkoxy group, such as an identical or different alkyl, acyloxy, or alkoxyl group having 1 to 9 or 1 to 4 carbon atoms, with the proviso that at least one $X^8$ represents an alkoxy group, such as where at least two $X^8$'s represent an alkoxy, such as methoxy, ethoxy, or propyloxy, group, or where each $X^8$ represents an alkoxy, such as methoxy, ethoxy, or propyloxy group.

Clause 92. The ethylenically unsaturated compound of clause 91, wherein the isocyanate-functional silane comprises 3-isocyanatopropyl-methyldimethoxysilane, 3-isocyanatopropyl-trimethoxysilane, 3-isocyanatopropyl-triethoxysilane, or a mixture of any two or more thereof.

Clause 93. A method of producing the ethylenically unsaturated compound of one of clause 1, clauses 28 to 61, or clauses 78 to 92, comprising reacting (a) a primary amine-containing aspartate and/or a polyaspartate amine with (b) an isocyanate-functional ethylenically unsaturated compound and (c) an isocyanate-functional silane, optionally in the presence of a catalyst, to produce an ethylenically unsaturated compound comprising an aspartate group.

Clause 94. The method of clause 93, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 95. The method of clause 93 or clause 94, wherein the reaction takes place at a temperature of 10 to 120° C. or 25 to 100° C.

Clause 96. The method of one of clause 93 to clause 952, wherein the primary amine-containing aspartate and/or a polyaspartate amine, the isocyanate-functional ethylenically unsaturated compound, and the isocyanate-functional silane are used in relative amounts to provide a molar ratio of isocyanate-reactive groups to isocyanate groups of at least 1:1, such as more than 1:1 to less than 1.5:1.

Clause 97. The method of one of clause 93 to clause 96, further comprising converting at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80° to 100° C., 90 to 120° C., or 100 to 120° C.

Clause 98. A composition, such as a coating composition, comprising: (a) the ethylenically unsaturated compound of any one of clause 1 to clause 72 or clause 78 to clause 92, or an ethylenically unsaturated compound produced by the method of any of clause 73 to clause 77 or clause 93 to clause 97.

Clause 99. The composition of clause 98, wherein the ethylenically unsaturated compound is present is an amount of 0.01 to 99% by weight, 0.1 to 20% by weight, 1 to 50% by weight, 5 to 30% by weight, 40 to 70% by weight, 60 to 80% by weight, 65 to 99% by weight, or 0.01 to 20% by weight, based on the total weight solids in the composition.

Clause 100. The composition of clause 98 or clause 99, wherein the composition further comprises (b) an ethylenically unsaturated oligomer that is different from the ethylenically unsaturated compound, such as an ethylenically unsaturated oligomer having a number average molecular weight (Mn) of 1000 g/mol to 35,000 g/mol, 1000 g/mol to 30,000 g/mol, 1000 g/mol to 25,000 g/mol, 1000 g/mol to 20,000 g/mol, 2,200 to 10,000 g/mol, or 2,200 to 5,500 g/mol, as measured by size exclusion chromatography (SEC) according to the procedure described in this specification.

Clause 101. The composition of clause 100, wherein the ethylenically unsaturated oligomer comprises a urethane (meth)acrylate oligomer, comprising a (meth)acrylate group, a urethane group and a backbone, such as where the backbone is a reaction product of: (1) a polyol, such as a diol, (2) a polyisocyanate, such as a diisocyanate, and (3) a hydroxyl group-containing (meth)acrylate.

Clause 102. The composition of clause 101, wherein the polyol comprises a polyether polyol, a polyester polyol, a polycarbonate polyol, a polycaprolactone polyol, an acrylic polyol, or a mixture of any two or more thereof, such as where the polyol comprises a polypropylene glycol.

Clause 103. The composition of clause 101 or clause 102, wherein the number average molecular weight derived from the hydroxyl number of the polyol is 50 to 15,000 g/mol or 1,000 to 8,000 g/mol.

Clause 104. The composition of one of clause 101 to clause 103 wherein the polyisocyanate used to prepare the urethane acrylate oligomer comprises 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, a hexamethylene diisocyanate trimer, triphenylmethane-4,4',4"-triisocyanate, a hexamethylene diisocyanate trimer, an aromatic polyisocyanate based on toluene diisocyanate, polyisocyanurates of toluene diisocyanate, as well as combinations of any two or more thereof.

Clause 105. The composition of one of clause 101 to clause 104, wherein the hydroxyl group-containing (meth)acrylate used to prepare the urethane (meth)acrylate oligomer comprises a (meth)acrylate derived from (meth)acrylic acid and/or an epoxy (meth)acrylate comprising an alkylene oxide, such as 2-hydroxy ethyl(meth)acrylate, 2-hydroxypropylacrylate and 2-hydroxy-3-oxyphenyl(meth)acrylate.

Clause 106. The composition of one of clause 101 to clause 105, wherein the polyol, the polyisocyanate, and the hydroxyl group-containing (meth)acrylate used to prepare the urethane (meth)acrylate oligomer are used in relative amounts such that 0.1 to 0.9 equivalents of a hydroxyl group included in the hydroxyl group-containing (meth)acrylate and 1.0 to 1.5 equivalents of total hydroxyl groups present from the polyol and the hydroxyl group-containing (meth)acrylate are used for one equivalent of isocyanate group included in the polyisocyanate.

Clause 107. The composition of one of clause 100 to clause 106, wherein the ethylenically unsaturated oligomer is present in an amount of 1 to 99% by weight, 1 to 90% by weight, 5 to 95% by weight, 10 to 90% by weight, 10 to 80% by weight or 30 to 90% by weight, or 50 to 80% by weight, based on the total weight of solids in the composition.

Clause 108. The composition of one of clause 98 to clause 107, wherein the composition further comprises (c) a reactive diluent compound comprising one or more ethylenically unsaturated groups.

Clause 109. The composition of clause 108, wherein the reactive diluent comprises one double bond, such as an alkyl or hydroxyalkyl (meth)acrylate, such as methyl (meth)acrylate, ethyl (meth)acrylate, butyl (meth)acrylate, 2-ethylhexyl (meth)acrylate, 2-hydroxyethyl (meth)acrylate, isobornyl (meth)acrylate, lauryl (meth)acrylate, ethoxylated nonylphenol (meth)acrylate, phenoxyethyl (meth)acrylate, diethylene-glycol-ethyl-hexyl acylate (DEGEHA), acrylonitrile, acrylamide, methacrylamide, an N-substituted (meth)acrylamide, a vinyl ester (such as vinyl acetate), styrene, an alkylstyrene, a halostyrene, a N-vinylpyrrolidone, a N-vinyl caprolactam, a vinyl chloride, a vinylidene chloride, or a mixture of any two or more thereof.

Clause 110. The composition of clause 108, wherein the reactive diluent comprises more than one double bond, such as ethylene glycol di(meth)acrylate, propylene glycol di(meth)acrylate, neopentyl glycol di(meth)acrylate, hexamethylene glycol di(meth)acrylate, bisphenol A di(meth)acrylate, 4,4'-bis(2-acryloyloxyethoxy)diphenylpropane, trimethylolpropane tri(meth)acrylate, pentaerythritol tri(meth)acrylate, pentaerythritol tetra(meth)acrylate, vinyl (meth)acrylate, divinyl benzene, divinyl succinate, diallyl phthalate, triallyl phosphate, triallyl isocyanurate, tris(2-acryloylethyl)isocyanurate, or a mixture of any two or more thereof.

Clause 111. The composition of any one of clause 108 to clause 110, wherein the reactive diluent is present in an amount of 1 to 99% by weight, 5 to 90% by weight, 10 to 90% by weight, 10 to 80% by weight, or, in some cases, 10 to 60% by weight, 10 to 40% by weight, or 10 to 30% by weight, based on the total weight of solids in the composition.

Clause 112. The composition of any one of clause 98 to clause 111, wherein the composition further comprises (d) a photoinitiator.

Clause 113. The composition of clause 112, wherein the photoinitiator comprises an acylphosphine oxide, such as a bisacylphosphine oxide (BAPO) and/or a monoacylphosphine oxide (MAPO), an α-hydroxy ketone, or a mixture of any two or more thereof.

Clause 114. The composition of clause 113, wherein the photoinitiator comprises a bisacylphosphine oxide having the structure:

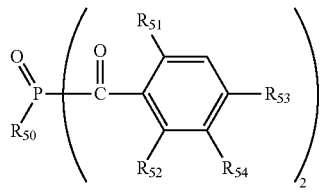

in which wherein $R_{50}$ is $C_1$-$C_{12}$ alkyl, cyclohexyl or phenyl, which is unsubstituted or is substituted by 1 to 4 halogen atoms, or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl, such as where the bisacylphosphine oxide comprises bis(2,4,6-trimethylbenzoyl)-phenylphosphine oxide, bis(2,4,6-trimethylbenzoyl)-(2,4-bis-pentyloxyphenyl)phosphine oxide, or a mixture thereof Clause 115. The composition of one of clause 112 to clause 114, wherein the photoinitiator is present in an amount of 0.1 to 10% by weight, such as 0.1 to 5% by weight, or, in some cases, 1 to 5% by weight, based on the total weight of the radiation curable composition.

Clause 116. The composition of one of clause 98 to clause 115, wherein the composition further comprises (e) gamma-mercaptopropyltrimethoxysilane, trimethoxysilylpropyl acrylate, 3-trimethoxysilylpropane-1-thiol, a poly-silane, or a mixture of any two or more thereof, such as where the a poly-silane comprises: (a) at least two, in some cases two, moieties of the structure (1):

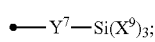

and (b1) a moiety of the structure (2):

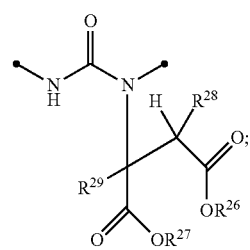

(b2) a moiety of the structure (3):

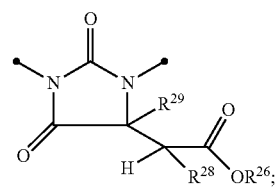

or (b3) a combination of a moiety of the structure (2) and a moiety of the structure (3), in which (i) $Y^7$ represents a linear or branched linking group comprising 1 or more carbon atoms, (ii) each $X^9$ represents an alkoxy group or an organic group that is inert towards isocyanate groups at temperatures of 100° C. or less, with the proviso that at least one $X^9$ represents an alkoxy group, (iii) $R^{26}$ and $R^{27}$, which may be the same or different, each represent an organic group that is inert to isocyanate groups at temperatures of 100° C. or less; (iv) $R^{28}$ and $R^{29}$, which may be the same or different, each represent hydrogen or an organic group that is inert to isocyanate groups at temperatures of 100° C. or less; and (v) each "———●" represents a linkage to another portion of the poly-silane.

Clause 117. The composition of one of clause 98 to clause 116, wherein the composition has a total silane content (determined as described in the Examples section of this specification) of up to 10 mmol, such as 1 to 10 mmol, 1 to 8 mmol, or, in some cases 2 to 6 mmol, per 100 gram of the radiation curable composition and/or the composition has a total content of urea+urethane (determined as described in the Examples section of this specification) of 20 to 200 mmol, such as 30 to 150 mmol, or, in some cases 40 to 100 mmol, per 100 gram of the composition.

Clause 118. The composition of one of clause 98 to clause 117, wherein the composition further comprises an additive that comprises a photosensitizer, a radiation cure amine synergist, a UV absorber, an antioxidant, a UV stabilizer, a thermo stabilizer, a filler material, a train transfer thiol compound, a surface active compound, a viscosity modifier, an additional addition promoter, a water scavenger, such as TEOS and orthoformate, an oxygen quencher or a functional material, such as pigments, dyes, photochromic dyes, laser dyes, liquid crystals, light emitting materials, nano materials, quantum dots, fluorescent materials, dichroic dyes, antistatic materials, refractive index modifier and bioactive materials.

Clause 119. The composition of one of clause 98 to clause 118, wherein the composition further comprises organic solvent.

Clause 120. The composition of one of clause 98 to clause 119, wherein the composition has a viscosity of at least >0.1 Pascal seconds (Pa·s), at least 0.2, at least 0.5, at least 1 Pa·s, and/or less than 15 Pa·s, less than 12 Pa·s, or less than 10 Pa·s, or 1 to 15 Pa·s, 2 to 12 Pa·s, or 3 to 10 Pa·s, wherein viscosity is measured at 25° C. and a shear rate of 50 s-1.

Clause 121. A cured coating formed from the composition of one of clause 98 to clause 120.

Clause 122. A substrate at least partially coated with a cured coating of clause 121, such as where the substrate comprises an optical fiber.

Clause 123. The substrate of clause 122, further comprising a secondary coating in contact with and surrounding the cured coating and, optionally, an ink layer disposed on the secondary coating.

Clause 124. The substrate of clause 122 or clause 123, wherein the cured coating has a tensile modulus of less than less than 5 MPa, less than 2 MPa, less than 1.5 MPa, or less than 1.0 MPa.

Clause 125. The substrate of any one of clause 122 to clause 124, wherein the cured coating exhibits a peel strength of at least 40 gf/in, or at least 55 gf/in, when measured at least 7 days after as described in the Examples section of this specification.

Clause 126. The substrate of any one of clause 122 to clause 125, wherein the cured coating exhibits an elongation at break of at least 35%, such as at least 50%, when measured as described in the Examples section of this specification.

Clause 127. A method for coating an optical fiber comprising: (a) providing a glass optical fiber, such as by drawing a glass optical fiber through a draw tower; (b) applying a primary coating composition onto the surface of the glass optical fiber; (c) optionally, imparting a dose of UV light sufficient to at least partially cure said primary coating composition; (d) applying a secondary coating composition to the primary coating composi©n; (e) exposing the secondary coating composition to at least one radiation source capable of emitting ultraviolet radiation to affect curing of said secondary coating composition and, optionally said primary coating composition, to form a cured primary coating on the surface of the optical fiber, and a cured secondary coating on the surface of the cured primary coating, wherein the primary coating composition and/or the secondary coating composition comprises a composition of any one of clause 98 to clause 120.

Clause 128. A coated optical fiber comprising: (a) a glass core and a cladding layer in contact with and surrounding said glass core; and (b) a coating portion at least partially coating the cladding layer, the coating portion comprising: (i) a primary coating layer in contact with said cladding layer; and (ii) a secondary coating layer in contact with and surrounding said primary coating layer, wherein the primary coating layer and/or the secondary coating layer is a cured product of a composition of any one of clause 98 to clause 120.

Clause 129. The coated optical fiber of clause 128, wherein the core comprises pure silica glass (SiO2) or silica glass with one or more dopants, such as where the dopants comprise $GeO_2$, $Al_2O_3$, $P_2O_5$, $TiO_2$, $ZrO_2$, $Nb_2O_5$, $Ta_2O_5$, or a combination of any two or more thereof.

Clause 130. The method of clause 127 or the coated optical fiber of clause 128 or clause 129, wherein the cured primary coating has an in-situ glass transition temperature of less than −35° C., less than −40° C., less than −45° C., or not more than −50° C., and/or the cured primary coating has a thickness of 20 to 50 µm, 20 to 40 µm, 20 to 30 µm, 25 or 32.5 µm, or 15 to 25 µm.

Clause 131. The method of clause 127 or clause 130 or the coated optical fiber of one of clause 128 to clause 129, wherein the secondary coating exhibits an in-situ tensile modulus of greater than 800 MPa, greater than 1110 MPa, greater than 1300 MPa, greater than 1400 MPa, or greater than 1500 MPa, 1000 MPa to 8000 MPa, 1200 MPa to 5000 MPa, or 1500 MPa to 3000 MPa, and/or an in-situ Tg of 50° C. to 120° C. or 50° C. to 100° C., and/or a thickness of no more than 40 µm, 20 to 40 µm, or 20 to 30 µm.

Clause 132. The coated optical fiber of one of clause 128 to clause 129, wherein the coated optical fiber possesses a mode-field diameter from 8 to 10 µm at a wavelength of 1310 nm, a mode-field diameter from 9 to 13 µm at a wavelength of 1550 nm, and/or an effective area of 20 to 200 µm².

The non-limiting and non-exhaustive examples that follow are intended to further describe various non-limiting and non-exhaustive implementations without restricting the scope of the implementations described in this specification.

EXAMPLES

TABLE 1

| Materials Used | | | |
|---|---|---|---|
| Component | Chemical Descriptor | Trade name | Supplier |
| DBTDL | Dibutyltin Dilaurate | DABCO T-12 | EVONIK |
| Coscat 83 | Organobismuth catalyst | Coscat 83 | Vertellus |
| BHT | Butylated hydroxytoluene | | Acros |
| Acrylic Acid | Acrylic Acid | | Sigma-Aldrich |
| AOI | 2-Isocyanatoethyl acrylate | AOI-VM | Karenz |
| IPDI | Isophorone diisocyanate | DESMODUR I | Covestro |
| TDI | 2,4-diisocyanato-1-methyl-benzene | DESMODUR T 100 SP | Covestro |
| PPG-4000 | Polypropylene glycol | ACCLAIM POLYOL 4200 | Covestro |
| IPDA | Isophorone diamine | | Sigma-Aldrich |
| HEA | 2-Hydroxyethyl acrylate | | BASF |
| Diethyl maleate | Diethyl maleate | | Acros |
| KBM-903 | 3-Aminopropyltrimethoxysilane | KBM-903 | Shin-Etsu Silicone |
| TMSPI | 3-Isocyanotopropy ltrimethoxy silane | | Gelest |
| TESPI | 3-(Triethoxysilyl)propyl isocyanate | | Sigma-Aldrich |

TABLE 1-continued

Materials Used

| Component | Chemical Descriptor | Trade name | Supplier |
|---|---|---|---|
| PEA | 2-Propenoic acid, 2-phenoxyethyl ester | AgiSyn 2832 | Covestro |
| Antioxidant 1520 | 2-methyl-4,6-bis(octylsulfanylmethyl)phenol | Irganox 1520 | BASF |
| TPO | Diphenyl(2,4,6-trimethylbenzoyl)phosphine oxide | Speedcure TPO | Lambson |
| Acrylated Silane TMPSA | 3-(Trimethoxysilyl)propyl acrylate | KBM-5103 | Shin-Etsu |
| Mercaptosilane | Gamma-Mercaptopropyltrimethoxysilane | Silquest Y-11167 | Momentive |
| Jeffamine T-403 | Polyetheramine | Jeffamine T-403 | Huntsman |

Many materials used herein were made resulting in a mixture having a statistical distribution of molecular weight that can be easily recognized by those skilled in the art. The structures in this section, and elsewhere herein, only show the designed averaged, or "ideal" structure, unless otherwise noted.

Example 1: Synthesis of Mono-Aspartic Precursor

IPDA (149 g, 0.87 mol) was added to a four-necked flask (1000 mL), purged with dry air, and cooled to 5° C. using an ice bath. Diethyl maleate (152 g, 0.88 mol) was then added dropwise, keeping the mixture below 10° C. Upon addition the mixture was stirred for 2 hours and allowed to warm up to 20-25° C. to yield the final product mixture comprising a compound of structure (A) as a viscous liquid. The product was then available to be used in subsequent formulation without further purification. The structure (A) appears below:

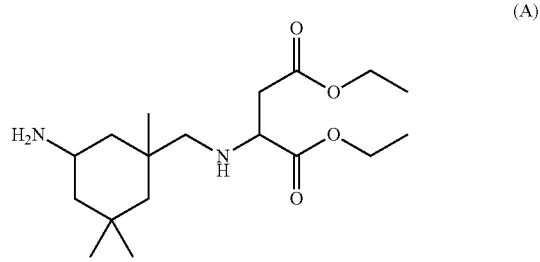 [SMILES: CCOC(=O)CC(NCC1(C)CC(N)CC(C)(C)C1)C(=O)OCC]

(A)

Example 2: Synthesis of Polyaspartic Precursor

IPDA (738 g, 4.3 mol) was added to a four-necked flask (5000 mL), purged with dry air, and cooled to 10° C. using an ice bath. Diethyl maleate (1500 g, 8.7 mol) was then added dropwise, keeping the mixture below 15° C. Upon addition the mixture was stirred for 4 hours and allowed to warm up to 20-25° C. to yield the final product mixture comprising a compound of structure (B) as a viscous liquid. The product was then available to be used in subsequent formulation without further purification. The structure (B) appears below:

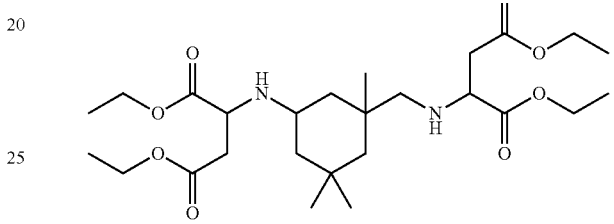

(B)

Example 3: Synthesis of Tri-Aspartic Precursor

Jeffamine T-403 (240 g, 0.5 mol) and BHT (0.5 g, 1000 ppm) was added to a four-necked flask (1000 mL) and purged with dry air. Diethyl maleate (260 g, 1.5 mol) was then added dropwise. Upon addition the mixture was stirred for 6 hours and stored for 6 months to yield the final product mixture comprising a structure (C) as a viscous liquid. The product was then available to be used in subsequent formulation without further purification. The structure (C) appears below:

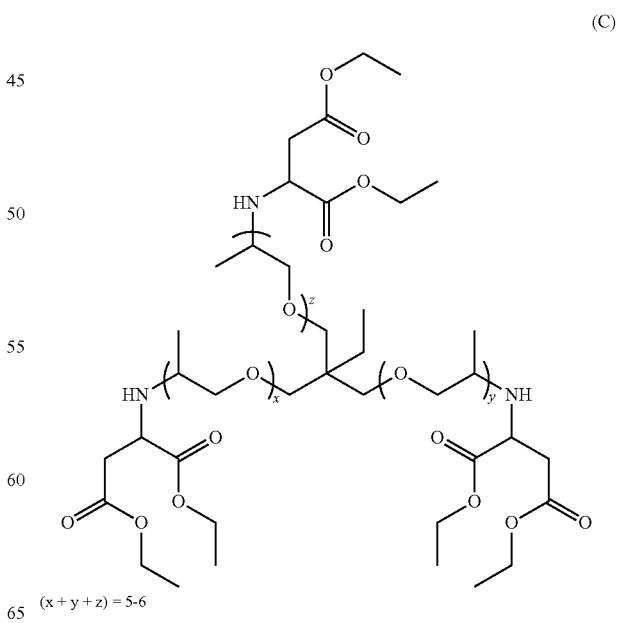

(C)

$(x+y+z) = 5-6$

Example 4: Synthesis of Silane Precursor

KBM-903 (182 g, 1 mol) was placed in a four-necked flask (500 ml) and then cooled down to 0-5° C. (ice bath) under nitrogen before the addition of diethyl maleate (175 g, 1 mol) dropwise. The resulting mixture was then stirred at 0-10° C. for 0.5-3 hours to yield the final product mixture comprising a compound of structure (D) as a viscous liquid. The product was then available to be used in subsequent formulation without further purification. The structure (D) appears below:

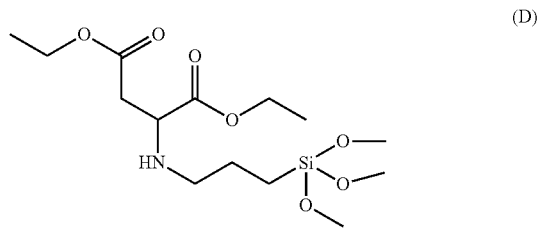 [SMILES: CCOC(=O)CC(NCCC[Si](OC)(OC)OC)C(=O)OCC]

(D)

Example 5: Synthesis of Ethylenically Unsaturated Compound 1

To create Compound 1, the silane precursor from Example 4 (70.2 g, 0.2 mol) was placed in a four necked flask (250 ml) and purged with a gaseous mixture consisting of air and nitrogen in a 3:1 ratio by volume. Then, DBTDL (0.06 g, 600 ppm), BHT (0.10 g, 1000 ppm), and AOI (28.6 g, 0.20 mol) were each added sequentially. While still under the purge of the 3:1 air/nitrogen mixture, the reaction mixture was further stirred at 70° C. for another 2-4 hours to yield the final product mixture comprising a compound of structure (E) as a viscous liquid. The product was then available to be used in subsequent formulation without further purification. The structure (E) appears below:

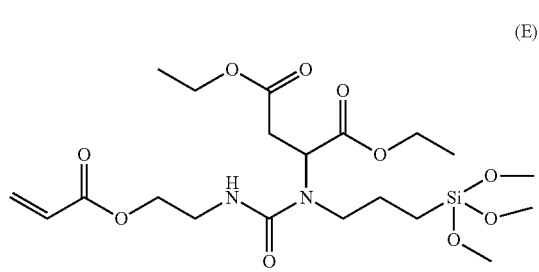 [SMILES: C=CC(=O)OCCNC(=O)N(CCC[Si](OC)(OC)OC)C(CC(=O)OCC)C(=O)OCC]

(E)

Example 6: Synthesis of Ethylenically Unsaturated Compound 2

To create Compound 2, a mixture of TDI (81.5 g, 0.47 mol) and BHT (1000 ppm) was placed in a four-necked flask (500 ml) and then purged with dry air. The resulting mixture was then stirred at 20-25° C. for 10 mins before the addition of HEA (54.3 g, 0.47 mol) and Coscat 83 (0.1 g, 300 ppm) sequentially with active cooling. The resulting mixture was then stirred at 85° C. for 1-2 hours. Then, the silane precursor from Example 4 (164.4 g, 0.47 mol) was added. While still under the purge of dry air, the reaction mixture was further stirred at 60° C. for another 1-2 hours to yield the final product mixture comprising a comp©d of structure (F) as a viscous liquid. The product was then available to be used in subsequent formulation without further purification. The structure (F) appears below:

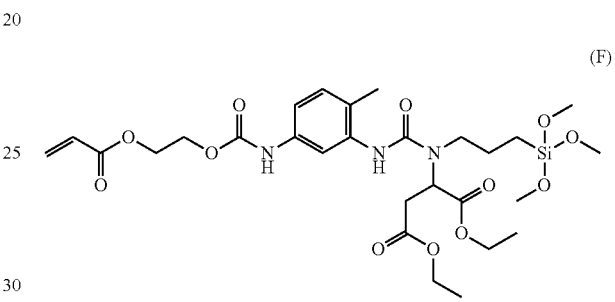

(F)

Example 7: Synthesis of Ethylenically Unsaturated Compound 3

To create Compound 3, a mixture of IPDI (64.4 g, 0.29 mol), BHT (0.2 g, 1000 ppm), and Coscat 83 (0.13 g, 600 ppm) was placed in a four-necked flask (500 ml) and then purged with dry air. The resulting mixture was then stirred at 20-25° C. for 10 mins before the addition of HEA (33.6 g, 0.29 mol). The resulting mixture was then stirred at 60° C. for 1-2 hours. Then, the silane precursor from Example 4 (101.8 g, 0.29 mol) was added. While still under the purge of dry air, the reaction mixture was further stirred at 60° C. for another 5-8 hours to yield the final product mixture comprising a compound of structure (G) as a viscous liquid. The product was then available to be used in subsequent formulation without further purification. The structure (G) is shown below:

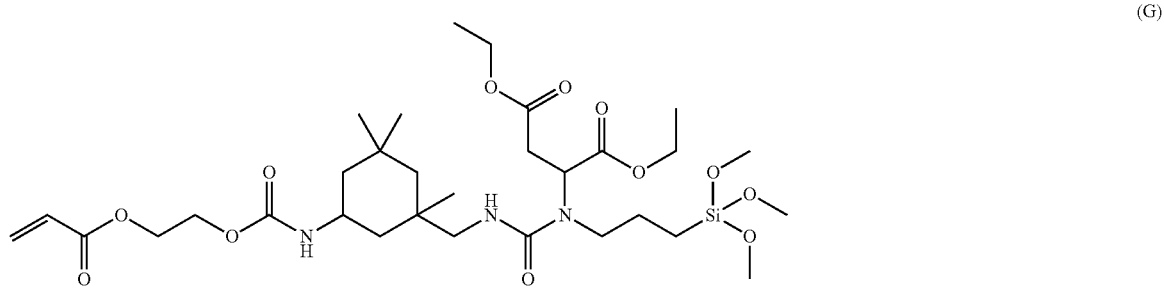 [SMILES: C=CC(=O)OCCOC(=O)NC1CC(C)(C)CC(C)(CNC(=O)N(CCC[Si](OC)(OC)OC)C(CC(=O)OCC)C(=O)OCC)C1]

(G)

Example 8: Synthesis of Ethylenically Unsaturated Compound 4

To create Compound 4, the compound 1 of Example 5 (150 g) was placed in a four-necked flask (500 ml) and then purged with dry air. The resulting mixture was then heated to 70-80° C. before the addition of acrylic acid (1.5 g, 1%). The resulting mixture was then stirred at 85° C. for 8 hours to yield the final product mixture comprising a compound of structure (H) as a viscous liquid. The product was then available to be used in subsequent formulation without further purification. The structure (H) is shown below:

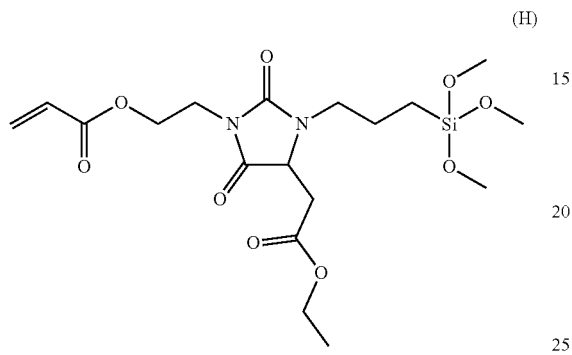

(H)

Example 9: Synthesis of Ethylenically Unsaturated Compound 5

To create Compound 5, the mono-aspartic precursor of Example 1 (50 g, 0.15 mol) was added to a four-necked flask (500 ml) and purged with dry air. AOI was then added dropwise (20 g, 0.15 mol). The resulting mixture was then stirred at 60° C. for 3 hours. Then TMSPI (28 g, 0.14 mol) was added dropwise and stirred at 60° C. for 5 hours to yield the final product mixture comprising a compound of structure (I) as a viscous liquid. The product was then available to be used in subsequent formulation without further purification. The structure (I) is shown below:

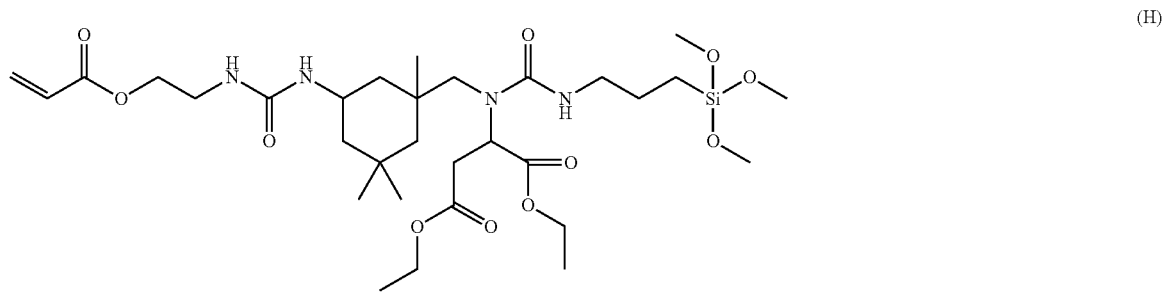 [SMILES: C=CC(=O)OCCNC(=O)NC1CC(C)(C)CC(C)(CN(C(=O)NCCC[Si](OC)(OC)OC)C(CC(=O)OCC)C(=O)OCC)C1]

(H)

Example 10: Synthesis of Ethylenically Unsaturated Compound 6

To create Compound 6, the polyaspartic precursor of Example 2 (57 g, 0.11 mol) was added to a four-necked flask (500 ml) and purged with dry air. AOI was then added dropwise (16 g, 0.11 mol). The resulting mixture was then stirred at 60° C. for 4 hours. Then TESPI (27 g, 0.11 mol) was added dropwise. The resulting mixture was then stirred at 60° C. for 13 hours to yield the final product mixture comprising a structure (J) as a viscous liquid. The product was then available to be used in subsequent formulation without further purification. The structure (J) is shown below:

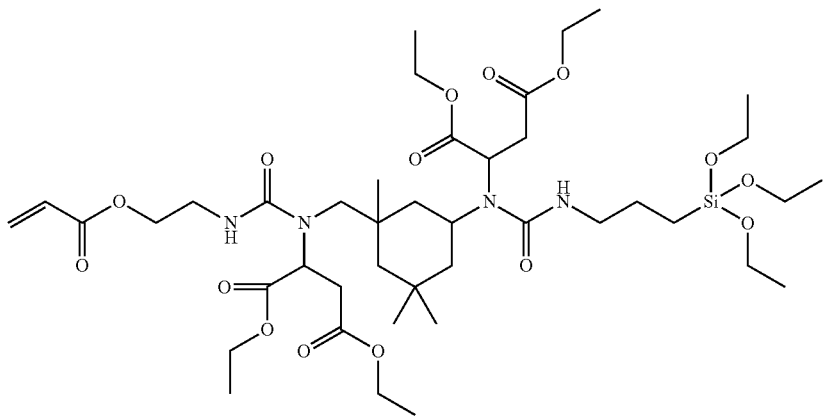

(J)

Example 11: Synthesis of Ethylenically Unsaturated Compound 7

To create Compound 7, the compound 6 of Example 10 (57 g) was placed in a four-necked flask (500 ml) and then purged with dry air. The resulting mixture was then heated to 70-80° C. before the addition of acrylic acid (5.6 g, 1%). The resulting mixture was then stirred at 85° C. for 2 hours to yield the final product mixture comprising a compound of structure (K) as a viscous liquid. The product was then available to be used in subsequent formulation without further purification. The structure (K) is shown below:

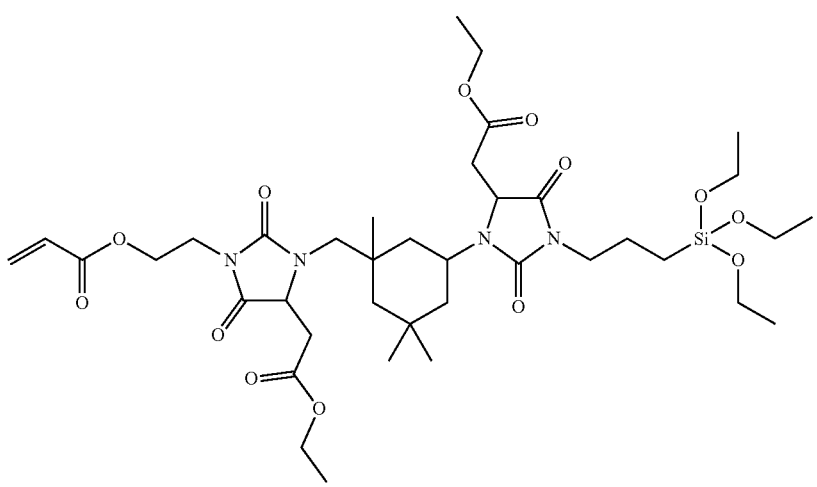

(K)

Example 12: Synthesis of Ethylenically Unsaturated Compound 8

To create Compound 8, tri-aspartic precursor of Example 3 (128 g, 0.13 mol) and BHT (0.2 g, 1000 ppm) were placed in a four-necked flask (500 ml) and then purged with dry air. A mixture of AOI (18 g, 0.13 mol) and TMPSI (53 g, 0.26 mol) was then added to the flask. The resulting mixture was then stirred at 70° C. for 15 hours to yield the final product mixture comprising a compound of structure (L) as a viscous liquid. The product was then available to be used in subsequent formulation without further purification. The structure (L) is shown below:

(L)

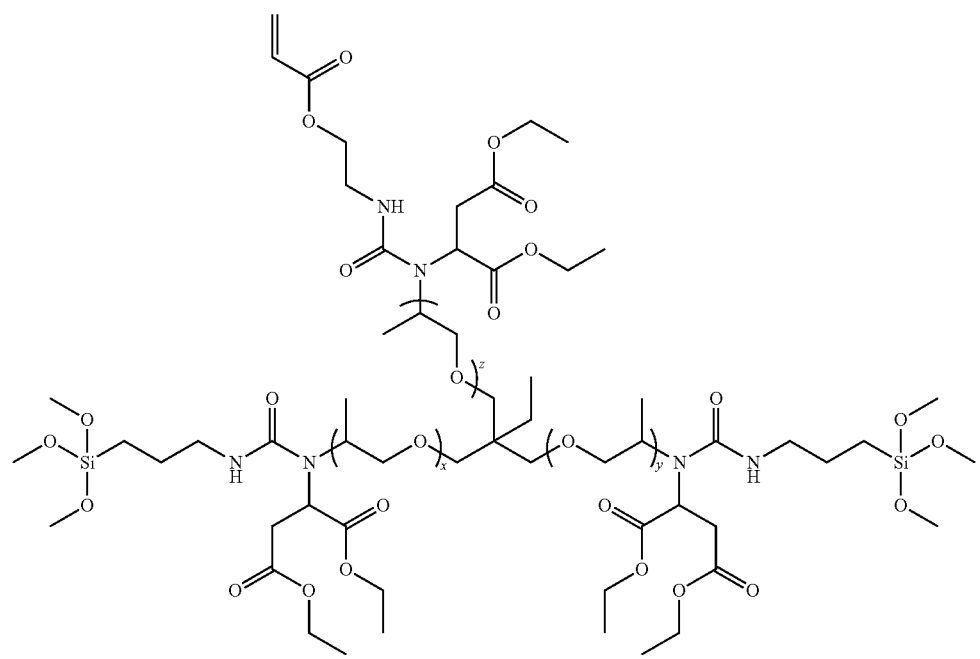

(x + y + z) = 5-6

Example 13: Synthesis of Oligomer 1

To create Oligomer 1, a mixture of PPG 4000 (3474 g, 0.9 mol), TDI (313 g, 1.8 mol), and BHT (4 g, 1000 ppm) was placed in a four-necked flask (5000 ml) and purged with dry air. The resulting mixture was then stirred at 20-25° C. for 15 mins before the addition of mixture of DBTDL (1.6 g, 400 ppm). The resulting mixture was then stirred without external heat for 15 minutes, then stirred at 60° C. for 1-2 hours. Then HEA (208 g, 1.8 mol) was added. While still under the purge of dry air, the reaction mixture was stirred at 85° C. for another 1-2 hours to yield the final product mixture comprising a compound of structure (M) as a viscous liquid. The product was then available to be used in subsequent formulation without further purification. The structure (M) is shown below:

Example 14: Synthesis of Oligomer 2

To create Oligomer 2, a mixture of PPG 4000 (74.3 kg, 19.1 mol), HEA (2.2 kg, 19.1 mol), BHT (80 g, 1000 ppm), acrylic acid (40 g, 0.56 mol), TDI (3.3 kg, 19.1 mol), and DBTDL (64 g, 800 ppm) were added sequentially to a batch reactor (180 L). The resulting mixture was then stirred at 70° C. for 2-4 hours to yield the final product mixture compris-ing a compound having the structure (N) as a viscous liquid. The product was then available to be used in subsequent formulation without further purification. The structure (N) is shown below:

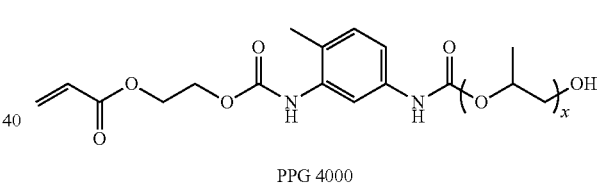

PPG 4000

Reactants for making all compound and oligomer examples are listed in Tables 2 and 3. For the ethylenically unsaturated compounds that comprise silane, silane content in the compound was determined by the number of silane groups (in which "silane groups" refers to groups of the structure $Si(X)_3$, in which X represents an alkoxy group or an organic group that is inert towards isocyanate groups at temperatures of 100° C. or less, with the proviso that at least one X represents an alkoxy group) in the compound divided by the theoretical molecular mass of the compound (in (K)

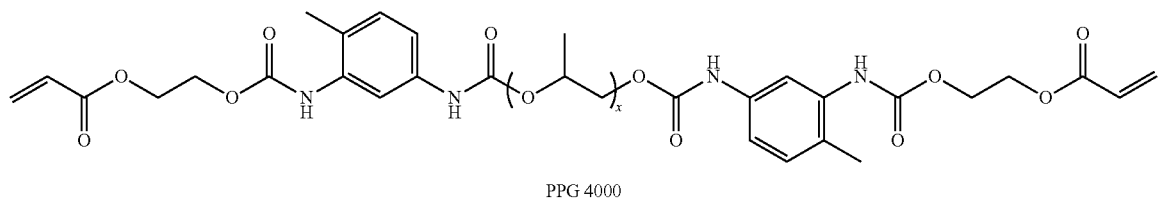

PPG 4000 g/mol). The unit of the calculated number was then multiplied by 100,000 to convert to mmol/100 g of compound. The theoretical molecular mass values for the reactants used in creating the compounds from Table 2 were used to calculate the theoretical molecular mass of the compounds. When used as adhesion promoters, it is preferred that the ethylenically unsaturated compounds don't have significant impact to other formulation properties so the weight percentage of the ethylenically unsaturated compounds in formulation is preferred to be kept low. To keep the same level of silane content in formulated product, less weight percentage of ethylenically unsaturated compound in formulation is desired if silane content in the compound is higher. All ethylenically unsaturated compounds 1-8 have a silane content of more than 60 mmol/100 grams of compound. Compound 1 and compound 4 have a silane content of >160 mmol/100 grams of compound.

method, after which the inventive ethylenically unsaturated compound was added, resulting in 100 g total. Finally, the mixture was mixed again for an additional 3 minutes in the SpeedMixer again via the same method.

These formulations were next characterized according to their respective total silane content and total urea+urethane content per the methodology described below. Then, all formulations were tested according to the methods described below to determine their peel strength, elongation percentage, film modulus, toughness, tensile strength, and viscosity. Unless otherwise shown, values for total silane content are rounded to one decimal place and values for the urea+urethane content are rounded to the nearest whole number. Film modulus, toughness, and tensile strength values, meanwhile, have been rounded to two decimal places. Viscosity is presented to the nearest one centipoise unit. Finally, elongation percentage values are presented as rounded to the

TABLE 2

Reactants for Ethylenically Unsaturated Compounds 1-8 (in mole ratios) and silane content

| Reactant | MW (g/mol) | 1 | 2 | 3 | 4 | 5 | 6 | 7 | 8 |
|---|---|---|---|---|---|---|---|---|---|
| TDI | 174.2 | — | 1 | — | — | — | — | — | — |
| IPDI | 222.3 | — | — | 1 | — | — | — | — | — |
| 2-Isocyanatoethyl Acrylate | 141.1 | 1 | — | — | 1 | 1 | 1 | 1 | 1 |
| HEA | 116.1 | — | 1 | 1 | — | — | — | — | — |
| TMSPI | 205.3 | — | — | — | — | 1 | — | — | 2 |
| TESPI | 247.4 | — | — | — | — | — | 1 | 1 | — |
| Silane Precursor from Example 4 | 351.5 | 1 | 1 | 1 | 1 | — | — | — | — |
| Mono-aspartic Precursor from Example 1 | 342.5 | — | — | — | — | 1 | — | — | — |
| Polyaspartic precursor from Example 2 | 514.7 | — | — | — | — | — | 1 | 1 | — |
| Tri-aspartic Precursor from Example 3 | 992.7 | — | — | — | — | — | — | — | 1 |
| Silane Content (mmol/100 g of compound) | | 203.2 | 155.8 | 144.9 | 223.7 | 145.1 | 110.7 | 123.3 | 64.8 |

TABLE 3

Reactants for Oligomers 1-2 (in mole ratios)

| Reactant | MW (g/mol) | 1 | 2 |
|---|---|---|---|
| TDI | 174.2 | 2 | 1 |
| HEA | 116.1 | 2 | 1 |
| PPG 4000 | ~4000 | 1 | 1 |

Formulations 1-27

Each of the formulations described in Tables 4A-4G was prepared by mixing a 100 g sample in a 100 ml mixing cup suitable for use with a SpeedMixer™. Specifically, the oligomer and monomer components, not including the inventive ethylenically unsaturated compound, were mixed in addition to the other components as specified in Tables 4A-4G below. Upon addition to the cup, the cup was closed and mixed in a SpeedMixer™ DAC150FVZ at 3000 RPM for 3 minutes. After this, the mixing operation was stopped, and the resulting mixture was transferred to a suitable receptacle and then heated to 60° C. in an oven and maintained at this temperature for about 6 hours to ensure complete dissolution of all components. The sample was then removed from the oven and mixed again for three additional minutes in the SpeedMixer again via the same nearest 1%. Values for each of these measured characteristics are reported in Tables 4A-4G below.

The "Total Silane" for a given composition was determined by first calculating the amount of moles of silane groups (in which "silane groups" refers to groups of the structure $Si(X)_3$, in which X represents an alkoxy group or an organic group that is inert towards isocyanate groups at temperatures of 100° C. or less, with the proviso that at least one X represents an alkoxy group) in each silane containing component (Y) in accordance with the following expression:

$$Y = \frac{N * Wt}{MW} * 1000$$

where Wt=the amount by weight of the respective component Y relative to 100 g of the total associated composition; N=the number of silane groups present in one molecule of component Y; and MW is the theoretical molecular mass of component Y (in g/mol). The total silane content is reported in units of mmol/100 g. The theoretical molecular mass values for the reactants used in creating the compounds and oligomers (including the silane containing compounds and oligomers) of the formulations herein are reported in Tables 2-3.

Then, the value for total silane for the entire composition was calculated by adding up the values of moles of silane groups for each silane-containing component according to the following expression:

$$\sum_{i=1}^{n} Y_i = Y_1 + Y_2 + Y_3 + \ldots + Y_n$$

The values for total silane herein are reported in units of mmol/100 g. The values for total silane may be optionally expresses in units of mol/100 g by dividing the summed value by 1000, although unless specifically noted, the values herein are not reported in this fashion. F or clarity, where "equivalents" or "milliequivalents" is specified herein, unless otherwise noted, the value is to be interpreted in reference to 100 g of the composition with which it is associated. Total silane values for each formulation are presented in Table 4A-4G below.

It should be noted that if the complete recipe of a composition is not known ex ante, the equivalents of silane moieties may be determined analytically via any suitable method as will be appreciated by the skilled artisan to which this invention applies, such as via size exclusion chromatography (SEC), infrared spectroscopy, HPLC, MALDI-TOF mass spectrometry, or nuclear magnetic resonance (NMR) methods.

Values for the urea+urethane content were determined via the same method as that prescribed for "Total Silane" above, except for the fact that instead of assessing silane groups or silane containing components, total isocyanate groups used in preparation of the ethylenically unsaturated compound that are reacted with an isocyanate-reactive compound were counted.

Viscosity was measured using Anton Paar Rheolab QC. The instrument was set up for the Z3 and Z4 system, both of which were used. Samples for using the Z3 system were weighed out in the amount of 14.7 g±0.2 g and loaded into a disposable aluminum cup, while those for the Z4 system had a mass of 3.5 g±0.2 g. The sample in the cup was examined and if upon visual inspection it was determined to contain bubbles, the sample and cup were either subjected to centrifugation or allowed to sit long enough so that the bubbles would escape from the bulk of the liquid. Bubbles appearing at the top surface of the liquid were considered to be acceptable. Next, the bob was gently loaded into the liquid in the measuring cup, after which the cup and bob were installed in the instrument. Viscosities were run at 25° C.±0.1° C. and 55° C.±0.1° C. with a five-minute equilibration period to ensure the temperature was constant and at a shear rate of 50 sec$^{-1}$. Ten readings at each temperature were recorded and the reported results represent the average viscosity values of ten different readings. The values were recorded as expressed in millipascal seconds (mPa·s) and a shear rate of 50 s$^{-1}$ unless otherwise specified.

To create films such that various physical properties could be tested, each sample was cured under a constant flow of nitrogen gas with a 1 J/cm$^2$ UV-dose of Conveyor Fusion Unit Model DRS-10/12 QN, 600W UV-lamp system having as lamps 1600M radiator (600 W/inch which equals 240 W/cm, and thus, in total 600 W) fitted with R$^{500}$ reflector, one with a H bulb and one with a D bulb UV lamp, of which the D-bulb was used to cure the samples. The UV-dose was then measured with an International Light IL390 radiometer. Then, individual test strips having a width of approximately 1.27 cm (0.5 inches±$\frac{1}{32}$") and a length of approximately 12.7 cm (5 inches±⅛") were then cut from the film. The exact thickness of each specimen was measured with a calibrated micrometer.

The method for determining film modulus as used herein is described in paragraphs [0132]-[0133] and [0135] of EP2089333B1, the cited portion portions of which being hereby incorporated by reference, except that cured films were conditioned for at least 24 hours prior to testing. The tensile properties (tensile strength, percent elongation at break, and segment modulus) were determined with an MTS Criterion™ Model 43.104 with respect to test strips of a cured film of each sample having a 3-mil thickness as prepared per the "Film Sample Preparation" procedure described above. Due to these relatively soft coatings (e.g., those with a modulus of less than about 10 MPa), the coating was drawn down and cured on a glass plate and the individual specimens cut from the glass plate with a scalpel after applying a thin layer of talc. A 0.9 kg (2-lb) load cell was used in an Instron 4442 Tensile Tester, and the modulus was calculated at 2.5% elongation with a least-squares fit of the stress-strain plot. Cured films were conditioned at 23.0° C.±0.1° C. and 50.0%±0.5% relative humidity for 16 to 24 hours prior to testing. For testing specimens, the gage length was 5.1 cm (2-inches), and the crosshead speed was 25.4 mm/min. All testing was performed at a temperature of 23.0° C.±0.1° C. and a relative humidity of 50.0%±0.5%. All measurements were determined from the average of at least six test specimens. Values for tensile strength were determined as the highest stress born by the sample before break. Values for toughness were determined as the total area under the stress-strain curve.

Adhesive properties were determined with an Instron Tensile Tester Model 4442 using test strips of a cured film of each sample having a 3-mil thickness as prepared per the "Film Sample Preparation" procedure described above. Cured films were then conditioned for a minimum of 7 days at 23.0° C.±2.0° C. and 50%±5% RH. When peel strength results were too high and untestable after 7 days, new samples were prepared and conditioned for 24 hours at 23.0° C.±2.0° C. and 50%±5% RH. Test samples were then cut using a scalpel and 1.00" wide steel bar, placing a 6" cut on either side of the bar with a ¼" gap between cut specimens. To minimize the effects of minor sample defects, sample specimens are cut parallel to the direction in which the drawdown of the cured film was prepared. A thin layer of talc was applied using a cotton-tipped applicator to the first and third strips on each drawdown to reduce blocking during the adhesion test. The Instron Tensile Tester Model 4442 was setup with a 2 lb load cell, 20 psi pneumatic grips, and 10.00"/min crosshead speed for testing. A clip attached to braided nylon string was run through a pulley with the nylon string clamped into the upper jaw of the Instron testing instrument. The first strip was peeled back from the glass plate about one inch and place horizontally on the table with the peeled-back end of the specimen facing away from the pulley. The binder clip was attached to the peeled-back end of the specimen and allowed to lay flat on the sample. The plate was pulled to put tension on the braided nylon string until the load on the Instron reads positive, at which point the software method was started and continued until the average force value became relatively constant. The test is terminated by clicking on the stop button in the software or loosening the tension on the string. Reported peel strength values are the average of the plateau force for eight samples run.

TABLE 4A

Formulations 1-7. All amounts listed in parts by weight

| Formulation | 1* | 2 | 3 | 4 | 5* | 6 | 7 |
|---|---|---|---|---|---|---|---|
| Oligomer 1 | 60 | 60 | 60 | 60 | 60 | 59.5 | 57.5 |
| Oligomer 2 | 15 | 14 | 13 | 12 | — | — | — |
| Compound 1 | — | 1 | 2 | 3 | — | 0.5 | 2.5 |
| PEA | 22.5 | 22.5 | 22.5 | 22.5 | 37.5 | 37.5 | 37.5 |
| ANTIOXIDANT 1520 | 0.5 | 0.5 | 0.5 | 0.5 | 0.5 | 0.5 | 0.5 |
| TPO | 2 | 2 | 2 | 2 | 2 | 2 | 2 |
| TOTALS | 100 | 100 | 100 | 100 | 100 | 100 | 100 |
| Total Silane (mmol/100 g) | 0 | 2.0 | 4.1 | 6.1 | 0 | 1.0 | 5.1 |
| [Urea + urethane content] (mmol/100 g formulation) | 61 | 65 | 68 | 72 | 54 | 55 | 62 |
| Viscosity @ 25° C. (mPa * s) | 3183 | 3036 | 3008 | 2949 | 2136 | 1221 | 1129 |
| Peel Strength (gf/in) (24 hrs) | 19 | 56 | 66 | 92 | — | — | — |
| Peel Strength (gf/in) (7 day) | 19 | 75 | 81 | 135 | 41 | 153 | 235 |
| Elongation (at break) (%) | 64 | 71 | 62 | 71 | 66 | 64 | 72 |
| Film Modulus (Tensile) (MPa) | 1.77 | 1.70 | 1.82 | 1.88 | 1.97 | 2.02 | 1.77 |
| Toughness (N * mm/m$^3$) | 0.26 | 0.31 | 0.25 | 0.33 | 0.30 | 0.28 | 0.31 |
| Tensile Strength (MPa) | 0.70 | 0.73 | 0.69 | 0.79 | 0.78 | 0.75 | 0.74 |

*Formulations 1 and 5 are compa-ative examples.

TABLE 4B

Formulations 8-10. All amounts listed in parts by weight

| Formulation | 8* | 9 | 10 |
|---|---|---|---|
| Oligomer 1 | 30 | 30 | 30 |
| Oligomer 2 | 45 | 40 | 42.5 |
| Compound 2 | — | 5 | — |
| Compound 3 | — | — | 2.5 |
| PEA | 22.5 | 22.5 | 22.5 |
| ANTIOXIDANT 1520 | 0.5 | 0.5 | 0.5 |
| TPO | 2 | 2 | 2 |
| TOTALS | 100 | 100 | 100 |
| Total Silane (mmol/100 g) | 0 | 7.8 | 3.6 |
| [Urea + urethane content] (mmol/100 g formulation) | 48 | 62 | 55 |
| Viscosity @ 25° C. (mPa*s) | 2363 | 2283 | 2173 |
| Peel Strength (gf/in) (7 days) | 25 | 157 | 99 |
| Elongation (at break) (%) | 90 | 89 | 76 |
| Film Modulus (Tensile) (MPa) | 0.76 | 0.87 | 0.77 |
| Toughness (N*mm/m$^3$) | 0.22 | 0.25 | 0.16 |
| Tensile Strength (MPa) | 0.42 | 0.49 | 0.37 |

*Formulation 8 is a comparative example.

TABLE 4C

Formulations 11-16. All amounts listed in parts by weight

| Formulation | 11 | 12 | 13 | 14 | 15* | 16* |
|---|---|---|---|---|---|---|
| Oligomer 1 | 59.8 | 59.8 | 59.8 | 59.5 | 60.3 | 60.4 |
| Oligomer 2 | 14.0 | 13.9 | 13.9 | 13.9 | 14.1 | 14.1 |
| Compound 2 | 1.3 | — | — | — | — | — |
| Compound 3 | — | 1.4 | — | — | — | — |
| Compound 5 | — | — | 1.4 | — | — | — |
| Compound 6 | — | — | — | 1.8 | — | — |
| Acrylated Silane TMPSA | — | — | — | — | 0.5 | — |
| Mercapotsilane | — | — | — | — | — | 0.4 |
| PEA | 22.4 | 22.4 | 22.4 | 22.3 | 22.6 | 22.6 |
| ANTIOXIDANT 1520 | 0.5 | 0.5 | 0.5 | 0.5 | 0.5 | 0.5 |
| TPO | 2.0 | 2.0 | 2.0 | 2.0 | 2.0 | 2.0 |
| TOTALS | 100 | 100 | 100 | 100 | 100 | 100 |
| Total Silane (mmol/100 g) | 2.0 | 2.0 | 2.0 | 2.0 | 2.0 | 2.0 |
| [Urea + urethane content] (mmol/100 g formulation) | 64 | 64 | 64 | 64 | 61 | 61 |
| Viscosity @ 25° C. (mPa * s) | 3176 | 3131 | 3146 | 3075 | 2999 | 2982 |
| Peel Strength (gf/in) (7 days) | 105 | 57 | 100 | 65 | 23 | 50 |
| Elongation (at break) (%) | 61 | 78 | 74 | 60 | 64 | 80 |
| Film Modulus (Tensile) (MPa) | 1.87 | 1.84 | 1.81 | 1.68 | 1.80 | 1.53 |
| Toughness (N * mm/m$^3$) | 0.25 | 0.38 | 0.34 | 0.21 | 0.27 | 0.33 |
| Tensile Strength (MPa) | 0.68 | 0.84 | 0.78 | 0.62 | 0.72 | 0.70 |

*Formulations 15 and 16 are comparative examples.

TABLE 4D

Formulations 17-20. All amounts listed in parts by weight

| Formulation | 17 | 18 | 19* | 20* |
|---|---|---|---|---|
| Oligomer 1 | 59.4 | 59.3 | 61.0 | 61.1 |
| Oligomer 2 | 11.9 | 11.9 | 12.2 | 12.2 |
| Compound 2 | 3.9 | — | — | — |
| Compound 3 | — | 4.2 | — | — |
| Acrylated Silane TMPSA | — | — | 1.4 | — |
| Mercaptosilane | — | — | — | 1.2 |
| PEA | 22.3 | 22.2 | 22.9 | 22.9 |
| ANTIOXIDANT 1520 | 0.5 | 0.5 | 0.5 | 0.5 |
| PHOTOINITIATOR TPO | 2.0 | 2.0 | 2.0 | 2.0 |
| TOTALS | 100 | 100 | 100 | 100 |
| Total Silane (mmol/100 g) | 6.1 | 6.1 | 6.1 | 6.1 |
| [Urea + urethane content] (mmol/100 g formulation) | 71 | 71 | 61 | 61 |
| Viscosity @ 25° C. (mPa*s) | 3277 | 3205 | 2771 | 2707 |
| Peel Strength (gf/in) (7 days) | 138 | 78 | 49 | 100 |
| Elongation (at break) (%) | 55 | 78 | 59 | 89 |
| Film Modulus (Tensile) (MPa) | 2.04 | 1.95 | 1.90 | 1.25 |
| Toughness (N*mm/m$^3$) | 0.22 | 0.40 | 0.25 | 0.32 |
| Tensile Strength (MPa) | 0.69 | 0.87 | 0.72 | 0.59 |

*Formulations 19 and 20 are comparative examples.

TABLE 4E

Comparison of Formulations 1, 3 and 4 with Formulations 21-22 (Amounts in parts by weight)

| Formulation | 1* | 3 | 4 | 21* | 22* |
|---|---|---|---|---|---|
| Oligomer 1 | 60 | 60 | 60 | 60 | 60 |
| Oligomer 2 | 15 | 13 | 12 | 14 | 12 |
| Compound 1 | — | 2 | 3 | — | — |
| Acrylated Silane TMPSA | — | — | — | 1 | 3 |
| PEA | 22.5 | 22.5 | 22.5 | 22.5 | 22.5 |
| ANTIOXIDANT 1520 | 0.5 | 0.5 | 0.5 | 0.5 | 0.5 |
| TPO | 2 | 2 | 2 | 2 | 2 |
| TOTALS | 100 | 100 | 100 | 100 | 100 |
| Total Silane (mmol/100 g) | 0 | 4.1 | 6.1 | 4.3 | 12.8 |
| [Urea + urethane content] (mmol/100 g formulation) | 61 | 68 | 72 | 61 | 60 |
| Viscosity @ 25° C. (mPa*s) | 3183 | 3008 | 2949 | 2940 | 2462 |
| Peel Strength (gf/in) (7 days) | 18 | 81 | 135 | 40 | 63 |
| Elongation (at break) (%) | 64 | 62 | 71 | 67 | 71 |
| Film Modulus (Tensile) (MPa) | 1.77 | 1.82 | 1.88 | 1.88 | 1.84 |
| Toughness (N*mm/m$^3$) | 0.26 | 0.25 | 0.33 | 0.30 | 0.33 |
| Tensile Strength (MPa) | 0.70 | 0.69 | 0.79 | 0.77 | 0.79 |

*Formulations 1 and 21-22 are comparative examples.

TABLE 4F

Formulations 1, 19 and 23-26. All amounts listed in parts by weight

| Formulation | 1* | 19* | 23 | 24 | 25 | 26 |
|---|---|---|---|---|---|---|
| Oligomer 1 | 60 | 61.0 | 60 | 60 | 60 | 59.5 |
| Oligomer 2 | 15 | 12.2 | 14.5 | 13.9 | 12 | 13.9 |
| Acrylated Silane TMPSA | — | 1.4 | — | — | — | — |
| Compound 4 | — | — | 0.5 | 1.1 | 3 | — |
| Compound 7 | — | — | — | — | — | 1.8 |
| PEA | 22.5 | 22.9 | 22.5 | 22.5 | 22.5 | 22.3 |
| ANTIOXIDANT 1520 | 0.5 | 0.5 | 0.5 | 0.5 | 0.5 | 0.5 |
| TPO | 2 | 2 | 2 | 2 | 2 | 2 |
| TOTALS | 100 | 100 | 100 | 100 | 100 | 100 |
| Total Silane (mmol/100 g) | 0 | 6.1 | 1.1 | 2.4 | 6.7 | 2.2 |
| [Urea + urethane content] (mmol/100 g formulation) | 61 | 61 | 63 | 65 | 72 | 64 |
| Viscosity @ 25° C. (mPa * s) | 3183 | 2771 | 3174 | 3097 | 3004 | 3104 |
| Peel Strength (gf/in) (24 hrs) | 19 | — | 80 | 101 | 95 | — |
| Peel Strength (gf/in) (7 days) | 18 | 49 | 119 | + | + | 74 |
| Elongation (at break) (%) | 64 | 59 | 54 | 57 | 83 | 74 |
| Film Modulus (Tensile) (MPa) | 1.77 | 1.90 | 1.72 | 1.83 | 1.81 | 1.70 |
| Toughness (N * mm/m$^3$) | 0.26 | 0.25 | 0.18 | 0.22 | 0.42 | 0.32 |
| Tensile Strength (MPa) | 0.70 | 0.72 | 0.59 | 0.66 | 0.88 | 0.74 |

*Formulations 1 and 19 are comparative examples.

+ Seven-day adhesion could not be measured because the peel strength was so high that it overcame the cohesive forces in the cured film.

TABLE 4G

Formulation 27. All amounts listed in parts by weight

| Formulations | 15* | 27 |
|---|---|---|
| Oligomer 1 | 60.3 | 59.1 |
| Oligomer 2 | 14.1 | 14.8 |
| Compound 8 | — | 1.5 |
| Acrylated Silane TMPSA | 0.5 | — |
| PEA | 22.6 | 22.2 |
| ANTIOXIDANT 1520 | 0.5 | 0.5 |
| TPO | 2.0 | 2.0 |
| TOTALS | 100 | 100 |
| Total Silane (mmol/100 g) | 2.0 | 2.0 |
| [Urea + urethane content] (mmol/100 g) | 61 | 63 |
| Viscosity @ 25° C. (mPa*s) | 2999 | 3108 |
| Peel Strength (gf/in) (7 days) | 23 | + |
| Peel Strength (gf/in) (24 hrs) | — | 49 |
| Elongation (at break) (%) | 64 | 69 |
| Film Modulus (Tensile) (MPa) | 1.80 | 2.06 |
| Toughness (N*mm/m$^3$) | 0.27 | 0.34 |
| Tensile Strength (MPa) | 0.72 | 0.84 |

*Formulation 15 is a comparative example.
+ Seven-day adhesion could not be measured because the peel strength was so high that it overcame the cohesive forces in the cured film.

As can be seen, compositions according to various aspects of the present invention tend to possess properties which would make them especially suitable for use in optical fiber coating applications, and in particular as primary coatings for adhering to optical fibers given their desirable peel strength, viscosity, tensile strength, elongation, modulus, and toughness.

Specifically, per Table 4A, the coatings from Formulations 2-4 exhibited improved adhesion relative to the coating from Formulation 1 and the coatings from Formulations 6-7 exhibited improved adhesion relative to the coating from Formulation 5. Replacing a portion of Oligomer 2 with Compound 1 sequentially from Formulation 1 to Formulation 4 resulted in an increase in the peel strength with increasing content of Compound 1 while maintaining similar levels of mechanical performance. Replacing a portion of Oligomer 1 with Compound 1 sequentially from Formulation 5 to Formulation 7 also resulted in an increase in peel strength with increasing content of Compound 1 even as the modulus of Formulation 7 was lower than that for the Formulation 5. This exhibited adhesion improvement despite such compositions have a wide range of physical properties such as viscosity and modulus.

Adhesion improvement was also demonstrated for different inventive compounds per Table 4B including the compositions of Formulations 9 and 10 relative to Formulation 8. The inventive compounds in the formulations of Formulations 9 and 10 contained TDI and IPDI respectively, where these compounds were also seen to result in an increase in peel strength compared to the control while maintaining similar level of mechanical properties.

Tables 4C and 4D also demonstrate that formulations including inventive compounds provided coatings with improved adhesion relative to comparable formulations using acrylated silane TMPSA or mercaptosilane adhesion promoters, which are often used in UV applications. Both the acrylated silane TMPSA and the inventive compounds have the same acrylate UV curable functionality so the use of TMPSA as control is more reasonable than mercaptosilane, since mercaptosilane does not have acrylate functionality. The thiol group of the mercaptosilane does, however, chain transfer in UV cure and gets connected to the terminal end of the polymer chain as a result. The mercaptosilane often performs much better than acrylated silane TMPSA as an adhesion promoter in fiber optic coating applications. To show the surprising adhesion results from inventive compounds, therefore, mercaptosilane was also used as a comparative example. As is apparent, the coatings from Formulations 11-14 demonstrated improved adhesion relative to the coatings from Formulations 15 and 16 that used acrylated silane TMPSA and mercaptosilane at a constant total silane content equal to 2 mmol/100 g. Additionally, the Formulation 17, which had a higher total silane content equal to 6.1 mmol/100 g, provided a coating that exhibited improved adhesion relative to the coatings from Formulations 19 and 20 at equivalent total silane content. The coating from Formulation 18 also demonstrated improved adhesion relative to the coating from Formulation 19, which used acrylated silane TMPSA.

Additionally, attaching the aspartic moiety to the nitrogen on the inside of the urea linkage relative to the silane also improved the adhesion results, as demonstrated by the Formulations 13 and 14 in Table 4C. Further, converting the aspartic moiety that is on the inside of the urea linkage to hydantoin also improved adhesion results, as demonstrated by Formulation 26 in Table 4F.

The silane ester was also varied from methoxy to ethoxy in Formulations 14 and 26 of Table 4C and 4F respectively. Traditionally ethoxy silanes offer lower adhesion and worse buildup than methoxy silanes, however use of the inventive compounds used in Formulations 14 and 26 surprisingly resulted in coatings with improved adhesion relative to similar coating utilizing acrylated silane TMPSA and mercaptosilane, both methoxy silanes. Additionally, the use of these inventive compounds would be expected to offer better stability and shelf life as well due to slower hydrolysis relative to methoxy silanes.

When comparing a coating produced from Formulations 21-22, which used the acrylated silane TMPSA, to a coating produced from Formulations 3 and 4, which used inventive Compound 1 (Table 4E), it was observed that significantly improved adhesion results were achieved at similar total silane content levels. Specifically, Formulation 3 resulted in an improvement of 100% relative to Formulation 21 just by replacing acrylated silane TMPSA with inventive Compound 1 at the similar silane content of ~4.1-4.3 mmol/100 g composition. Furthermore, the inventive Compound 1 was much more efficient in improving adhesion, requiring only a 50% increase in total silane to result in a 65% increase in peel strength, whereas the acylated silane required a 300% increase in total silane to increase the peel strength 58%. As a result of this, when comparing with Formulation 22, Formulation 4 had about 100% less silane content in the formulation (6.1 vs 12.8) but resulted in a coating with about 100% greater peel strength (135 vs 63).

Table 4F addresses whether adhesion improvement of hydantoin-containing versions of the inventive compounds (Compounds 4 and 7). As is apparent, coatings from Formulations 23-26 that used inventive Compound 4 or Compound 7 at a silane level of 1.1-6.7 mmol/100 g showed improved adhesion when compared with the coating from Formulation 1 that did not have adhesion promoter and the coating from Formulation 19 that included acrylated silane TMPSA at a silane level of 6.1 mmol/100 g. In addition, as shown by Formulations 23-25, when converting inventive Compound 1 to a hydantoin-containing compound (inventive Compound 4), the peel strength not only again increased but Compound 4 appeared more efficient at increasing the peel strength then the Compound 1, represented. In fact, seven-day adhesion could not be measured for coatings produced from Formulations 24 and 25 because the peel strength was so high that it overcame the cohesive forces in the cured film, a problem not encountered in their aspartate counterparts, i.e., Formulations 2-4. Also, coatings from Formulations 24-25 illustrated greater peel strength after 24 hours than coatings from Formulations 2 and 4 at similar total silane levels. The coating from Formulation 26, which utilized inventive Compound 7 (which resulted from converting inventive Compound 6 to the hydantoin-containing version), also exhibited improved adhesion relative to the coating from Formulations 1 and 14.

Table 4G demonstrates an inventive aspartate adhesion monomer with two silanes attached to the acrylate. As shown by Formulation 27, the adhesion after just 24 hour using Compound 8 already exceeded that of the control Formulation 15 aged for 7 days. The adhesion after 7 days was too high to be tested for Formulation 27 and Compound 8 which is why 24 hour adhesion was used. Additional silanes attached to the acrylate monomer enabled greater adhesion to the glass substrate and higher adhesion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising:
   (I) an ethylenically unsaturated compound comprising:
   (a) a moiety of the structure (1):

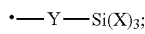

(1)

(b1) a moiety of the structure (2):

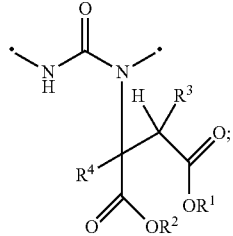

(2)

(b2) a moiety of the structure (3):

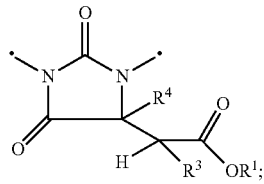

(3)

(b3) a combination of a moiety of the structure (2) and a moiety of the structure (3),
in which (i) Y represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) $R^1$ and $R^2$, which may be the same or different, each represent an organic group that is inert to isocyanate groups at temperatures of 100° C. or less; (iv) $R^3$ and $R^4$, which may be the same or different, each represent hydrogen or an organic group that is inert to isocyanate groups at temperatures of 100° C. or less; and (v) each "━━●" represents a linkage to another portion of the ethylenically unsaturated compound; and
(II) an ethylenically unsaturated oligomer that is different from ethylenically unsaturated compound (I) and/or a photoinitiator.

2. The composition of claim 1, wherein $R^3$ and $R^4$ are both hydrogen.

3. The composition of claim 1, wherein the ethylenically unsaturated compound further comprises:
   (c) a segment of the structure:

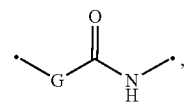

in which G is O, S, or NR in which R represents hydrogen or an organic group that is inert to isocyanate groups at temperatures of 100° C. or less, and each "━━●" represents a linkage to another portion of the ethylenically unsaturated compound.

4. The composition of claim 1, wherein the ethylenically unsaturated compound has a molecular weight, calculated from the molecular formula of the ethylenically unsaturated compound, of 400 to 1000 g/mol.

5. The composition of claim 1, wherein the ethylenically unsaturated compound (I) has the structure (4A) or the structure (4B):

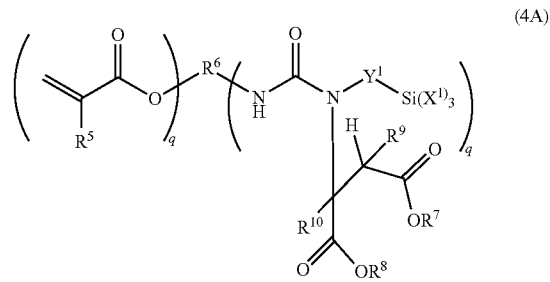

(4A)

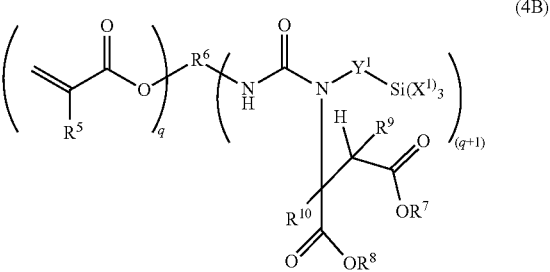

(4B)

in which (i) $R^5$ represents H or $CH_3$, (ii) $R^6$ represents a group comprising a branched or straight chain alkylene radical, (iii) $Y^1$ represents a linear or branched linking group comprising 1 or more carbon atoms, and (iv) $R^1$ and $R^8$, which may be the same or different, represents an organic group that is inert towards isocyanate groups at temperatures of 100° C. or less, (v) $R^9$ and $R^{10}$, which may be the same or different, each represent hydrogen or an organic group that is inert to isocyanate groups at temperatures of 100° C. or less, (vi) each $X^1$, which may be the same or different, represents an alkoxy group or an organic group that is inert towards isocyanate groups at temperatures of 100° C. or less, with the proviso that at least one $X^1$ represents an alkoxy group, and (vii) each q, which can be same or different, is an integer having a value of 1 to 6.

6. The composition of claim 1, wherein the ethylenically unsaturated compound (I) has the structure (5):

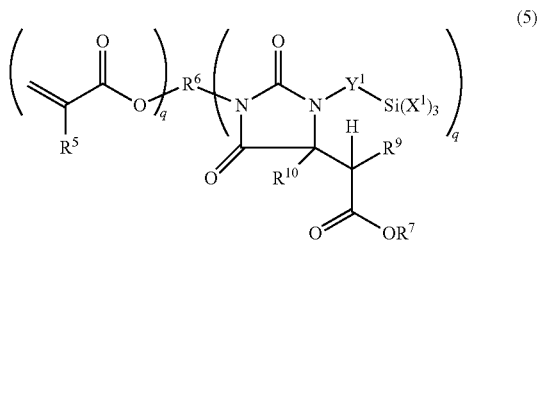

(5)

in which (i) $R^5$ represents H or $CH_3$, (ii) $R^6$ represents a group comprising a branched or straight chain alkylene radical, (iii) $Y^1$ represents a linear or branched linking group comprising 1 or more carbon atoms, and (iv) $R^7$ represents an organic group that is inert towards isocyanate groups at temperatures of 100° C. or less, (v) $R^9$ and $R^{10}$, which may be the same or different, each represent hydrogen or an organic group that is inert to isocyanate groups at temperatures of 100° C. or less, (vi) each $X^1$, which may be the same or different, represents an alkoxy group or an organic group that is inert towards isocyanate groups at temperatures of 100° C. or less, with the proviso that at least one $X^1$ represents an alkoxy group, and (vii) each q, which can be same or different, is an integer having a value of 1 to 6.

7. The composition of claim 1, wherein the ethylenically unsaturated compound (I) has the structure (6):

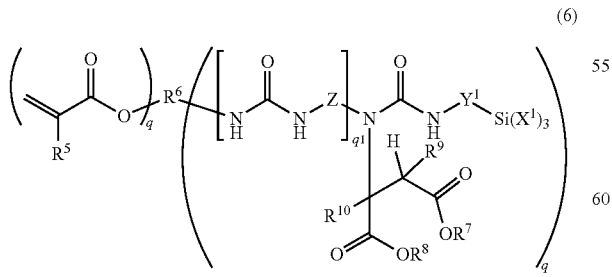

(6)

wherein (i) $R^5$ represents H or $CH_3$, (ii) $R^6$ represents a group comprising a branched or straight chain alkylene radical, (iii) $R^7$ and $R^8$ which may be the same or different, represents an organic group that is inert towards isocyanate groups at temperatures of 100° C. or less, (iv) $R^9$ and $R^{10}$, which may be the same or different, each represent hydrogen or an organic group that is inert to isocyanate groups at temperatures of 100° C. or less, (v) Z represents an organic group that is inert towards isocyanate groups at temperatures of 100° C. or less, (vi) each $Y^1$, which may be the same or different, represents a linear or branched linking group comprising 1 or more carbon atoms, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) each q, which can be same or different, is an integer having a value of 1 to 6, and (ix) q1 is 0 or 1.

8. The composition of claim 1, wherein the ethylenically unsaturated compound (I) has the structure (7):

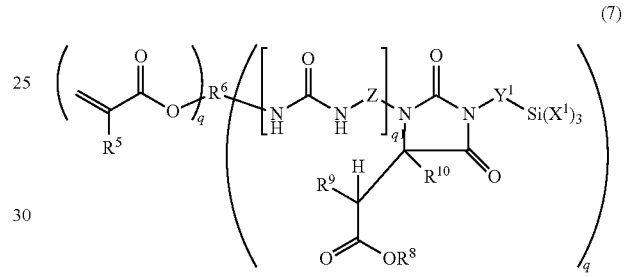

(7)

wherein (i) $R^5$ represents H or $CH_3$, (ii) $R^6$ represents a group comprising a branched or straight chain alkylene radical, (iii) $R^7$ and $R^8$ which may be the same or different, represents an organic group that is inert towards isocyanate groups at temperatures of 100° C. or less, (iv) $R^9$ and $R^{10}$, which may be the same or different, each represent hydrogen or an organic group that is inert to isocyanate groups at temperatures of 100° C. or less, (v) Z represents an organic group that is inert towards isocyanate groups at temperatures of 100° C. or less, (vi) each $Y^1$, which may be the same or different, represents a linear or branched linking group comprising 1 or more carbon atoms, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) each q, which can be same or different, is an integer having a value of 1 to 6, and (ix) q1 is 0 or 1.

9. The composition of claim 1, wherein the ethylenically unsaturated compound (I) has the structure (8):

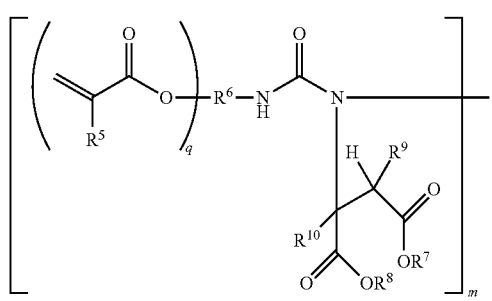
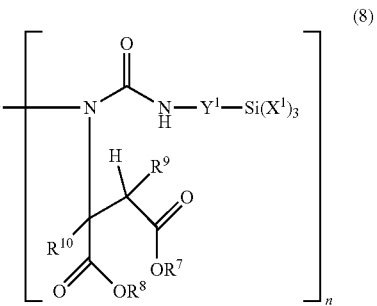

wherein (i) each $R^5$, which may be the same or different, represents H or $CH_3$, (ii) each $R^6$, which may be the same or different, represents a group comprising a branched or straight chain alkylene radical, (iii) $Z^1$ represents an organic group that is inert towards isocyanate groups at temperatures of 100° C. or less, (iv) each $Y^1$, which may be the same or different, represents a linear or branched linking group comprising 1 or more carbon atoms, (v) each $R^7$ and $R^8$, which may be the same or different, represents an organic group that is inert towards isocyanate groups at temperatures of 100° C. or less, (vi) each $R^9$ and $R^{10}$, which may be the same or different, represent hydrogen or an organic group that is inert towards isocyanate groups at temperatures of 100° C. or less, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) m and n, which may be the same or different, are each an integer having a value of 1 to 4, and (ix) each q, can be same or different, is an integer having a value of 1 to 6.

10. The composition of claim 1, wherein the ethylenically unsaturated compound (I) has the structure (9):

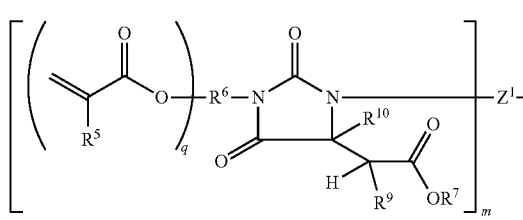
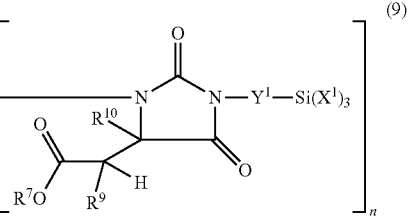

wherein (i) each $R^5$, which may be the same of different, represents H or $CH_3$, (ii) each $R^6$, which may be the same or different, represents a group comprising a branched or straight chain alkylene radical, (iii) $Z^1$ represents an organic group that is inert towards isocyanate groups at temperatures of 100° C. or less, (iv) each $Y^1$, which may be the same or different, represents a linear or branched linking group comprising 1 or more carbon atoms, (v) each $R^7$ and $R^8$, which may be the same or different, represents an organic group that is inert towards isocyanate groups at temperatures of 100° C. or less, (vi) each $R^9$ and $R^{10}$, which may be the same or different, represent hydrogen or an organic group that is inert towards isocyanate groups at temperatures of 100° C. or less, (vii) each $X^1$, which may be the same or different, represents an alkoxy group or an organic group that is inert towards isocyanate groups at temperatures of 100° C. or less, with the proviso that at least one $X^1$ represents an alkoxy group, (viii) m and n, which may be the same or different, are each an integer having a value of 1 to 4, and (ix) each q, which can be same or different, is an integer having a value of 1 to 6.

11. The composition of claim 1, wherein the ethylenically unsaturated compound (I) is present is an amount of 0.1 to 20% by weight, based on the total weight of solids in the composition.

12. The composition of claim 1, wherein the ethylenically unsaturated oligomer (II) is present and comprises a urethane (meth)acrylate oligomer comprising a reaction product of reactants comprising: (1) a polyol, (2) a polyisocyanate, and (3) a hydroxyl group-containing (meth)acrylate.

13. The composition of claim 12, wherein the polyol comprises a diol and the polyisocyanate comprises a diisocyanate.

14. The composition of claim 12, wherein the urethane (meth)acrylate oligomer is present in an amount of 30 to 95% by weight, based on the total weight of solids in the composition.

15. The composition of claim 1, further comprising a reactive diluent compound comprising one or more ethylenically unsaturated groups, wherein the reactive diluent compound is present in an amount of 5 to 90% by weight, based on the total weight of solids in the composition.

16. The composition of claim 12, wherein the photoinitiator is present in the composition.

17. A cured coating formed from the composition of claim 1.

18. A substrate at least partially coated with the cured coating of claim 17, where the substrate comprises an optical fiber.

19. A method for coating an optical fiber comprising:
(a) providing a glass optical fiber;
(b) applying a primary coating composition onto a surface of the glass optical fiber;
(c) optionally, imparting a dose of UV light sufficient to at least partially cure said primary coating composition;
(d) applying a secondary coating composition to the primary coating composition; and
(e) exposing the secondary coating composition to at least one radiation source capable of emitting ultraviolet radiation to affect curing of said secondary coating composition and, optionally, said primary coating composition,
wherein the primary coating composition and/or the secondary coating composition comprises the composition of claim 1.

20. A coated optical fiber comprising:
(a) a glass core and a cladding layer in contact with and surrounding said glass core; and
(b) a coating portion at least partially coating the cladding layer, the coating portion comprising:
(i) a primary coating layer in contact with said cladding layer; and
(ii) a secondary coating layer in contact with and surrounding said primary coating layer, wherein the primary coating layer and/or the secondary coating layer is the cured coating of claim 17.

21. The composition of claim 1, wherein at least one carbon-carbon double bond of the ethylenically unsaturated compound (I) is present as a =CH$_2$ end group with no further substituent on the carbon thereof.

22. The composition of claim 1, wherein the ethylenically unsaturated compound (I) comprises and end group of structure (1) and an end group of the structure (1a):

(1a)

in which E represents a group that comprises a polymerizable carbon-carbon double bond and "———●" represents a linkage to another portion of the ethylenically unsaturated compound.

23. The composition of claim 22, wherein the end group of structure (1a) has the structure

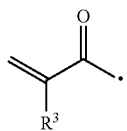

(1b)

in which R$^3$ is H or CH$_3$ and ———● represents a linkage to another portion of the ethylenically unsaturated compound (I).

24. The composition of claim 1, with the proviso that the ethylenically unsaturated compound (I) has at least one moiety of the structure 2A:

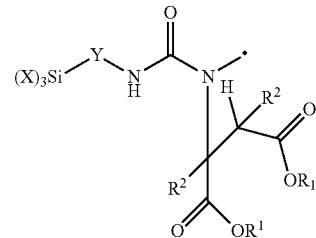

(2A)

in which X, Y, R$^1$, R$^2$ and "———●" are each as described with respect to structures (1)-(3).

25. The composition of claim 1, with the proviso that the ethylenically unsaturated compound (I) has 0 or 2 to 4 moieties of the structure 2B:

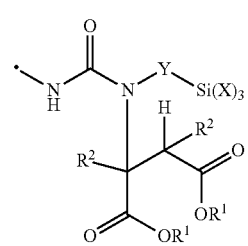

(2B)

in which X, Y, R$^1$, R$^2$ and "———●" are each as described with respect to structures (1)-(3).

26. The composition of claim 21, with the proviso that the ethylenically unsaturated compound has at least one moiety of the structure 3B:

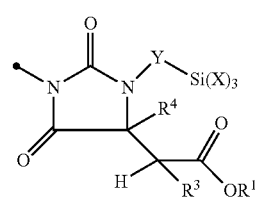

(3B)

in which X, Y, R$^1$, R$^3$, R$^4$ and "———●" are each as described with respect to structures (1)-(3).

27. The composition of claim 21, with the proviso that the ethylenically unsaturated compound comprises a moiety of the structure 3A:

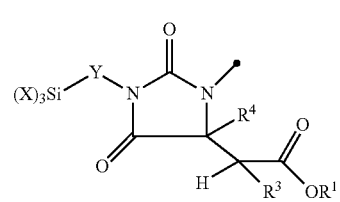

(3A)

in which X, Y, R$^1$, R$^3$, R$^4$ and "———●" are each as described with respect to structures (1)-(3).

* * * * *